United States Patent
Sasaki

(10) Patent No.: US 11,204,799 B2
(45) Date of Patent: Dec. 21, 2021

(54) SEMICONDUCTOR DEVICE AND SYSTEMS USING THE SAME

(71) Applicant: RENESAS ELECTRONICS CORPORATION, Tokyo (JP)

(72) Inventor: Yasuo Sasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 121 days.

(21) Appl. No.: 16/575,021

(22) Filed: Sep. 18, 2019

(65) Prior Publication Data

US 2020/0133721 A1 Apr. 30, 2020

(30) Foreign Application Priority Data

Oct. 31, 2018 (JP) .............................. JP2018-205515

(51) Int. Cl.

| | |
|---|---|
| *G06F 9/312* | (2018.01) |
| *G06F 9/46* | (2006.01) |
| *G06F 12/08* | (2016.01) |
| *G06F 9/34* | (2018.01) |
| *G06F 9/48* | (2006.01) |
| *G06F 9/30* | (2018.01) |
| G06F 12/0831 | (2016.01) |

(52) U.S. Cl.
CPC ........ *G06F 9/4881* (2013.01); *G06F 9/30101* (2013.01); *G06F 9/30145* (2013.01); *G06F 9/30043* (2013.01); *G06F 12/0835* (2013.01); *G06F 2213/2806* (2013.01)

(58) Field of Classification Search
CPC .............. G06F 9/4881; G06F 9/30101; G06F 9/30145; G06F 9/48; G06F 9/4806; G06F 9/4812; G06F 9/5066; G06F 9/30043; G06F 12/0835; G06F 13/30; G06F 13/32; G06F 13/34; G06F 2213/2802; G06F 2213/2806; G06F 15/17331; G06F 9/2806
USPC ................. 718/102–108; 712/221, 225, 224; 710/22, 308; 711/112
See application file for complete search history.

(56) References Cited

U.S. PATENT DOCUMENTS

| | | | |
|---|---|---|---|
| 9,753,729 B2 | 9/2017 | Maruyama | |
| 2004/0105298 A1* | 6/2004 | Symes | G06F 9/4812 365/149 |

(Continued)

FOREIGN PATENT DOCUMENTS

| | | |
|---|---|---|
| JP | 2002-049497 A | 2/2002 |
| JP | 2004-220093 A | 8/2004 |
| WO | 2008/023426 A1 | 2/2008 |

*Primary Examiner* — Daniel H Pan
(74) *Attorney, Agent, or Firm* — McDermott Will & Emery LLP

(57) ABSTRACT

A semiconductor device capable of suppressing performance degradation and systems using the same are provided. The semiconductor device includes a plurality of processors CPU1 and CPU2, a scheduling device 10 (ID1) connected to the processors CPU1 and CPU2 for controlling the processors CPU1 and CPU2 to execute a plurality of tasks in real time, memories 17 and 18 accessed by the processors CPU1 and CPU2 to store data by executing the tasks, and access monitor circuits 15 for monitoring accesses to the memories by the processors CPU1 and CPU2. When an access to the memory is detected by the access monitor circuit 15, the data stored in the memory 18 is transferred based on the destination information of the data stored in the memory 18.

14 Claims, 64 Drawing Sheets

(56) References Cited

U.S. PATENT DOCUMENTS

| | | | |
|---|---|---|---|
| 2004/0139441 A1 | 7/2004 | Kaburaki et al. | |
| 2004/0225760 A1* | 11/2004 | Lee .................. | G06F 13/28 |
| | | | 710/22 |
| 2006/0179178 A1* | 8/2006 | King .................. | G06F 13/28 |
| | | | 710/22 |
| 2010/0306421 A1* | 12/2010 | Maeda .................. | G06F 13/28 |
| | | | 710/22 |

* cited by examiner

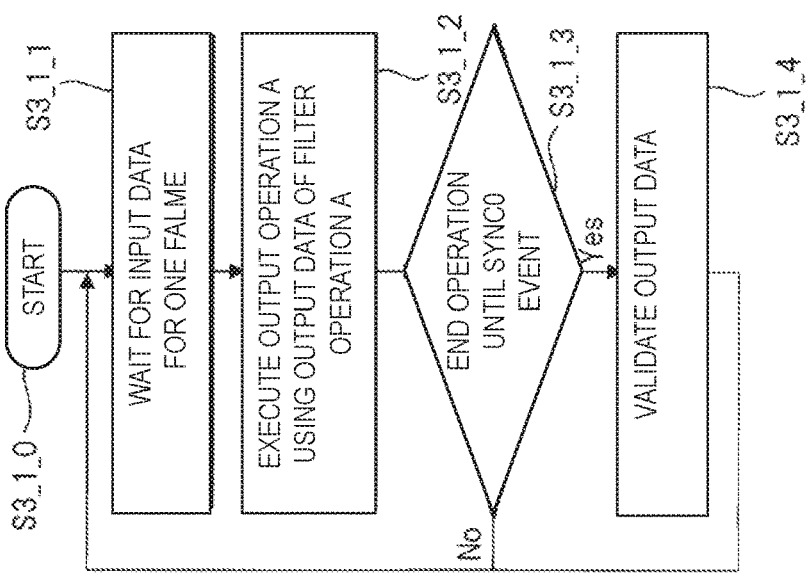
FIG. 3C
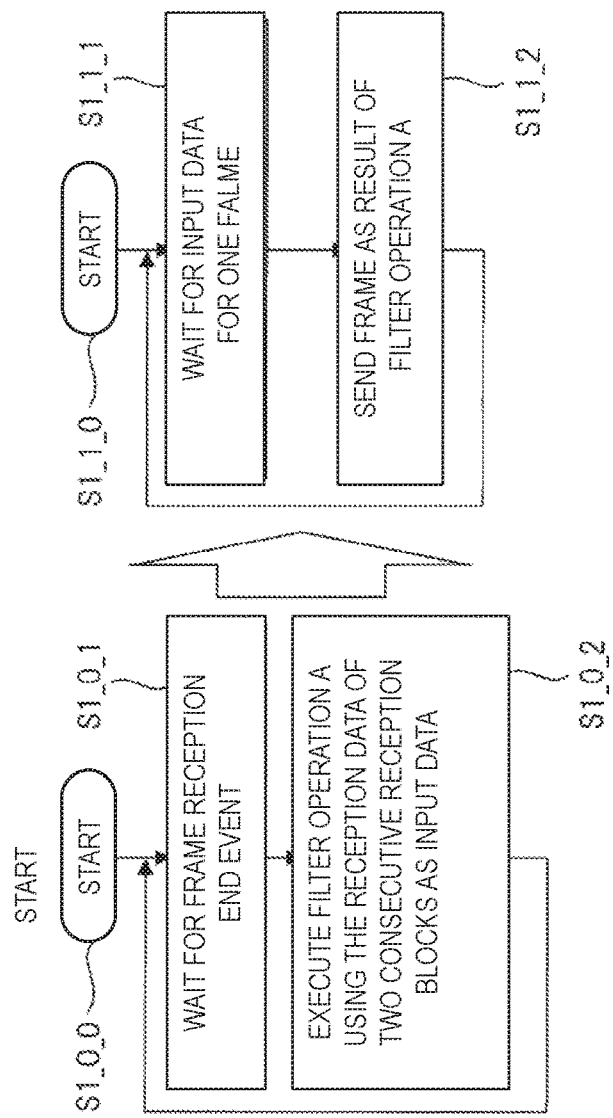
FIG. 3B
FIG. 3A

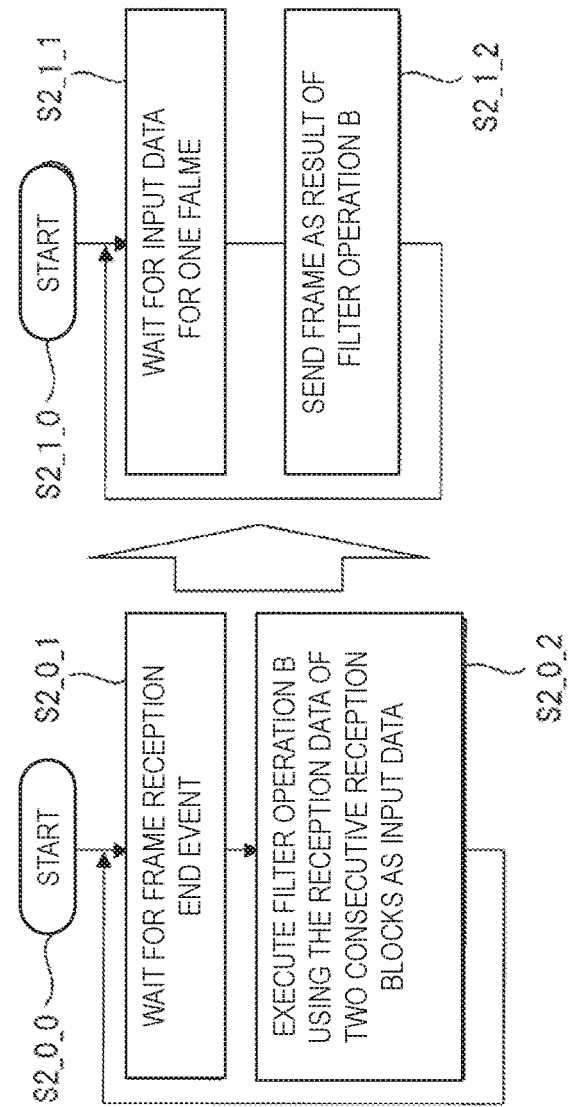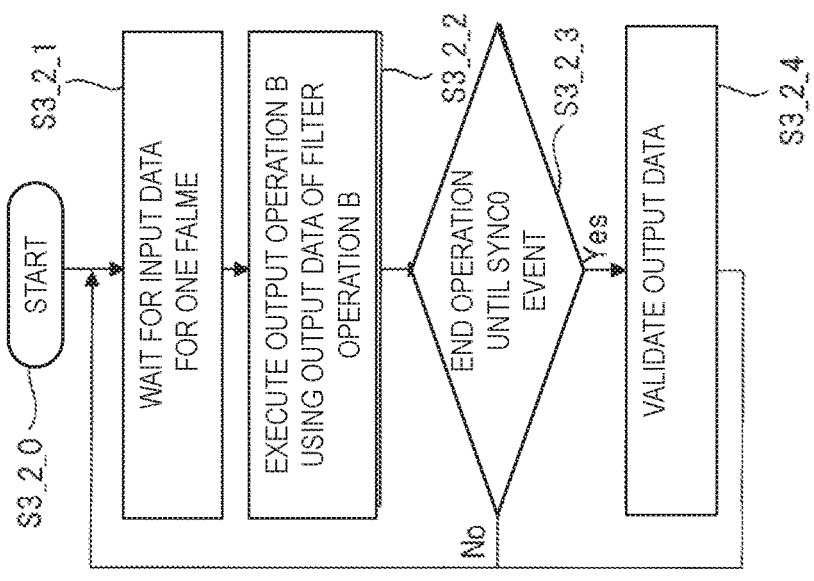
FIG. 4A  FIG. 4B  FIG. 4C

FIG. 6

| | | | | |
|---|---|---|---|---|
| 17 { 0FFFFH : 00000H | 17_3 | 17_2 | 17_1 | 17_0 |
| | +C00H (+3KB) | +800H (+2KB) | +400H (+1KB) | +000H (+0) |

| | | | | |
|---|---|---|---|---|
| 18 { 1FFFFH : 10000H | 18_3 | 18_2 | 18_1 | 18_0 |
| | +300H (+0.75KB) | +200H (+0.5KB) | +100H (+0.25KB) | +000H (+0) |

FIG. 7

| | | | | |
|---|---|---|---|---|
| 17 { OFFFFH : 00000H | 17_3 | 17_2 | 17_1 | 17_0 |
| | +300H (+0.75KB) | +200H (+0.5KB) | +100H (+0.25KB) | +000H (+0) |

| | | | | |
|---|---|---|---|---|
| 18 { 1FFFFH : 10000H | 18_3 | 18_2 | 18_1 | 18_0 |
| | +C00H (+3KB) | +800H (+2KB) | +400H (+1KB) | +000H (+0) |

FIG. 8

LOGICAL ADDRESS ASSIGN TO MEMORY 17

| PHYSICAL ADDRESS | LOGICAL ADDRESS FOR "TASK FOR FILTER OPERATION A" (*1) (CONVERT BY ADDRESS CONVERTER 13) (*1) LOGICAL ADDRESS OF BLOCK m = 20000H + 400Hxm (1 BLOCK = 1KB = 400H BYTE) | | | |
|---|---|---|---|---|
| 0FFFFH – 0F000H | BLOCK 3 WRITE IN COMMUNICATION DEVICE 5_1 READ IN CPU 2 (f23-R) | BLOCK 2 WRITE IN COMMUNICATION DEVICE 5_1 READ IN CPU 2 (f23-R) | BLOCK 1 WRITE IN COMMUNICATION DEVICE 5_1 READ in CPU 1 (f01-R) | BLOCK 0 WRITE IN COMMUNICATION DEVICE 5_1 READ IN CPU 1 (f01-R) |
| 0EFFFH – 0E000H | NOT ASSIGNED | NOT ASSIGNED | NOT ASSIGNED | NOT ASSIGNED |
| ... | ... | ... | ... | ... |
| 03FFFH – 03000H | NOT ASSIGNED | NOT ASSIGNED | NOT ASSIGNED | NOT ASSIGNED |
| 02FFFH – 02000H | NOT ASSIGNED | NOT ASSIGNED | NOT ASSIGNED | NOT ASSIGNED |
| 01FFFH – 01000H | NOT ASSIGNED | NOT ASSIGNED | NOT ASSIGNED | BLOCK 4 WRITE IN COMMUNICATION DEVICE 5_1 |
| 00FFFH – 00000H | BLOCK 3 WRITE IN COMMUNICATION DEVICE 5_1 READ IN CPU 2 (f23-R) | BLOCK 2 WRITE IN COMMUNICATION DEVICE 5_1 READ IN CPU 2 (f23-R) | BLOCK 1 WRITE IN COMMUNICATION DEVICE 5_1 READ in CPU 1 (f01-R) | BLOCK 0 WRITE IN COMMUNICATION DEVICE 5_1 READ IN CPU 1 (f01-R) |
| ASSIGN PHYSICAL MEMORY | 17_3 | 17_2 | 17_1 | 17_0 |
| OFFSET OF PHYSICAL ADDRESS | +C00H (+3KB) | +800H (+2KB) | +400H (+1KB) | +000H (+0) |

FIG. 9

LOGICAL ADDRESS ASSIGN TO MEMORY 18

| PHYSICAL ADDRESS | LOGICAL ADDRESS FOR "TASK FOR FILTER OPERATION A" (*2) (CONVERT BY ADDRESS CONVERTER 13) (*2) LOGICAL ADDRESS OF BLOCK n = 30000H + 100Hxn (1 BLOCK = 0.25KB = 100H BYTE) | | | |
|---|---|---|---|---|
| 0FFFFH – 0F000H | NOT ASSIGNED | NOT ASSIGNED | NOT ASSIGNED | NOT ASSIGNED |
| 0EFFFH – 0E000H | NOT ASSIGNED | NOT ASSIGNED | NOT ASSIGNED | NOT ASSIGNED |
| ... | ... | ... | ... | ... |
| 03FFFH – 03000H | NOT ASSIGNED | NOT ASSIGNED | NOT ASSIGNED | NOT ASSIGNED |
| 02FFFH – 02000H | NOT ASSIGNED | NOT ASSIGNED | NOT ASSIGNED | NOT ASSIGNED |
| 01FFFH – 01000H | BLOCK 7 WRITE IN CPU 2 (f23-W) | BLOCK 6 WRITE IN CPU 2 (f23-W) | BLOCK 3 WRITE IN CPU 1 (F01-W) | BLOCK 2 WRITE IN CPU 1 (f01-W) |
| 00FFFH – 00000H | BLOCK 5 WRITE IN CPU 2 (f23-W) | BLOCK4 WRITE IN CPU 2 (f23-W) | BLOCK1 WRITE IN CPU 1 (f01-W) | BLOCK 0 WRITE IN CPU 1 (f01-W) |
| ASSIGN PHYSICAL MEMORY | 18_3 | 18_2 | 18_1 | 18_0 |
| OFFSET OF PHYSICAL ADDRESS | +300H (+0.75KB) | +200H (+0.5KB) | +100H (+0.25KB) | +000H (+0) |

FIG. 10

LOGICAL ADDRESS ASSIGN TO MEMORY 17

| PHYSICAL ADDRESS | LOGICAL ADDRESS FOR "TASK FOR FILTER OPERATION B" (*1) (CONVERT BY ADDRESS CONVERTER 13) |  |  |  |  |
|---|---|---|---|---|---|
| | (*1) LOGICAL ADDRESS OF BLOCK m = 20000H + 400Hxn (1 BLOCK = 1KB = 400H BYTE) | | | | |
| 0FFFFH – 0F000H | NOT ASSIGNED | NOT ASSIGNED | NOT ASSIGNED | NOT ASSIGNED | NOT ASSIGNED |
| 0EFFFH – 0E000H | NOT ASSIGNED | NOT ASSIGNED | NOT ASSIGNED | NOT ASSIGNED | NOT ASSIGNED |
| ... | ... | ... | ... | ... | ... |
| 03FFFH – 03000H | NOT ASSIGNED | NOT ASSIGNED | NOT ASSIGNED | NOT ASSIGNED | NOT ASSIGNED |
| 02FFFH – 02000H | NOT ASSIGNED | NOT ASSIGNED | NOT ASSIGNED | NOT ASSIGNED | NOT ASSIGNED |
| 01FFFH – 01000H | NOT ASSIGNED | NOT ASSIGNED | NOT ASSIGNED | NOT ASSIGNED | BLOCK 4 WRITE IN COMMUNICATION DEVICE 5_2 READ in CPU 2 (f34-R) |
| 00FFFH – 00000H | BLOCK 3 WRITE IN COMMUNICATION DEVICE 5_2 READ IN CPU 2 (f34-R) | BLOCK3 WRITE IN COMMUNICATION DEVICE 5_2 READ IN CPU 2 (f12-R) | BLOCK1 WRITE IN COMMUNIATION DEVICE 5_2 READ IN CPU 2 (f12-R) | | BLOCK 0 WRITE IN COMMUNICATION DEVICE 5_2 |
| ASSIGN PHYSICAL MEMORY | 17_3 | 17_2 | 17_1 | | 17_0 |
| OFFSET OF PHYSICAL ADDRESS | +C00H (+3KB) | +800H (+2KB) | +400H (+1KB) | | +000H (+0) |

FIG. 11

LOGICAL ADDRESS ASSIGN TO MEMORY 18

| PHYSICAL ADDRESS | LOGICAL ADDRESS FOR "TASK FOR FILTER OPERATION B" (*2) (CONVERT BY ADDRESS CONVERTER 13) (*2) LOGICAL ADDRESS OF BLOCK n = 30000H + 100Hxn (1 BLOCK = 0.25KB = 100H BYTE) | | | |
|---|---|---|---|---|
| 0FFFFH – 0F000H | NOT ASSIGNED | NOT ASSIGNED | NOT ASSIGNED | NOT ASSIGNED |
| 0EFFFH – 0E000H | NOT ASSIGNED | NOT ASSIGNED | NOT ASSIGNED | NOT ASSIGNED |
| ... | ... | ... | ... | ... |
| 03FFFH – 03000H | NOT ASSIGNED | NOT ASSIGNED | NOT ASSIGNED | NOT ASSIGNED |
| 02FFFH – 02000H | NOT ASSIGNED | NOT ASSIGNED | NOT ASSIGNED | NOT ASSIGNED |
| 01FFFH – 01000H | BLOCK 7<br>WRITE IN CPU 2 (f34-W) | BLOCK 6<br>WRITE IN CPU 2 (f34-W) | BLOCK 3<br>WRITE IN CPU 1 (f12-W) | BLOCK 2<br>WRITE IN CPU 1 (f12-W) |
| 00FFFH – 00000H | BLOCK 5<br>WRITE IN CPU 2 (f34-W) | BLOCK 4<br>WRITE IN CPU 2 (f34-W) | BLOCK 1<br>WRITE IN CPU 1 (f12-W) | BLOCK 0<br>WRITE IN CPU 1 (f12-W) |
| ASSIGN PHYSICAL MEMORY | 18_3 | 18_2 | 18_1 | 18_0 |
| OFFSET OF PHYSICAL ADDRESS | +300H<br>(+0.75KB) | +200H<br>(+0.5KB) | +100H<br>(+0.25KB) | +000H<br>(+0) |

FIG. 12

| RAGISTER NAME | TARGET MEMORY | RISTRICTION OF BLOCK ASSIGNMENT IN TRAGET AREA | TRIGGER OF AUTO BLOCK ASSIGNMENT IN TARGET AREA | BYTE PER BLOCK IN TARGET AREA | BYTE PER FLAG IN TARGET AREA |
|---|---|---|---|---|---|
| SETTING REGISTER OF TRANSFER MONITOR AREA 0 700_0 | 17 | IN MEMORY 17, WHILE SWHITCHING THE SLAVES IN BLOCK UNITS (17_0 -> 17_1 -> 17_2 -> ...), THE BLOCKS ARE ALLOCATED (BLOCK 0 -> BLOCK 1 -> BLOCK 2 -> ...) | 17_1 -> | 1024 | 1 |
| SETTING REGISTER OF TRANSFER MONITOR AREA 1 '00_1 | 18 | IN MEMORY 18, WHILE SWHITCHING THE SLAVES IN BLOCK UNITS (18_0 -> 18_1 -> 18_2 -> ...), THE BLOCKS ARE ALLOCATED (BLOCK 0 -> BLOCK 1 -> BLOCK 2 -> ...) | NO SETTING | 256 | 1 |

| RAGISTER NAME | READ DETECT AREA (DESTINATION OF TRANSFER) | WRITE DETECT AREA (ORIGINAL OF TRANSFER) | WRITE TASK (ORIGINAL OF TRANSFER) | MAX. BYTE PER FRAME | TRANSFER START TRIGGER 1 | TRANSFER START TRRIGER 2 |
|---|---|---|---|---|---|---|
| TASK INPUT/OUTPUT DATA TRANSFER CONTROL REGISTER 0 801_0 | TRANSFER MONITOR AREA 0 OF SEMICONDUCT OR DEVICE 2_3 (ID3) | TRANSFER MONITOR AREA 1 OF SEMICONDUCT OR DEVICE 2_1 (ID1) | TASK FOR FILTER OPERATION OF SEMICONDUCT OR DEVICE 2_1 (ID1) | 512 | TRANSFER BYTES WHEN TASK INPUT/OUTPUT DATA NOT TRANSFERRED IS MAX. PER a FRAME | "WRITE TASK END" OR PAUSE |

Additional row (READ TASK column):
TASK FOR OUTPUT OPERATION A OF SEMICONDUCT OR DEVICE 2_3 (ID3)

FIG. 13

TASK FOR FILTER OPERATION A

| RAGISTER NAME | TASK EXECUTING INPUT/OUTPUT | INPUT OR OUTPUT | INPUT/OUTPUT DATA AREA | DEFAULT VALUE OF AUTOMATIC ASSIGNED BLOCK NO. AT TASK START | DEFAULT VALUE OF AUTOMATIC ASSIGNED BLOCK NO. |
|---|---|---|---|---|---|
| SETTING REGISTER OF TASK INPUT/OUTPUT DATA AREA 0 702_0 | TASK FOR FILTER OPERATION A | INPUT | TRANSFER MONITOR AREA 0 | 0 | 2 |
| SETTING REGISTER OF TASK INPUT/OUTPUT DATA AREA 1 702_1 | TASK FOR FILTER OPERATION A | OUTPUT | TRANSFER MONITOR AREA 1 | 0 | 4 |

| RAGISTER NAME | START TARGET TASK | START OPERATION NAME | NO. OF PARALLEL START | THE ARGUMENTS TO THE ACTIVATION FUNCTION | TASK START TRIGGER | TASK PAUSE TRIGGER |
|---|---|---|---|---|---|---|
| SETTING REGISTER OF TASK START CONDITION 0703_0 | TASK FOR FILTER OPERATION A | 1 | 2 | 1. FIRST ADDRESS TO CONTINUOUS 2 BLOCKS FROM "BLOCK 0" OF TASK INPUT DATA<br>2. FIRST ADDRESS TO CONTINUOUS 4 BLOCKS FROM "BLOCK 0" OF TASK OUTPUT DATA | FRAME RECEPTION END EVENT OCCURRED | NO SETTING |

FIG. 14

TASK FOR FILTER OPERATION B

| RAGISTER NAME | TARGET MEMORY | RISTRICTION OF BLOCK ASSIGNMENT IN TRAGET AREA | TRIGGER OF AUTO BLOCK ASSIGNMENT IN TARGET AREA | BYTE PER BLOCK IN TARGET AREA | BYTE PER FLAG IN TARGET AREA |
|---|---|---|---|---|---|
| SETTING REGISTER OF TRANSFER MONITOR AREA 0 700_0 | 17 | IN MEMORY 17, WHILE SWHITCHING THE SLAVES IN BLOCK UNITS (17_0 -> 17_1 -> 17_2 -> ...), THE BLOCKS ARE ALLOCATED (BLOCK 0 -> BLOCK 1 -> BLOCK 2 -> ...) | 17_1 -> | 1024 | 1 |
| SETTING REGISTER OF TRANSFER MONITOR AREA 1 700_1 | 18 | IN MEMORY 18, WHILE SWHITCHING THE SLAVES IN BLOCK UNITS (18_0 -> 18_1 -> 18_2 -> ...), THE BLOCKS ARE ALLOCATED (BLOCK 0 -> BLOCK 1 -> BLOCK 2 -> ...) | NO SETTING | 256 | 1 |

| RAGISTER NAME | READ DETECT AREA (DESTINATION OF TRANSFER) | WRITE DETECT AREA (ORIGINAL OF TRANSFER) | WRITE TASK (ORIGINAL OF TRANSFER) | MAX. BYTE PER FRAME | TRANSFER START TRIGGER 1 | TRANSFER START TRRIGER 2 |
|---|---|---|---|---|---|---|
| TASK INPUT/OUTPUT DATA TRASFER CONTROL REGISTER 0 701_0 | TRANSFER MONITOR AREA 2 OF SEMICONDUCT OR DEVICE 2_3 (ID3) | TRANSFER MONITOR AREA 1 OF SEMICONDUCT OR DEVICE 2_2 (ID1) | TASK FOR FILTER OPERATION OF SEMICONDUCT OR DEVICE 2_2 (ID1) | 512 | TRANSFER BYTES WHEN TASK INPUT/OUTPUT DATA NOT TRANSFERRED IS MAX. PER A FRAME | "WRITE TASK END" OR PAUSE |
| | TASK FOR OUTPUT OPERATION B OF SEMICONDUCT OR DEVICE 2_3 (ID3) | | | | | |

FIG. 15

TASK FOR FILTER OPERATION B

| RAGISTER NAME | TASK EXECUTING INPUT/OUTPUT | INPUT OR OUTPUT | INPUT/OUTPUT DATA AREA | DEFAULT VALUE OF AUTOMATIC ASSIGNED BLOCK NO. AT TASK START | DEFAULT VALUE OF AUTOMATIC ASSIGNED BLOCK NO. |
|---|---|---|---|---|---|
| SETTING REGISTER OF TASK INPUT/OUTPUT DATA AREA 0 702_0 | TASK FOR FILTER OPERATION B | INPUT | TRANSFER MONITOR AREA 0 | 1 | 2 |
| SETTING REGISTER OF TASK INPUT/OUTPUT DATA AREA 1 702_1 | TASK FOR FILTER OPERATION B | OUTPUT | TRANSFER MONITOR AREA 1 | 0 | 4 |

| RAGISTER NAME | START TARGET TASK | START OPERATION NAME | NO. OF PARALLEL START | THE ARGUMENTS TO THE ACTIVATION FUNCTION | TASK START TRIGGER | TASK PAUSE TRIGGER |
|---|---|---|---|---|---|---|
| SETTING REGISTER OF TASK START CONDITION 0 703_0 | TASK FOR FILTER OPERATION B | 1 | 2 | 1. FIRST ADDRESS TO CONTINUOUS 4 BLOCKS FROM FIRST ADDRESS OF TASK INPUT DATA 2. FIRST ADDRESS TO CONTINUOUS 1 BLOCK FROM FIRST ADDRESS OF TASK OUTPUT DATA | FRAME RECEPTION END EVENT OCCURRED | NO SETTING |

FIG. 22

LOGICAL ADDRESS ASSIGN TO MEMORY 17 (TRANSFER MONITORING AREA 0)

| PHYSICAL ADDRESS | LOGICAL ADDRESS FOR "OUTPUT OPERATION A" (*2) (CONVERT BY ADDRESS CONVERTER 13) (*2) LOGICAL ADDRESS OF BLOCK n = 3000H + 400H×n (1 BLOCK = 1KB = 400H BYTE) | | | |
|---|---|---|---|---|
| 0FFFFH – 0F000H | NOT ASSIGNED | NOT ASSIGNED | | |
| 0EFFFH – 0E000H | NOT ASSIGNED | NOT ASSIGNED | | |
| ... | ... | ... | | |
| 03FFFH – 03000H | NOT ASSIGNED | BLOCK 7<br>-> SEMICONDUCTOR 2_1 :<br>TRANSFER DATA WRITTEN IN CPU 2(f23-W) to SEMICONDUCTOR 2_3<br>-> SEMICONDUCTOR 2_3 : READ IN CPU 2 (fg23-R) | BLOCK 3<br>-> SEMICONDUCTOR 2_1 :<br>TRANSFER DATA WRITTEN IN CPU 1(f01-W) to SEMICONDUCTOR 2_3<br>-> SEMICONDUCTOR 2_3 : READ IN CPU 1 (fg01-R) | |
| 02FFFH – 02000H | NOT ASSIGNED | BLOCK 6<br>(SAME AS ABOVE) | BLOCK 2<br>(SAME AS ABOVE) | |
| 01FFFH – 01000H | NOT ASSIGNED | BLOCK 5<br>(SAME AS ABOVE) | BLOCK 1<br>(SAME AS ABOVE) | |
| 00FFFH – 00000H | NOT ASSIGNED | BLOCK 4<br>(SAME AS ABOVE) | BLOCK 0<br>(SAME AS ABOVE) | |
| ASSIGN PHYSICAL MEMORY | 17_3 | 17_2 | 17_1 | 17_0 |
| OFFSET OF PHYSICAL ADDRESS | +300H (+0.75KB) | +200H (+0.5KB) | +100H (+0.25KB) | +000H (+0) |

FIG. 23

LOGICAL ADDRESS ASSIGN IN MEMORY 18 (TRANSFER MONITORING AREA 1)

| PHYSICAL ADDRESS | LOGICAL ADDRESS FOR "OUTPUT OPERATION A" (*2) (CONVERT BY ADDRESS CONVERTER 13) (*2) LOGICAL ADDRESS OF BLOCK n = 30000H + 400Hxn (1 BLOCK = 1KB = 400H BYTE) | | | | |
|---|---|---|---|---|---|
| 0FFFFH – 0F000H | NOT ASSIGNED | NOT ASSIGNED | NOT ASSIGNED | NOT ASSIGNED | BLOCK 0<br>WRITE IN CPU 1 (fg01-W) |
| 0EFFFH – 0E000H | NOT ASSIGNED | NOT ASSIGNED | NOT ASSIGNED | NOT ASSIGNED | NOT ASSIGNED |
| ... | ... | ... | ... | ... | ... |
| 03FFFH – 03000H | NOT ASSIGNED | NOT ASSIGNED | NOT ASSIGNED | NOT ASSIGNED | NOT ASSIGNED |
| 02FFFH – 02000H | NOT ASSIGNED | NOT ASSIGNED | NOT ASSIGNED | NOT ASSIGNED | NOT ASSIGNED |
| 01FFFH – 01000H | NOT ASSIGNED | NOT ASSIGNED | NOT ASSIGNED | BLOCK 1<br>WRITE IN CPU 2 (fg23-W) | NOT ASSIGNED |
| 00FFFH – 00000H | NOT ASSIGNED | NOT ASSIGNED | NOT ASSIGNED | NOT ASSIGNED | NOT ASSIGNED |
| ASSIGN PHYSICAL MEMORY | 18_3 | | 18_2 | 18_1 | 18_0 |
| OFFSET OF PHYSICAL ADDRESS | +C00H<br>(+3KB) | | +800H<br>(+2KB) | +400H<br>(+1KB) | +000H<br>(+0) |

FIG. 24

LOGICAL ADDRESS ASSIGN TO MEMORY 17 (TRANSFER MONITORING AREA 2)

| PHYSICAL ADDRESS | LOGICAL ADDRESS FOR "OUTPUT OPERATION B" (*1) (CONVERT BY ADDRESS CONVERTER 13)<br>(*1) LOGICAL ADDRESS OF BLOCK m = 20000H + 100Hxm (1 BLOCK = 0.25KB = 100H BYTE) | | | |
|---|---|---|---|---|
| 0FFFFH – 0F000H | NOT ASSIGNED | NOT ASSIGNED | NOT ASSIGNED | NOT ASSIGNED |
| 0EFFFH – 0E000H | NOT ASSIGNED | NOT ASSIGNED | NOT ASSIGNED | NOT ASSIGNED |
| ... | ... | ... | | |
| 03FFFH – 03000H | BLOCK 7<br>-> SEMICONDUCTOR 2_2 :<br>TRANSFER DATA WRITTEN IN CPU 2(f34-W) to SEMICONDUCTOR 2_3<br>-> SEMICONDUCTOR 2_3 : READ IN CPU 2 (fg23-R) | BLOCK 3<br>-> SEMICONDUCTOR 2_2 :<br>TRANSFER DATA WRITTEN IN CPU 1(f12-W) to SEMICONDUCTOR 2_3<br>-> SEMICONDUCTOR 2_3 : READ IN CPU 1 (fg12-R) | NOT ASSIGNED | NOT ASSIGNED |
| 02FFFH – 02000H | BLOCK 6 (SAME AS ABOVE) | BLOCK 2 (SAME AS ABOVE) | NOT ASSIGNED | NOT ASSIGNED |
| 01FFFH – 01000H | BLOCK 5 (SAME AS ABOVE) | BLOCK 1 (SAME AS ABOVE) | NOT ASSIGNED | NOT ASSIGNED |
| 00FFFH – 00000H | BLOCK 4 (SAME AS ABOVE) | BLOCK 0 (SAME AS ABOVE) | NOT ASSIGNED | NOT ASSIGNED |
| ASSIGN PHYSICAL MEMORY | 17_3 | 17_2 | 17_1 | 17_0 |
| OFFSET OF PHYSICAL ADDRESS | +300H (+0.75KB) | +200H (+0.5KB) | +100H (+0.25KB) | +000H (+0) |

FIG. 25

LOGICAL ADDRESS ASSIGN TO MEMORY 18 (TRANSFER MONITORING AREA 3)

| PHYSICAL ADDRESS | LOGICAL ADDRESS FOR "OUTPUT OPERATION A" (*2) (CONVERT BY ADDRESS CONVERTER 13) (*2) LOGICAL ADDRESS OF BLOCK n = 30000H + 400Hxn (1 BLOCK = 1KB = 400H BYTE) | | | |
|---|---|---|---|---|
| 0FFFFH – 0F000H | NOT ASSIGNED | NOT ASSIGNED | NOT ASSIGNED | NOT ASSIGNED |
| 0EFFFH – 0E000H | NOT ASSIGNED | NOT ASSIGNED | NOT ASSIGNED | NOT ASSIGNED |
| ... | ... | ... | ... | ... |
| 03FFFH – 03000H | NOT ASSIGNED | NOT ASSIGNED | NOT ASSIGNED | NOT ASSIGNED |
| 02FFFH – 02000H | NOT ASSIGNED | NOT ASSIGNED | NOT ASSIGNED | NOT ASSIGNED |
| 01FFFH – 01000H | NOT ASSIGNED | NOT ASSIGNED | NOT ASSIGNED | NOT ASSIGNED |
| 00FFFH – 00000H | BLOCK 0 WRITE IN CPU 1 (fg12-W) | NOT ASSIGNED | NOT ASSIGNED | BLOCK 1 WRITE IN CPU 2 (fg34-W) |
| ASSIGN PHYSICAL MEMORY | 18_0 | 18_1 | 18_2 | 18_3 |
| OFFSET OF PHYSICAL ADDRESS | +000H (+0) | +400H (+1KB) | +800H (+2KB) | +C00H (+3KB) |

FIG. 26

TASK FOR FILTER OPERATION A

| REGISTER NAME | TARGET MEMORY | RISTRICTION OF BLOCK ASSIGNMENT IN TARGET AREA | TRIGGER OF AUTO BLOCK ASSIGNMENT IN TARGET AREA | BYTE PER BLOCK IN TARGET AREA | BYTE PER FLAG IN TARGET AREA |
|---|---|---|---|---|---|
| SETTING REGISTER OF TRANSFER MONITOR AREA 0 700_0 | "BANK WAY 17_0" AND "BANK WAY 17_1" | IN MEMORY 17, WHILE SWHITCHING THE SLAVES IN BLOCK UNITS, THE BLOCKS ARE ALLOCATED | NO SETTING | 256 | 1 |
| SETTING REGISTER OF TRANSFER MONITOR AREA 1 700_1 | "BANK WAY 18_0" AND "BANK WAY 18_1" | IN MEMORY 18, WHILE SWHITCHING THE SLAVES IN BLOCK UNITS, THE BLOCKS ARE ALLOCATED | NO SETTING | 1024 | 1 |

| RAGISTER NAME | READ DETECT AREA (DESTINATION OF TRANSFER) | READ TASK (DESTINATION OF TRANSFER) | WRITE DETECT AREA (ORIGINAL OF TRANSFER) | WRITE TASK (ORIGINAL OF TRANSFER) | MAX. BYTE PER FRAME | TRANSFER START TRIGGER 1 | TRANSFER START TRRIGER 2 |
|---|---|---|---|---|---|---|---|
| TASK INPUT/OUTPUT DATA TRASFER CONTROL REGISTER 0 701_0 | TRANSFER MONITOR AREA 0 OF SEMICONDUCT OR DEVICE 2_3 (ID3) | TASK FOR OUTPUT OPERATION A OF SEMICONDUCT OR DEVICE 2_3 (ID3) | TRANSFER MONITOR AREA 1 OF SEMICONDUCT OR DEVICE 2_1 (ID1) | TASK FOR FILTER OPERATION A OF SEMICONDUCT OR DEVICE 2_1 (ID1) | 512 | TRANSFER BYTES WHEN TASK INPUT/OUTPUT DATA NOT TRANSFERRED IS MAX. PER A FRAME | "WRITE TASK END" OR PAUSE |

FIG. 27

TASK FOR FILTER OPERATION A

| RAGISTER NAME | TASK EXECUTING INPUT/OUTPUT | INPUT OR OUTPUT | INPUT/OUTPUT DATA AREA | DEFAULT VALUE OF AUTOMATIC ASSIGNED BLOCK NO. AT TASK START | DEFAULT VALUE OF AUTOMATIC ASSIGNED BLOCK NO. |
|---|---|---|---|---|---|
| SETTING REGISTER OF TASK INPUT/OUTPUT DATA AREA 0 702_0 | TASK FOR FILTER OPERATION A | INPUT | TRANSFER MONITOR AREA 0 | 0 | 4 |
| SETTING REGISTER OF TASK INPUT/OUTPUT DATA AREA 1 702_1 | TASK FOR FILTER OPERATION A | OUTPUT | TRANSFER MONITOR AREA 1 | 0 | 1 |

| RAGISTER NAME | START TARGET TASK | START OPERATION NAME | NO. OF PARALLEL START | THE ARGUMENTS TO THE ACTIVATION FUNCTION | TASK START TRIGGER | TASK PAUSE TRIGGER |
|---|---|---|---|---|---|---|
| SETTING REGISTER OF TASK START CONDITION 0703_0 | TASK FOR FILTER OPERATION A | fg | 2 | 1. FIRST ADDRESS TO CONTINUOUS 4 BLOCKS FROM FIRST ADDRESS OF TASK INPUT DATA 2. FIRST ADDRESS TO CONTINUOUS 1 BLOCK FROM FIRST ADDRESS OF TASK OUTPUT DATA | END TRASFER TO READ DETECTION AREA SET IN REGISTER 0 | WHEN READ TASK READS |

FIG. 28

TASK FOR OUTPUT OPERATION B

| RAGISTER NAME | TARGET MEMORY | RISTRICTION OF BLOCK ASSIGNMENT IN TARGET AREA | TRIGGER OF AUTO BLOCK ASSIGNMENT IN TARGET AREA | BYTE PER BLOCK IN TARGET AREA | BYTE PER FLAG IN TARGET AREA |
|---|---|---|---|---|---|
| SETTING REGISTER OF TRANSFER MONITOR AREA 2 700_2 | "BANK WAY 17_2" AND "BANK WAY 17_3" | IN MEMORY 17, WHILE SWHITCHING THE SLAVES IN BLOCK UNITS, THE BLOCKS ARE ALLOCATED | NO SETTING | 256 | 1 |
| SETTING REGISTER OF TRANSFER MONITOR AREA 3 700_3 | "BANK WAY 18_1" AND "BANK WAY 18_3" | IN MEMORY 18, WHILE SWHITCHING THE SLAVES IN BLOCK UNITS, THE BLOCKS ARE ALLOCATED | NO SETTING | 1024 | 1 |

| REGISTER NAME | READ DETECT AREA (DESTINATION OF TRANSFER) | WRITE DETECT AREA (ORIGINAL OF TRANSFER) | READ TASK (DESTINATION OF TRANSFER) | WRITE TASK (ORIGINAL OF TRANSFER) | MAX. BYTE PER FRAME | TRANSFER START TRIGGER 1 | TRANSFER START TRRIGER 2 |
|---|---|---|---|---|---|---|---|
| TASK INPUT/OUTPUT DATA TRASFER CONTROL REGISTER 1 701_0 | TRANSFER MONITOR AREA 2 OF SEMICONDUCT OR DEVICE 2_3 (ID3) | TRANSFER MONITOR AREA 1 OF SEMICONDUCT OR DEVICE 2_2 (ID2) | TASK FOR OUTPUT OPERATION B OF SEMICONDUCT OR DEVICE 2_3 (ID3) | TASK FOR FILTER OPERATION B OF SEMICONDUCT OR DEVICE 2_2 (ID2) | 512 | TRANSFER BYTES WHEN TASK INPUT/OUTPUT DATA NOT TRANSFERRED IS MAX. PER A FRAME | "WRITE TASK END" OR PAUSE |

FIG. 29

TASK FOR FILTER OPERATION B

| REGISTER NAME | TASK EXECUTING INPUT/OUTPUT | INPUT OR OUTPUT | INPUT/OUTPUT DATA AREA | DEFAULT VALUE OF AUTOMATIC ASSIGNED BLOCK NO. AT TASK START | DEFAULT VALUE OF AUTOMATIC ASSIGNED BLOCK NO. |
|---|---|---|---|---|---|
| SETTING REGISTER OF TASK INPUT/OUTPUT DATA AREA 2 702_2 | TASK FOR FILTER OPERATION B | INPUT | TRANSFER MONITOR AREA 2 | 0 | 4 |
| SETTING REGISTER OF TASK INPUT/OUTPUT DATA AREA 3 702_3 | TASK FOR FILTER OPERATION B | OUTPUT | TRANSFER MONITOR AREA 3 | 0 | 1 |

| REGISTER NAME | START TARGET TASK | START OPERATION NAME | NO. OF PARALLEL START | THE ARGUMENTS TO THE ACTIVATION FUNCTION | TASK START TRIGGER | TASK PAUSE TRIGGER |
|---|---|---|---|---|---|---|
| SETTING REGISTER OF TASK START CONDITION 1703_1 | TASK FOR OUTPUT OPERATION B | fg | 2 | 1. FIRST ADDRESS TO CONTINUOUS 4 BLOCKS FROM FIRST ADDRESS OF TASK INPUT DATA  2. FIRST ADDRESS TO CONTINUOUS 1 BLOCK FROM FIRST ADDRESS OF TASK OUTPUT DATA | END TRASFER TO READ DETECTION AREA SET IN REGISTER 0 | WHEN READ TASK READS |

FIG. 35

| | |
|---|---|
| CTB1 | TRANSFER MONITOR AREA 1 |
| CTB2 | MONITOR TARGET DEVICE = SEMICONDUCTOR DEVICE 2-1 (ID1) |
| CTB3 | BASE ADDRESS OF PHYSICAL ADDRESS = NO SETTING / BASE ADDRESS OF LOGICAL ADDRESS = NO SETTING |
| CTB4 | AREA SIZE (BYTE) = 1024 |
| CTB5 | BYTE PER A FLAG = 1 |
| CTB6 | FIRST WRITE TIME = NO SETTING |
| CTB7 | LAST WRITE TIME = NO SETTING |
| CTB8 | FIRST READ TIME = NO SETTING |
| CTB9 | LAST READ TIME = NO SETTING |

CTB10:

| OFFSET ADDRESS | a. WRITE FLAG | b. READ FLAG | c. NO REFERENCE FLAG (=a-b) |
|---|---|---|---|
| 0000H | 0 | 0 | 0 |
| 0001H | 0 | 0 | 0 |
| 0002H | 0 | 0 | 0 |
| 0003H | 0 | 0 | 0 |
| 0004H | 0 | 0 | 0 |
| 0005H | 0 | 0 | 0 |
| 0006H | 0 | 0 | 0 |
| 0007H | 0 | 0 | 0 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 0 | 0 | 0 |

WHEN STARTING MONITOR

FIG. 36

| | | |
|---|---|---|
| CTB1 | TRANSFER MONITOR AREA 0 | |
| CTB2 | MONITOR TARGET DEVICE = SEMICONDUCTOR DEVICE 2-1 (ID1) | |
| CTB3 | BASE ADDRESS OF PHYSICAL ADDRESS = 00000H | BASE ADDRESS OF LOGICAL ADDRESS = 20000H |
| CTB4 | AREA SIZE (BYTE) = 1024 | |
| CTB5 | BYTE PER A FLAG = 1 | |
| CTB6 | FIRST WRITE TIME = id1m0tw4 | |
| CTB7 | LAST WRITE TIME = id1m0tw1024 | |
| CTB8 | FIRST READ TIME = NOT SETTING | |
| CTB9 | LAST READ TIME = NOT SETTING | |

CTB10:

| OFFSET ADDRESS | a. WRITE FLAG | b. READ FLAG | c. NO REFERENCE FLAG (=a-b) |
|---|---|---|---|
| 0000H | 1 | 0 | 0 |
| 0001H | 1 | 0 | 0 |
| 0002H | 1 | 0 | 0 |
| 0003H | 1 | 0 | 0 |
| 0004H | 0 | 0 | 0 |
| 0005H | 0 | 0 | 0 |
| 0006H | 0 | 0 | 0 |
| 0007H | 0 | 0 | 0 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 4 | 0 | 0 |

WHEN DETECTING FIRST WRITE TRANSFER (FIRST WRITE : 4 BYTE WRITE)

FIG. 37

| | |
|---|---|
| CTB1 | TRANSFER MONITOR AREA 0 |
| CTB2 | MONITOR TARGET DEVICE = SEMICONDUCTOR DEVICE 2-1 (ID1) |
| CTB3 | BASE ADDRESS OF PHYSICAL ADDRESS = 00000H / BASE ADDRESS OF LOGICAL ADDRESS = 20000H |
| CTB4 | AREA SIZE (BYTE) = 1024 |
| CTB5 | BYTE PER A FLAG = 1 |
| CTB6 | FIRST WRITE TIME = id1m0tw4 |
| CTB7 | LAST WRITE TIME = id1m0tw1020 |
| CTB8 | FIRST READ TIME = NOT SETTING |
| CTB9 | LAST READ TIME = NOT SETTING |

CTB10:

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 1020 | 0 | 1020 |

RIGHT AFTER DETECTING 1020 BYTE WRITE

*FIG. 38*

| | | |
|---|---|---|
| CTB1 | TRANSFER MONITOR AREA 0 | |
| CTB2 | MONITOR TARGET DEVICE = SEMICONDUCTOR DEVICE 2-1 (ID1) | |
| CTB3 | BASE ADDRESS OF PHYSICAL ADDRESS = 00000H | BASE ADDRESS OF LOGICAL ADDRESS = 20000H |
| CTB4 | AREA SIZE (BYTE) = 1024 | |
| CTB5 | BYTE PER A FLAG = 1 | |
| CTB6 | FIRST WRITE TIME = id1m0tw4 | |
| CTB7 | LAST WRITE TIME = id1m0tw1024 | |
| CTB8 | FIRST READ TIME = NOT SETTING | |
| CTB9 | LAST READ TIME = NOT SETTING | |

CTB10

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 1 | 0 | 1 |
| 00FDH | 1 | 0 | 1 |
| 00FEH | 1 | 0 | 1 |
| 00FFH | 1 | 0 | 1 |
| (TOTAL) | 1024 | 0 | 1024 |

WHEN DETECT WRITE TRANSFER IN ALL ADDRESS

*FIG. 39*

| | | |
|---|---|---|
| CTB1 | TRANSFER MONITOR AREA 0 | |
| CTB2 | MONITOR TARGET DEVICE = SEMICONDUCTOR DEVICE 2-1 (ID1) | |
| CTB3 | BASE ADDRESS OF PHYSICAL ADDRESS = 00000H | BASE ADDRESS OF LOGICAL ADDRESS = 20000H |
| CTB4 | AREA SIZE (BYTE) =1024 | |
| CTB5 | BYTE PER A FLAG = 1 | |
| CTB6 | FIRST WRITE TIME = id1m0tw4 | |
| CTB7 | LAST WRITE TIME = id1m0tw1024 | |
| CTB8 | FIRST READ TIME = id1m0tw4 | |
| CTB9 | LAST READ TIME = id1m0tw1024 | |

CTB10

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 1 | 0 | 1 |
| 00FDH | 1 | 0 | 1 |
| 00FEH | 1 | 0 | 1 |
| 00FFH | 1 | 0 | 1 |
| (TOTAL) | 1024 | 4 | 1020 |

WHEN DETECTING FIRST READ TRANSFER

FIG. 40

| | | |
|---|---|---|
| CTB1 | TRANSFER MONITOR AREA 0 | |
| CTB2 | MONITOR TARGET DEVICE = SEMICONDUCTOR DEVICE 2-1 (ID1) | |
| CTB3 | BASE ADDRESS OF PHYSICAL ADDRESS = 00000H | BASE ADDRESS OF LOGICAL ADDRESS = 20000H |
| CTB4 | AREA SIZE (BYTE) =1024 | |
| CTB5 | BYTE PER A FLAG = 1 | |
| CTB6 | FIRST WRITE TIME = id1m0tw4 | |
| CTB7 | LAST WRITE TIME = id1m0tw1024 | |
| CTB8 | FIRST READ TIME = id1m0tw4 | |
| CTB9 | LAST READ TIME = id1m0tw1024 | |

CTB10

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 1 | 0 |
| 0005H | 1 | 1 | 0 |
| 0006H | 1 | 1 | 0 |
| 0007H | 1 | 1 | 0 |
| --- | --- | --- | --- |
| 00FCH | 1 | 1 | 0 |
| 00FDH | 1 | 1 | 0 |
| 00FEH | 1 | 1 | 0 |
| 00FFH | 1 | 1 | 0 |
| (TOTAL) | 1024 | 1024 | 0 |

WHEN DETECTING READ TRANSFER IN ALL ADDRESS

FIG. 41

| CTB1 | TRANSFER MONITOR AREA 1 | | |
|---|---|---|---|
| CTB2 | MONITOR TARGET DEVICE = SEMICONDUCTOR DEVICE 2-1 (ID1) | | |
| CTB3 | BASE ADDRESS OF PHYSICAL ADDRESS = NO SETTING | BASE ADDRESS OF LOGICAL ADDRESS = NO SETTING | |
| CTB4 | AREA SIZE (BYTE) =256 | | |
| CTB5 | BYTE PER A FLAG = 1 | | |
| CTB6 | FIRST WRITE TIME = NO SETTING | | |
| CTB7 | LAST WRITE TIME = NO SETTING | | |
| CTB8 | FIRST READ TIME = NO SETTING | | |
| CTB9 | LAST READ TIME = NO SETTING | | |

| | OFFSET ADDRESS | a. WRITE FLAG | b. READ FLAG | c. NO REFERENCE FLAG (=a-b) |
|---|---|---|---|---|
| | 0000H | 0 | 0 | 0 |
| | 0001H | 0 | 0 | 0 |
| | 0002H | 0 | 0 | 0 |
| | 0003H | 0 | 0 | 0 |
| | 0004H | 0 | 0 | 0 |
| | 0005H | 0 | 0 | 0 |
| CTB10 | 0006H | 0 | 0 | 0 |
| | 0007H | 0 | 0 | 0 |
| | --- | --- | --- | --- |
| | 00FCH | 0 | 0 | 0 |
| | 00FDH | 0 | 0 | 0 |
| | 00FEH | 0 | 0 | 0 |
| | 00FFH | 0 | 0 | 0 |
| | (TOTAL) | 0 | 0 | 0 |

WHEN STARTING MONITOR

FIG. 42

| | |
|---|---|
| CTB1 | TRANSFER MONITOR AREA 1 |
| CTB2 | MONITOR TARGET DEVICE = SEMICONDUCTOR DEVICE 2-1 (ID1) |
| CTB3 | BASE ADDRESS OF PHYSICAL ADDRESS = 10000H / BASE ADDRESS OF LOGICAL ADDRESS = 30000H |
| CTB4 | AREA SIZE (BYTE) = 256 |
| CTB5 | BYTE PER A FLAG = 1 |
| CTB6 | FIRST WRITE TIME = id1mtw4 |
| CTB7 | LAST WRITE TIME = id1mtw4 |
| CTB8 | FIRST READ TIME = NO SETTING |
| CTB9 | LAST READ TIME = NO SETTING |

CTB10:

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 0 | 0 | 0 |
| 0005H | 0 | 0 | 0 |
| 0006H | 0 | 0 | 0 |
| 0007H | 0 | 0 | 0 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 4 | 0 | 4 |

WHEN DETECTING FIRST WRITE TRANSFER (FIRST WRITE: 4 BYTE WRITE)

FIG. 43

| CTB1 | TRANSFER MONITOR AREA 1 | |
|---|---|---|
| CTB2 | MONITOR TARGET DEVICE = SEMICONDUCTOR DEVICE 2-1 (ID1) | |
| CTB3 | BASE ADDRESS OF PHYSICAL ADDRESS = 10000H | BASE ADDRESS OF LOGICAL ADDRESS = 30000H |
| CTB4 | AREA SIZE (BYTE) =256 | |
| CTB5 | BYTE PER A FLAG = 1 | |
| CTB6 | FIRST WRITE TIME = id1mtw4 | |
| CTB7 | LAST WRITE TIME = id1mtw252 | |
| CTB8 | FIRST READ TIME = NO SETTING | |
| CTB9 | LAST READ TIME = NO SETTING | |

CTB10

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 252 | 0 | 252 |

RIGHT AFTER WHEN DETECT FIRST WRITDETECTING 256 BYTE WRITE

FIG. 44

| | | | |
|---|---|---|---|
| CTB1 | TRANSFER MONITOR AREA 1 | | |
| CTB2 | MONITOR TARGET DEVICE = SEMICONDUCTOR DEVICE 2-1 (ID1) | | |
| CTB3 | BASE ADDRESS OF PHYSICAL ADDRESS = 10000H | BASE ADDRESS OF LOGICAL ADDRESS = 30000H | |
| CTB4 | AREA SIZE (BYTE) =256 | | |
| CTB5 | BYTE PER A FLAG = 1 | | |
| CTB6 | FIRST WRITE TIME = id1mtw4 | | |
| CTB7 | LAST WRITE TIME = id1mtw256 | | |
| CTB8 | FIRST READ TIME = NO SETTING | | |
| CTB9 | LAST READ TIME = NO SETTING | | |

CTB10:

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 1 | 0 | 1 |
| 00FDH | 1 | 0 | 1 |
| 00FEH | 1 | 0 | 1 |
| 00FFH | 1 | 0 | 1 |
| (TOTAL) | 256 | 0 | 256 |

WHEN DETECTING WRITE TRANSFER IN ALL ADDRESS

FIG. 45

| | |
|---|---|
| CTB1 | TRANSFER MONITOR AREA 1 |
| CTB2 | MONITOR TARGET DEVICE = SEMICONDUCTOR DEVICE 2-1 (ID1) |
| CTB3 | BASE ADDRESS OF PHYSICAL ADDRESS = 10000H / BASE ADDRESS OF LOGICAL ADDRESS = 30000H |
| CTB4 | AREA SIZE (BYTE) =256 |
| CTB5 | BYTE PER A FLAG = 1 |
| CTB6 | FIRST WRITE TIME = id1mtw4 |
| CTB7 | LAST WRITE TIME = id1mtw256 |
| CTB8 | FIRST READ TIME = id1mtw4 |
| CTB9 | LAST READ TIME = id1mtw4 |

CTB10:

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 1 | 0 | 1 |
| 00FDH | 1 | 0 | 1 |
| 00FEH | 1 | 0 | 1 |
| 00FFH | 1 | 0 | 1 |
| (TOTAL) | 256 | 4 | 252 |

WHEN DETECTING FIRST READ TRANSFER (FIRST READ : 4 BYTE READ)

FIG. 46

| CTB1 | TRANSFER MONITOR AREA 1 | | | |
|---|---|---|---|---|
| CTB2 | MONITOR TARGET DEVICE = SEMICONDUCTOR DEVICE 2-1 (ID1) | | | |
| CTB3 | BASE ADDRESS OF PHYSICAL ADDRESS = 10000H | BASE ADDRESS OF LOGICAL ADDRESS = 30000H | | |
| CTB4 | AREA SIZE (BYTE) =256 | | | |
| CTB5 | BYTE PER A FLAG = 1 | | | |
| CTB6 | FIRST WRITE TIME = id1mtw4 | | | |
| CTB7 | LAST WRITE TIME = id1mtw256 | | | |
| CTB8 | FIRST READ TIME = id1mtw4 | | | |
| CTB9 | LAST READ TIME = id1mtw256 | | | |
| CTB10 | OFFSET ADDRESS | a. WRITE FLAG | b. READ FLAG | c. NO REFERENCE FLAG (=a-b) |
| | 0000H | 1 | 1 | 0 |
| | 0001H | 1 | 1 | 0 |
| | 0002H | 1 | 1 | 0 |
| | 0003H | 1 | 1 | 0 |
| | 0004H | 1 | 1 | 0 |
| | 0005H | 1 | 1 | 0 |
| | 0006H | 1 | 1 | 0 |
| | 0007H | 1 | 1 | 0 |
| | --- | --- | --- | --- |
| | 00FCH | 1 | 1 | 0 |
| | 00FDH | 1 | 1 | 0 |
| | 00FEH | 1 | 1 | 0 |
| | 00FFH | 1 | 1 | 0 |
| | (TOTAL) | 256 | 256 | 0 |

WHEN DETECTING READ TRANSFER IN ALL ADDRESS

*FIG. 47*

| | | |
|---|---|---|
| CTB1 | TRANSFER MONITOR AREA 1 | |
| CTB2 | MONITOR TARGET DEVICE = SEMICONDUCTOR DEVICE 2-1 (ID1) | |
| CTB3 | BASE ADDRESS OF PHYSICAL ADDRESS = NOT SETTING | BASE ADDRESS OF LOGICAL ADDRESS = NOT SETTING |
| CTB4 | AREA SIZE (BYTE) =256 | |
| CTB5 | BYTE PER A FLAG = 1 | |
| CTB6 | FIRST WRITE TIME = NOT SETTING | |
| CTB7 | LAST WRITE TIME = NOT SETTING | |
| CTB8 | FIRST READ TIME = NOT SETTING | |
| CTB9 | LAST READ TIME = NOT SETTING | |

CTB10

| OFFSET ADDRESS | a. WRITE FLAG | b. READ FLAG | c. NO REFERENCE FLAG (=a-b) |
|---|---|---|---|
| 0000H | 0 | 0 | 0 |
| 0001H | 0 | 0 | 0 |
| 0002H | 0 | 0 | 0 |
| 0003H | 0 | 0 | 0 |
| 0004H | 0 | 0 | 0 |
| 0005H | 0 | 0 | 0 |
| 0006H | 0 | 0 | 0 |
| 0007H | 0 | 0 | 0 |
| - - - | - - - | - - - | - - - |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 0 | 0 | 0 |

WHEN STARTING MONITOR

FIG. 48

| | |
|---|---|
| CTB1 | TRANSFER MONITOR AREA 1 |
| CTB2 | MONITOR TARGET DEVICE = SEMICONDUCTOR DEVICE 2-3 (ID3) |
| CTB3 | BASE ADDRESS OF PHYSICAL ADDRESS = 0000H / BASE ADDRESS OF LOGICAL ADDRESS = 20000H |
| CTB4 | AREA SIZE (BYTE) =256 |
| CTB5 | BYTE PER A FLAG = 1 |
| CTB6 | FIRST WRITE TIME = id3mtw4 |
| CTB7 | LAST WRITE TIME = id3mtw4 |
| CTB8 | FIRST READ TIME = NOT SETTING |
| CTB9 | LAST READ TIME = NOT SETTING |

CTB10:

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 0 | 0 | 0 |
| 0005H | 0 | 0 | 0 |
| 0006H | 0 | 0 | 0 |
| 0007H | 0 | 0 | 0 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 4 | 0 | 4 |

WHEN DETECTING FIRST WRITE TRANSFER (FIRST WRITE: 4 BYTE)

FIG. 49

| | |
|---|---|
| CTB1 | TRANSFER MONITOR AREA 1 |
| CTB2 | MONITOR TARGET DEVICE = SEMICONDUCTOR DEVICE 2-3 (ID3) |
| CTB3 | BASE ADDRESS OF PHYSICAL ADDRESS = 0000H / BASE ADDRESS OF LOGICAL ADDRESS = 20000H |
| CTB4 | AREA SIZE (BYTE) =256 |
| CTB5 | BYTE PER A FLAG = 1 |
| CTB6 | FIRST WRITE TIME = id3mtw4 |
| CTB7 | LAST WRITE TIME = id3mtw252 |
| CTB8 | FIRST READ TIME = NOT SETTING |
| CTB9 | LAST READ TIME = NOT SETTING |

CTB10:

| OFFSET ADDRESS | a. WRITE FLAG | b. READ FLAG | c. NO REFERENCE FLAG (=a-b) |
|---|---|---|---|
| 0000H | 1 | 0 | 1 |
| 0001H | 1 | 0 | 1 |
| 0002H | 1 | 0 | 1 |
| 0003H | 1 | 0 | 1 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 0 | 0 | 0 |
| 00FDH | 0 | 0 | 0 |
| 00FEH | 0 | 0 | 0 |
| 00FFH | 0 | 0 | 0 |
| (TOTAL) | 252 | 0 | 252 |

RIGHT AFTER DETECTING 252 BYTE WRITE

FIG. 50

| CTB1 | TRANSFER MONITOR AREA 1 | | | |
|---|---|---|---|---|
| CTB2 | MONITOR TARGET DEVICE = SEMICONDUCTOR DEVICE 2-3 (ID3) | | | |
| CTB3 | BASE ADDRESS OF PHYSICAL ADDRESS = 0000H | BASE ADDRESS OF LOGICAL ADDRESS = 20000H | | |
| CTB4 | AREA SIZE (BYTE) =256 | | | |
| CTB5 | BYTE PER A FLAG = 1 | | | |
| CTB6 | FIRST WRITE TIME = id3mtw4 | | | |
| CTB7 | LAST WRITE TIME = id3mtw256 | | | |
| CTB8 | FIRST READ TIME = NOT SETTING | | | |
| CTB9 | LAST READ TIME = NOT SETTING | | | |
| CTB10 | OFFSET ADDRESS | a. WRITE FLAG | b. READ FLAG | c. NO REFERENCE FLAG (=a-b) |
|  | 0000H | 1 | 0 | 1 |
|  | 0001H | 1 | 0 | 1 |
|  | 0002H | 1 | 0 | 1 |
|  | 0003H | 1 | 0 | 1 |
|  | 0004H | 1 | 0 | 1 |
|  | 0005H | 1 | 0 | 1 |
|  | 0006H | 1 | 0 | 1 |
|  | 0007H | 1 | 0 | 1 |
|  | --- | --- | --- | --- |
|  | 00FCH | 1 | 0 | 1 |
|  | 00FDH | 1 | 0 | 1 |
|  | 00FEH | 1 | 0 | 1 |
|  | 00FFH | 1 | 0 | 1 |
|  | (TOTAL) | 256 | 0 | 256 |

WHEN DETECTING WRITE TRANSFER IN ALL ADDRESS

FIG. 51

| | |
|---|---|
| CTB1 | TRANSFER MONITOR AREA 1 |
| CTB2 | MONITOR TARGET DEVICE = SEMICONDUCTOR DEVICE 2-3 (ID3) |
| CTB3 | BASE ADDRESS OF PHYSICAL ADDRESS = 0000H / BASE ADDRESS OF LOGICAL ADDRESS = 20000H |
| CTB4 | AREA SIZE (BYTE) =256 |
| CTB5 | BYTE PER A FLAG = 1 |
| CTB6 | FIRST WRITE TIME = id3mtw4 |
| CTB7 | LAST WRITE TIME = id3mtw256 |
| CTB8 | FIRST READ TIME = id3mtw4 |
| CTB9 | LAST READ TIME = id3mtw4 |

CTB10:

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 1 | 0 | 1 |
| 00FDH | 1 | 0 | 1 |
| 00FEH | 1 | 0 | 1 |
| 00FFH | 1 | 0 | 1 |
| (TOTAL) | 256 | 4 | 252 |

WHEN DETECTING FIRST READ TRANSFER (FIRST READ:WRITE: 4 BYTE)

FIG. 52

| CTB1 | TRANSFER MONITOR AREA 1 | | | |
|---|---|---|---|---|
| CTB2 | MONITOR TARGET DEVICE = SEMICONDUCTOR DEVICE 2-3 (ID3) | | | |
| CTB3 | BASE ADDRESS OF PHYSICAL ADDRESS = 0000H | BASE ADDRESS OF LOGICAL ADDRESS = 20000H | | |
| CTB4 | AREA SIZE (BYTE) =256 | | | |
| CTB5 | BYTE PER A FLAG = 1 | | | |
| CTB6 | FIRST WRITE TIME = id3mtw4 | | | |
| CTB7 | LAST WRITE TIME = id3mtw256 | | | |
| CTB8 | FIRST READ TIME = id3mtw4 | | | |
| CTB9 | LAST READ TIME = id3mtw256 | | | |
| CTB10 | OFFSET ADDRESS | a. WRITE FLAG | b. READ FLAG | c. NO REFERENCE FLAG (=a-b) |
| | 0000H | 1 | 1 | 0 |
| | 0001H | 1 | 1 | 0 |
| | 0002H | 1 | 1 | 0 |
| | 0003H | 1 | 1 | 0 |
| | 0004H | 1 | 1 | 0 |
| | 0005H | 1 | 1 | 0 |
| | 0006H | 1 | 1 | 0 |
| | 0007H | 1 | 1 | 0 |
| | --- | --- | --- | --- |
| | 00FCH | 1 | 1 | 0 |
| | 00FDH | 1 | 1 | 0 |
| | 00FEH | 1 | 1 | 0 |
| | 00FFH | 1 | 1 | 0 |
| | (TOTAL) | 256 | 256 | 0 |

WHEN DETECTING READ TRANSFER IN ALL ADDRESS

FIG. 53

| | |
|---|---|
| CTB1 | TRANSFER MONITOR AREA 1 |
| CTB2 | MONITOR TARGET DEVICE = SEMICONDUCTOR DEVICE 2-1 (ID1) |
| CTB3 | BASE ADDRESS OF PHYSICAL ADDRESS = 10000H / BASE ADDRESS OF LOGICAL ADDRESS = 30000H |
| CTB4 | AREA SIZE (BYTE) =256 |
| CTB5 | BYTE PER A FLAG = 1 |
| CTB6 | FIRST WRITE TIME = id3mtw4 |
| CTB7 | LAST WRITE TIME = id3mtw260 |
| CTB8 | FIRST READ TIME = id3mtr4 |
| CTB9 | LAST READ TIME = id3mtr256 |

CTB10:

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 0 | 1 |
| 0005H | 1 | 0 | 1 |
| 0006H | 1 | 0 | 1 |
| 0007H | 1 | 0 | 1 |
| --- | --- | --- | --- |
| 00FCH | 1 | 1 | 0 |
| 00FDH | 1 | 1 | 0 |
| 00FEH | 1 | 1 | 0 |
| 00FFH | 1 | 1 | 0 |
| (TOTAL) | 256 | 252 | 4 |

WHEN DETECTING READ TRANSFER IN ALL ADDRESS

*FIG. 54*

| | | |
|---|---|---|
| CTB1 | TRANSFER MONITOR AREA 1 | |
| CTB2 | MONITOR TARGET DEVICE = SEMICONDUCTOR DEVICE 2-1 (ID1) | |
| CTB3 | BASE ADDRESS OF PHYSICAL ADDRESS = 10000H | BASE ADDRESS OF LOGICAL ADDRESS = 30000H |
| CTB4 | AREA SIZE (BYTE) = 256 | |
| CTB5 | BYTE PER A FLAG = 1 | |
| CTB6 | FIRST WRITE TIME = id3mtw4 | |
| CTB7 | LAST WRITE TIME = id3mtw260 | |
| CTB8 | FIRST READ TIME = id3mtr4 | |
| CTB9 | LAST READ TIME = id3mtr260 | |

CTB10:

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 1 | 0 |
| 0005H | 1 | 1 | 0 |
| 0006H | 1 | 1 | 0 |
| 0007H | 1 | 1 | 0 |
| - - - | - - - | - - - | - - - |
| 00FCH | 1 | 1 | 0 |
| 00FDH | 1 | 1 | 0 |
| 00FEH | 1 | 1 | 0 |
| 00FFH | 1 | 1 | 0 |
| (TOTAL) | 256 | 256 | 0 |

WHEN DETECTING READ TRANSFER IN ALL ADDRESS AGAIN

FIG. 55

| | | |
|---|---|---|
| CTB1 | TRANSFER MONITOR AREA 1 | |
| CTB2 | MONITOR TARGET DEVICE = SEMICONDUCTOR DEVICE 2-3 (ID3) | |
| CTB3 | BASE ADDRESS OF PHYSICAL ADDRESS = 10000H | BASE ADDRESS OF LOGICAL ADDRESS = 30000H |
| CTB4 | AREA SIZE (BYTE) =256 | |
| CTB5 | BYTE PER A FLAG = 1 | |
| CTB6 | FIRST WRITE TIME = id3mtw4 | |
| CTB7 | LAST WRITE TIME = id3mtw260 | |
| CTB8 | FIRST READ TIME = id3mtr4 | |
| CTB9 | LAST READ TIME = id3mtr256 | |

CTB10:

| OFFSET ADDRESS | a. WRITE FLAG | b. READ FLAG | c. NO REFERENCE FLAG (=a-b) |
|---|---|---|---|
| 0000H | 1 | 1 | 0 |
| 0001H | 1 | 1 | 0 |
| 0002H | 1 | 1 | 0 |
| 0003H | 1 | 1 | 0 |
| 0004H | 1 | 0 | 1 |
| 0005H | 1 | 0 | 1 |
| 0006H | 1 | 0 | 1 |
| 0007H | 1 | 0 | 1 |
| - - - | - - - | - - - | - - - |
| 00FCH | 1 | 1 | 0 |
| 00FDH | 1 | 1 | 0 |
| 00FEH | 1 | 1 | 0 |
| 00FFH | 1 | 1 | 0 |
| (TOTAL) | 256 | 252 | 4 |

WHEN DETECTING 4 BYTE WRITE IN ADDRESS 004H TO 007H AGAIN

FIG. 56

| CTB1 | TRANSFER MONITOR AREA 1 | | | |
|---|---|---|---|---|
| CTB2 | MONITOR TARGET DEVICE = SEMICONDUCTOR DEVICE 2-3 (ID3) | | | |
| CTB3 | BASE ADDRESS OF PHYSICAL ADDRESS = 10000H | BASE ADDRESS OF LOGICAL ADDRESS = 30000H | | |
| CTB4 | AREA SIZE (BYTE) =256 | | | |
| CTB5 | BYTE PER A FLAG = 1 | | | |
| CTB6 | FIRST WRITE TIME = id3mtw4 | | | |
| CTB7 | LAST WRITE TIME = id3mtw260 | | | |
| CTB8 | FIRST READ TIME = id3mtr4 | | | |
| CTB9 | LAST READ TIME = id3mtr260 | | | |

| | OFFSET ADDRESS | a. WRITE FLAG | b. READ FLAG | c. NO REFERENCE FLAG (=a-b) |
|---|---|---|---|---|
| | 0000H | 1 | 1 | 0 |
| | 0001H | 1 | 1 | 0 |
| | 0002H | 1 | 1 | 0 |
| | 0003H | 1 | 1 | 0 |
| | 0004H | 1 | 1 | 0 |
| | 0005H | 1 | 1 | 0 |
| CTB10 | 0006H | 1 | 1 | 0 |
| | 0007H | 1 | 1 | 0 |
| | --- | --- | --- | --- |
| | 00FCH | 1 | 1 | 0 |
| | 00FDH | 1 | 1 | 0 |
| | 00FEH | 1 | 1 | 0 |
| | 00FFH | 1 | 1 | 0 |
| | (TOTAL) | 256 | 256 | 0 |

WHEN DETECTING READ TRANSFER IN ALL ADDRESS AGAIN

SEMICONDUCTOR DEVICE AND SYSTEMS USING THE SAME

CROSS-REFERENCE TO RELATED APPLICATIONS

The disclosure of Japanese Patent Application No. 2018-205515 filed on Oct. 31, 2018 including the specification, drawings and abstract is incorporated herein by reference in its entirety.

BACKGROUND

The present disclosure relates to a semiconductor device and a system using the same, and more particularly, to a semiconductor device including a plurality of masters and capable of executing a plurality of tasks in real time and a system using the same.

As a semiconductor device, a microprocessor (hereinafter, referred to as a processor), a direct memory access controller (hereinafter, referred to as a DMA controller), and a memory-mounted semiconductor device are known. Such a semiconductor device is used, for example, in Factory Automation networking systems. When the processor executes a predetermined process in accordance with a program, the processor outputs an address signal, which is hereinafter collectively referred to as an address signal, for transmitting address information and transfer control information, to access a memory or a peripheral circuit. Like the processor, the DMA controller outputs an address signal to access the memory or peripheral circuits. In this case, the processor and DMA controller may be considered as a master that accesses the memory and peripheral circuits, and the accessed memory or peripheral circuits may be considered as slaves.

In a network system, it is desired to improve the performance of the entire system (hereinafter, in this specification, both the real-time performance (ability to cope with more stringent timing constraints) and the throughput performance (data transfer rate, computation capability) are collectively referred to as performance) while suppressing power consumption. As an effective measure for this purpose, it is considered that the number of processors and/or DMA controllers mounted on one semiconductor device is increased, and the processes are operated in parallel in real time.

Techniques relating to real time are described in, for example, in Japanese unexamined Patent Application publication No. 2002-49497 (hereinafter, Patent Document 1), Japanese unexamined Patent Application publication No. 2004-220093 (hereinafter Patent Document 2) and International Publication No. 2008/023426 (hereinafter Patent Document 3).

SUMMARY

In order to perform a plurality of processes in real time, a real-time operating system (hereinafter, referred to as a RTOS) is executed by a processor, and application programs (hereinafter, referred to as applications) corresponding to the processes are executed on a RTOS. In this instance, the application is divided into a plurality of tasks, and the application is executed by executing the plurality of tasks while switching the tasks by the RTOS. For RTOS, task switching (task switching) takes time. Techniques for speeding up this task switch include a wafer RTOS (hereinafter referred to as a HW-RTOS) that realizes RTOS in hardware, for example, as described in Patent Document 3.

The inventors of the present invention have examined methods for shortening the task switch time and improving the real-time performance by employing the HW-RTOS, and further improving the real-time performance from a viewpoint other than the task switch.

A task may be executed once its input data is determined. However, a task scheduler (hereinafter also referred to as a schedule device) that schedules tasks cannot preferentially execute tasks for which input data has been determined when the order of determination of input data is difficult to predict in a plurality of tasks. As a result, the performance of the entire system is degraded.

When the semiconductor device includes a plurality of masters, the scheduling device assigns tasks to the masters and causes the masters to execute the tasks in parallel. However, when the number of masters is small compared to the number of tasks that can be executed in parallel, the number of tasks that can be executed in parallel in the same time zone in the semiconductor device is limited by the number of masters, so that the performance of the entire system is degraded.

Patent Document 1 describes a method of interrupting the processing of a task and switching the task when a predetermined time has elapsed, and a method of switching the task by interrupting the processing by itself, for example, triggered by a frame break. In either of these methods, it is necessary to suspend the task of inputting and outputting data in order to evaluate the current state of the input/output systems of a plurality of processes for each task, and the occurrence of the interruption time causes a deterioration of the real-time performance.

Patent Document 2 discloses a technique in which a FIFO (First In First Out) type storage means is provided in an input/output section of data, and data is supplied to tasks via a FIFO type storage means. Since the FIFO type storage means needs to sequentially fetch the data from the first input data, when the FIFO type storage means is used as the input/output unit of the data, the tasks cannot directly read the input data in a random order and/or write the direct output data in a random order. For example, when the input/output data must be compressed/decompressed in a certain task, the data stored in the FIFO type storage means must be copied to a memory area which can be accessed randomly separately, then the data must be compressed/decompressed, and the output data must be stored in the FIFO type storage means. The occurrence of these copy times results in a lowering of real-time performance. Further, since the FIFO type storage means needs to sequentially fetch the data from the first input data, when the FIFO type storage means is used as the input/output unit of the data, it is impossible to change the priorities for processing a part of the data staying in the FIFO type storage means in real time. For example, when output data of a task executed by a certain device is used as input data of a task executed by a device at another location via a communication path, an input/output buffer having a size (data capacity) capable of absorbing a data amount (differential data amount) obtained by time integration of a difference between a transfer rate (input/output data amount per unit time) of input/output data that can be processed by a device executing each task (input/output data amount per unit time) and a transfer rate (transfer data amount per unit time) limited by the communication path needs to be provided between a device executing each task and the communication path. When the FIFO type storage means is used as the input/output buffers, the priority of processing a part of the data retained in the FIFO type storage means cannot be changed so as to be higher within the time retained in the FIFO type storage means and the data can be processed preferentially, so that the real-time performance deteriorates.

Further, in any of Patent Documents 1 and 2, the performance degradation in the case where the number of masters is small is not recognized as compared with the task which can be executed in parallel. Similarly, in Patent Document 3 describing the HW-RTOS, it is not recognized that the performance lowering occurs when the number of masters is small compared to tasks that can be executed in parallel.

Other objects and novel features will become apparent from the description of this specification and the accompanying drawings.

The semiconductor device according to one embodiment is as follows.

That is, the semiconductor device includes a plurality of first masters, a scheduling device connected to the plurality of first masters for controlling the plurality of first masters to execute a plurality of tasks in real time, a memory accessed by the plurality of first masters to store data by executing the tasks, and access monitor circuits for monitoring access to the memory by the plurality of first masters. When an access to the memory is detected by the access monitor circuit, the data stored in the memory is transferred based on the destination information of the data stored in the memory.

In one embodiment, networks provide systems with a plurality of semiconductor device connected to each other. In such systems, each of the plurality of semiconductor device's comprises a plurality of masters, a scheduling device connected to the plurality of masters for controlling the plurality of masters to execute the plurality of tasks in real time, a memory accessed by the plurality of masters to store data by executing the tasks, and access monitor circuits for monitoring access to the memory by the plurality of masters. In the first semiconductor device of the plurality of semiconductor device, when access to the memory is detected by the access monitor, the data stored in the memory is transferred to the second semiconductor device of memory specified by the destination data in the plurality of semiconductor device.

According to one embodiment, a semiconductor device capable of suppressing performance degradation and systems using the same can be provided.

BRIEF DESCRIPTION OF THE DRAWINGS

FIGS. 3A to C are flow charts illustrating the operation of a semiconductor device related to a first embodiment.

FIGS. 4A to C are flow charts illustrating the operation of a semiconductor device related to a first embodiment.

FIG. 6 is a diagram illustrates the allocation of semiconductor device memories related to first embodiment.

FIG. 7 is a diagram illustrates the allocation of semiconductor device memories related to first embodiment.

FIG. 8 is for explaining the memory address area of the semiconductor device related to first embodiment.

FIG. 9 is for explaining the memory address area of the semiconductor device related to first embodiment.

FIG. 10 is for explaining the memory address area of the semiconductor device related to first embodiment.

FIG. 11 is for explaining the memory address area of the semiconductor device related to first embodiment.

FIG. 12 is the configuration of the task I/O data control register for first embodiment.

FIG. 13 is the configuration of the task I/O data control register for first embodiment.

FIG. 14 is the configuration of the task I/O data control register for first embodiment.

FIG. 15 is the configuration of the task I/O data control register for first embodiment.

FIG. 22 is for explaining the memory address area of the semiconductor device related to first embodiment.

FIG. 23 is for explaining the memory address area of the semiconductor device related to first embodiment.

FIG. 24 is for explaining the memory address area of the semiconductor device related to first embodiment.

FIG. 25 is for explaining the memory address area of the semiconductor device related to first embodiment.

FIG. 26 is the configuration of the task I/O data control register of the semiconductor device related to first embodiment.

FIG. 27 is the configuration of the task I/O data control register of the semiconductor device related to first embodiment.

FIG. 28 is the configuration of the task I/O data control register of the semiconductor device related to first embodiment.

FIG. 29 is the configuration of the task I/O data control register of the semiconductor device related to first embodiment.

FIG. 35 is a diagram for explaining the control table related to first embodiment.

FIG. 36 is a diagram for explaining the control table related to first embodiment.

FIG. 37 is a diagram for explaining the control table related to first embodiment.

FIG. 38 is a diagram for explaining the control table related to first embodiment.

FIG. 39 is a diagram for explaining the control table related to first embodiment.

FIG. 40 is a diagram for explaining the control table related to first embodiment.

FIG. 41 is a diagram for explaining the control table related to first embodiment.

FIG. 42 is a diagram for explaining the control table related to first embodiment.

FIG. 43 is a diagram for explaining the control table related to first embodiment.

FIG. 44 is a diagram for explaining the control table related to first embodiment.

FIG. 45 is a diagram for explaining the control table related to first embodiment.

FIG. 46 is a diagram for explaining the control table related to first embodiment.

FIG. 47 is a diagram for explaining the control table related to first embodiment.

FIG. 48 is a diagram for explaining the control table related to first embodiment.

FIG. 49 is a diagram for explaining the control table related to first embodiment.

FIG. 50 is a diagram for explaining the control table related to first embodiment.

FIG. 51 is a diagram for explaining the control table related to first embodiment.

FIG. 52 is a diagram for explaining the control table related to first embodiment.

FIG. 53 is a diagram for explaining the control table related to first embodiment.

FIG. 54 is a diagram for explaining the control table related to first embodiment.

FIG. 55 is a diagram for explaining the control table related to first embodiment.

FIG. 56 is a diagram for explaining the control table related to first embodiment.

DETAILED DESCRIPTION

Figure 1:
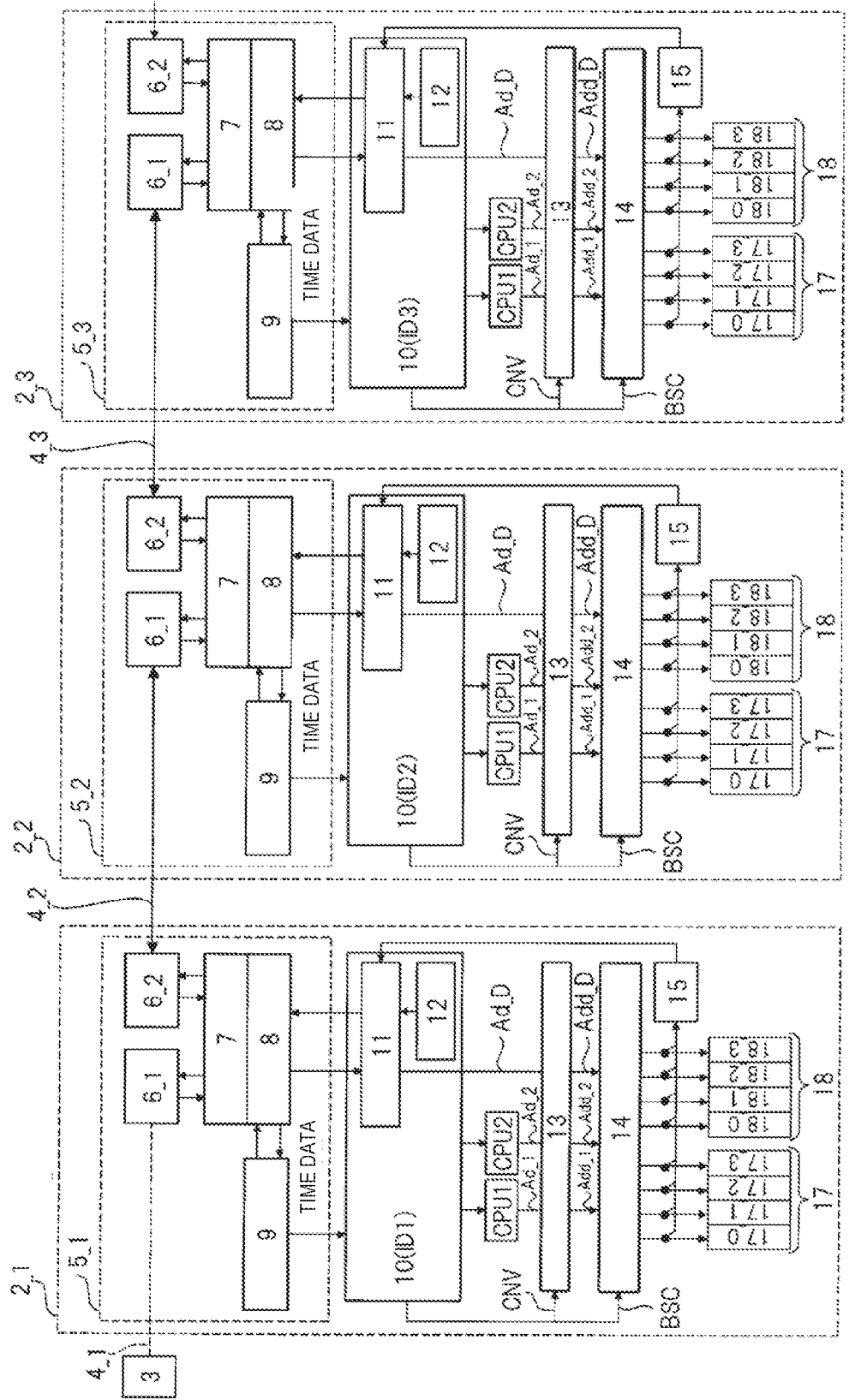
FIG. 1 is a block diagram showing the semiconductor device of the first embodiment and the configuration of the system using it.

Embodiments of the present invention will be described below with reference to the drawings. It is to be noted that the disclosure is merely an example, and those skilled in the art can easily conceive of appropriate changes while maintaining the gist of the invention are naturally included in the scope of the invention. In addition, although the drawings may schematically represent the width, thickness, shape, and the like of each portion as compared with actual embodiments for the sake of clarity of explanation, the drawings are merely an example and do not limit the interpretation of the present invention.

In this specification and each drawing, the same reference numerals are assigned to the same elements as those described above with reference to the preceding drawings, and detailed description thereof may be omitted as appropriate.

First Embodiment

In the first embodiment, a plurality of tasks constituting an application are distributed to a plurality of semiconductor device connected to networks, and tasks assigned to each semiconductor device are executed in real time. This makes it possible to suppress performance degradation. For ease of understanding, a case where a plurality of tasks are executed in one semiconductor device without distributing the tasks will be described first as a comparative example.

As an application, a program that performs a predetermined calculation on a frame received via a network and transmits the frame on which the predetermined calculation is performed via the network will be described as an example. The predetermined operation performed is of two types: a first operation and a second operation. The first operation is composed of a filter operation for performing an operation between two pieces of data and an output operation for performing an output operation on the result of the filter operation. The second operation is a filter operation for performing an operation between an input operation performed on data and two input operation results.

Figure 61:
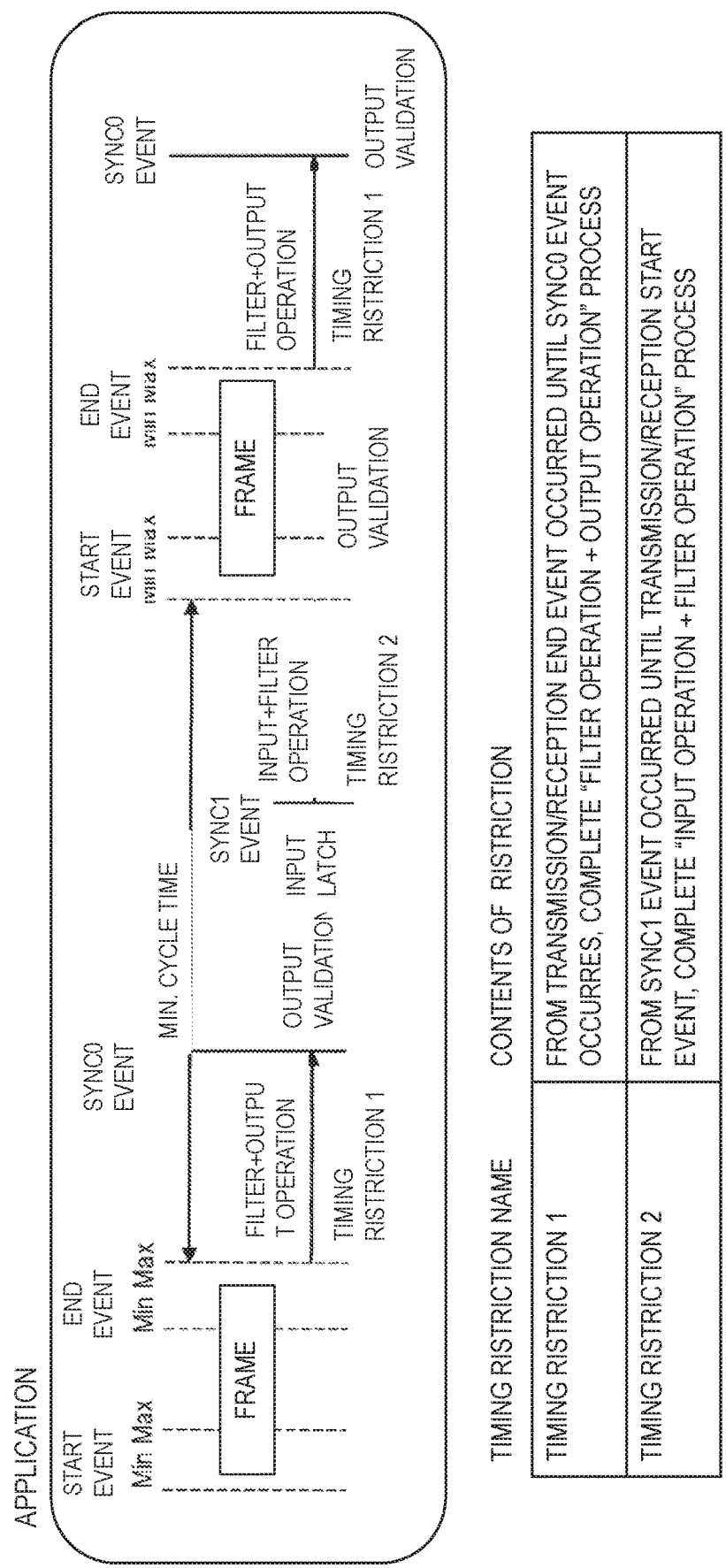
FIG. 61 is a diagram illustrating an operation timing when an application is executed as a comparative example

An operation when this application is executed by one semiconductor device will be described with reference to FIG. 61. In FIG. 61, on the upper side of the drawing, an operation timing diagram for executing an application is shown. The lower part of FIG. 61 shows timing constraints to be satisfied when this application is executed.

On the upper side of the drawing of FIG. 61, semiconductor device starts transmission and reception of a frame at a timing between the minimum time Min and the maximum time Max of a transmission/reception start event, and completes transmission and reception of a frame at a timing between the minimum time Min and the maximum time Max of a transmission/reception end event. In FIG. 61, between a transmission/reception start event and a transmission/reception end event shown on the left side, a frame 1 (referred to as a frame in FIG. 61) is received by the semiconductor device and stored in the communication buffer 0 in the semiconductor device. The data stored in the communication buffers are subjected to the first calculation described above, and the data is outputted to the outside of the semiconductor device in synchronization with the SYNC0 events. On the other hand, the data inputted to the semiconductor device in synchronization with the SYNC1 events is subjected to the above-described second calculation, and the data is stored in the communication buffer 1. The data stored in the communication buffer 1 is converted into a frame 2 between the transmission/reception start event and the transmission/reception end event shown on the right side and transmitted. The transmitted frame 2 is received by an external device connected to the network, and a predetermined calculation is performed in the same manner as the frame 1.

As shown in FIG. 61, the minimum cycle time allowed for this application is a period between the maximum time Max of the transmission/reception end event and the minimum time Min of the transmission/reception start event. The semiconductor device performs a plurality of tasks that constitute the application during this minimal cycle time. In FIG. 61, three tasks configuring an application are shown. That is, the first task is activated by the transmission/reception end event, the second task is activated by the SYNC1 event, and the third task is activated by the transmission/reception end event in the same manner as the first task. Here, the first task is a task of copying data stored in the communication buffer 0 to the operation buffer 0 and performing a predetermined operation (filter operation+output operation). The second task is a task for performing a predetermined operation (input operation+filter operation) on data input to the semiconductor device, and copying the data to the communication buffers 1. The third task is a task for monitoring that a transmission/reception start event does not occur and that a transmission/reception end event does not occur between the start of the first task and the end of the second task.

The first to third tasks constituting the application have timing constraints. Only the timing constraints 1 and 2 of the first and second tasks will be described.

The first task is required to finish executing the task during the interval between the transmission/reception finish event and the SYNC0 event. That is, the execution time of the first task is required to be the same as or shorter than the execution time of the first task between the transmission/reception end event and the SYNC0 event. Looking at the timings of the SYNC0 events, it is required that the outputs of the first tasks are valid before this SYNC0 event occurs. Similarly, the second task is required to be executed in the same time as or shorter than the time between the SYNC1 event and the transmission/reception initiation event, and the second task is required to be executed in the same time as or shorter than the time between the transmission/reception initiation event and the transmission/reception initiation event.

If the first task is not completed by, for example, the SYNC0 event, the device connected to the outside of the semiconductor device cannot receive the data outputted by the semiconductor device in synchronization with the SYNC0 event, and the first task malfunctions. Similarly, if the second task is not completed before the transmission/reception initiation event, the external device connected to the semiconductor device through the network cannot receive the data inputted by the semiconductor device and malfunctions. That is, the first task has a timing constraint of completing the process before the SYNC0 event occurs. Similarly, the second task has a timing constraint 2 of completing the processing before the occurrence of the transmission/reception start event.

Figure 62:
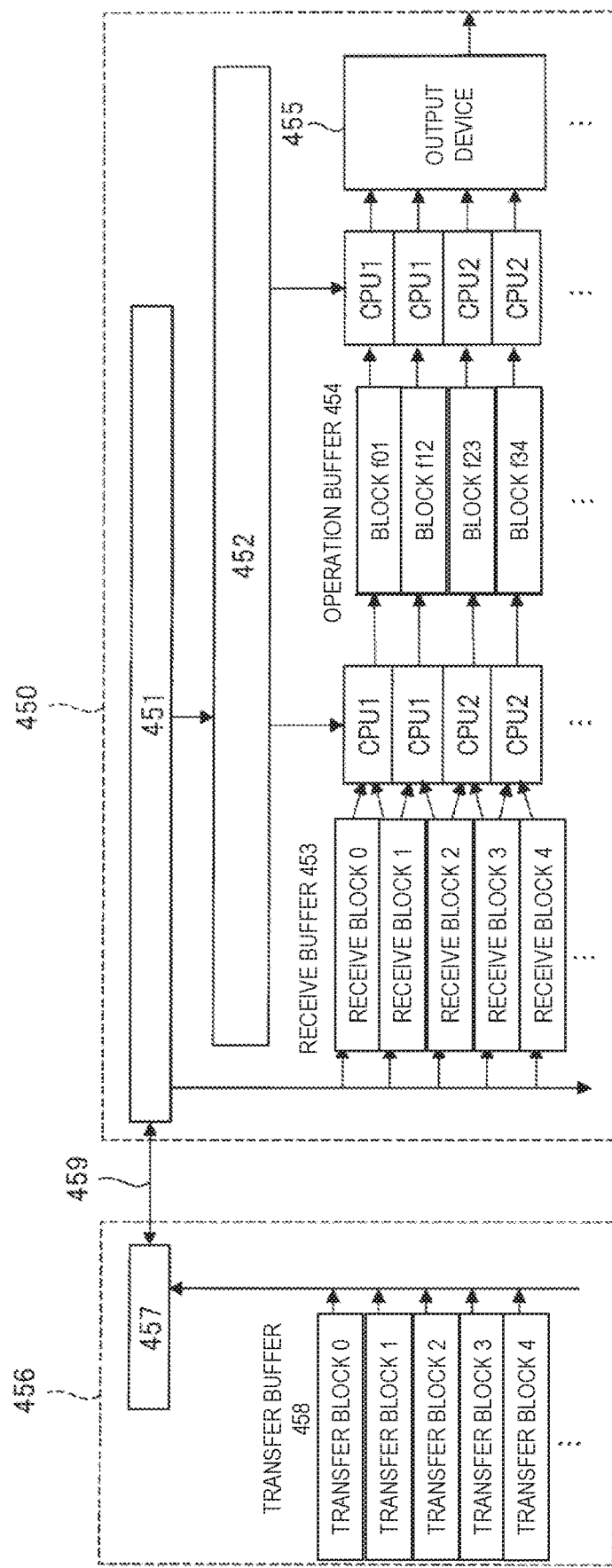
FIG. 62 is a schematic configuration of a semiconductor device related to a comparative example.

FIG. 62 shows a schematic configuration of a semiconductor device according to a comparative example. FIG. 62 shows a schematic configuration of the semiconductor device 450 of the comparative embodiment and a flow of data when the first operation is performed.

Frames are transmitted from the data-transmitting device 456 to the semiconductor device 450 via networks 459. The frame is composed of a plurality of transmission blocks, in this figure, transmission blocks 0 to 4. The transmission blocks 0 to 4 stored in the transmission buffers 458 are transmitted to the networks 459 as frames by the communication device 457.

The semiconductor device 450 includes a communication device 451, a scheduling device 452, two processors CPU1, a CPU2, a receive buffer 453, an arithmetic buffer 454, and an output device 455. The communication device 451 receives frames supplied via networks 459. The communication device 451 includes a DMA controller, and the DMA controller transfers the frame from the communication device 451 to the reception buffers 453 as reception blocks 0 to 4.

The processor CPU1 performs a filter operation between the receiving block 0 and the receiving block 1, and performs a filter operation between the receiving block 1 and the receiving block 2. Similarly, the processor CPU2 performs a filter operation between the receiving block 2 and the receiving block 3, and performs a filter operation between the receiving block 3 and the receiving block 4. The results of the filter operations performed by the processors CPU1 and CPU2 are stored in the operation buffers 454 as blocks f 01, f 12, f 23, and f 34. The processors CPU1 and CPU2 perform the output operation on the blocks f 01, f 12, f 23, and f 34, which are the results of the filter operation, and output them via the output device 455.

Figure 63:
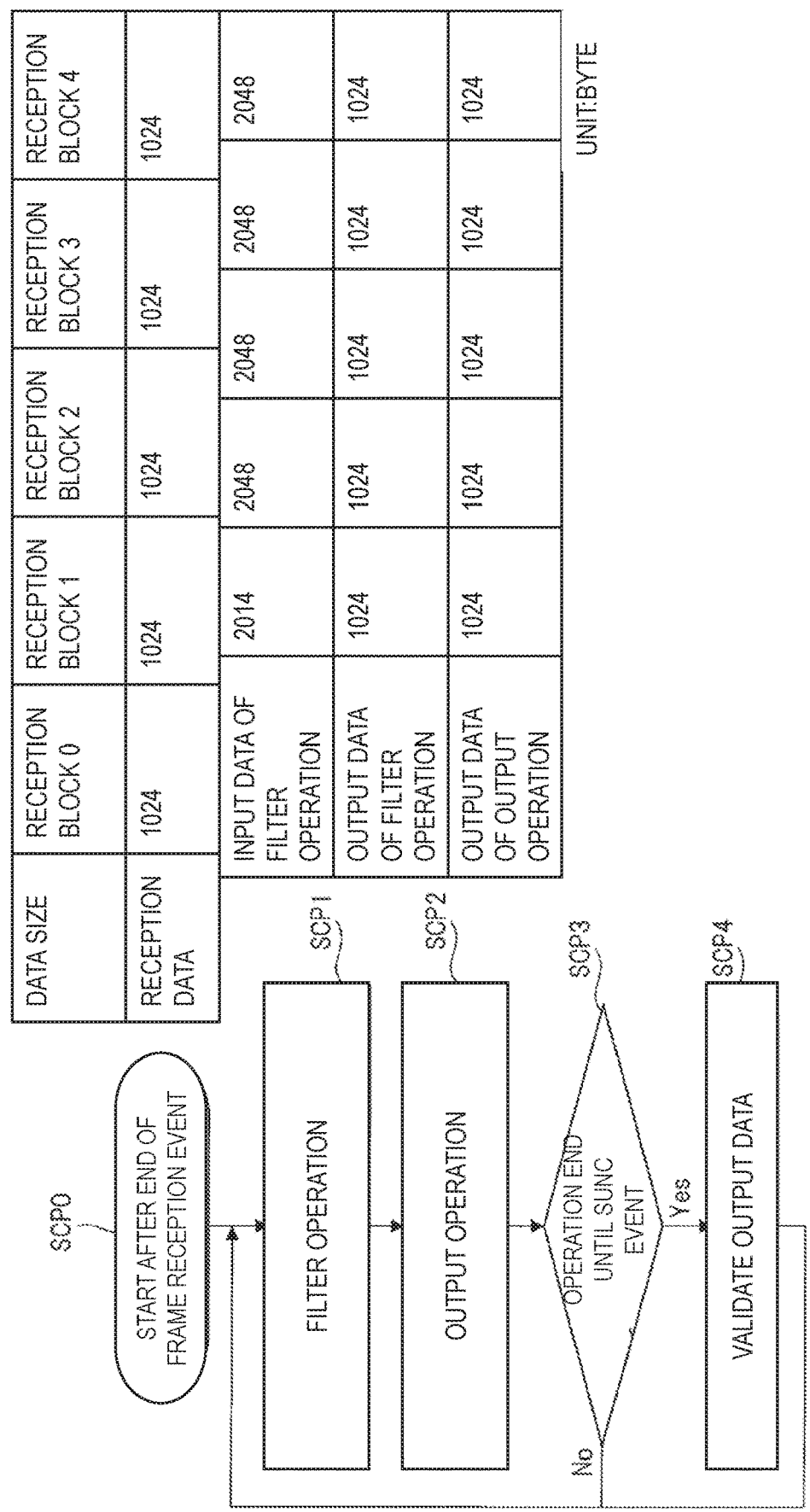
FIG. 63 is an outline of the operation of the semiconductor device related to the comparative examples.

A semiconductor device 450 operation scheduling device 452 assigns the first task described above to the processor CPU1 and CPU2 to cause the processor to perform the first operation. FIG. 63 is a diagram showing an outline of the operation of the semiconductor device 450. In FIG. 63, a flow chart showing the operation of the semiconductor device 450 is shown on the left side of the drawing. On the right side of the drawing, changes in the amount of data due to the first calculation are shown. Here, the sizes of the reception blocks 0 to 4 are assumed to be 1024 bytes (1 K bytes).

When a frame is received in the receive buffers 453, the scheduling device 452 detects frame receive termination events and operates the processors CPU1 and CPU2 in step SCP0. At this time, the reception buffer 453 stores the reception blocks 0 to 4. In step SCP1, the processors CPU1 and CPU2 perform filter operations. That is, the processors CPU1 and CPU2 perform the filter operation by inputting the reception data of two consecutive reception blocks. At this time, the data inputted to the processors CPU1 and CPU2 are the size 2 K bytes corresponding to the two reception blocks. The size of the output data resulting from the filter operation obtained by performing the filter operation is the size of the output data in 1 K bytes.

Next, in step SCP2, the processors CPU1 and CPU2 perform an outputting operation. That is, the processors CPU1 and CPU2 perform the output operation using the output data, which is the result of the filter operation, as input data. The size of the output data of the output operation as a result of the output operation is the size of 1 K bytes.

In step SCP3, the scheduling device 452 determines whether or not the operation to be executed has been completed by the SYNC 0 event, and if the operation to be executed has been completed, the output device 455 is controlled so as to validate the output data. On the other hand, when the operation to be executed is not completed, the process returns to step SCP1, and step SCP1-SCP3 is repeated until the operation to be executed is completed.

In the SCP0 of steps, all of the reception data of the reception blocks 0 to 4 are stored in the reception buffers 453, so that four first operations can be executed in parallel temporally. That is, the four first tasks can be executed in parallel in time. However, the semiconductor device 452 is provided with fewer than four tasks that can be executed in parallel, two processors CPU1 and CPU2. As a result, it becomes difficult to execute the first operation so as to satisfy the above-mentioned timing constraint 1.

Figure 64:
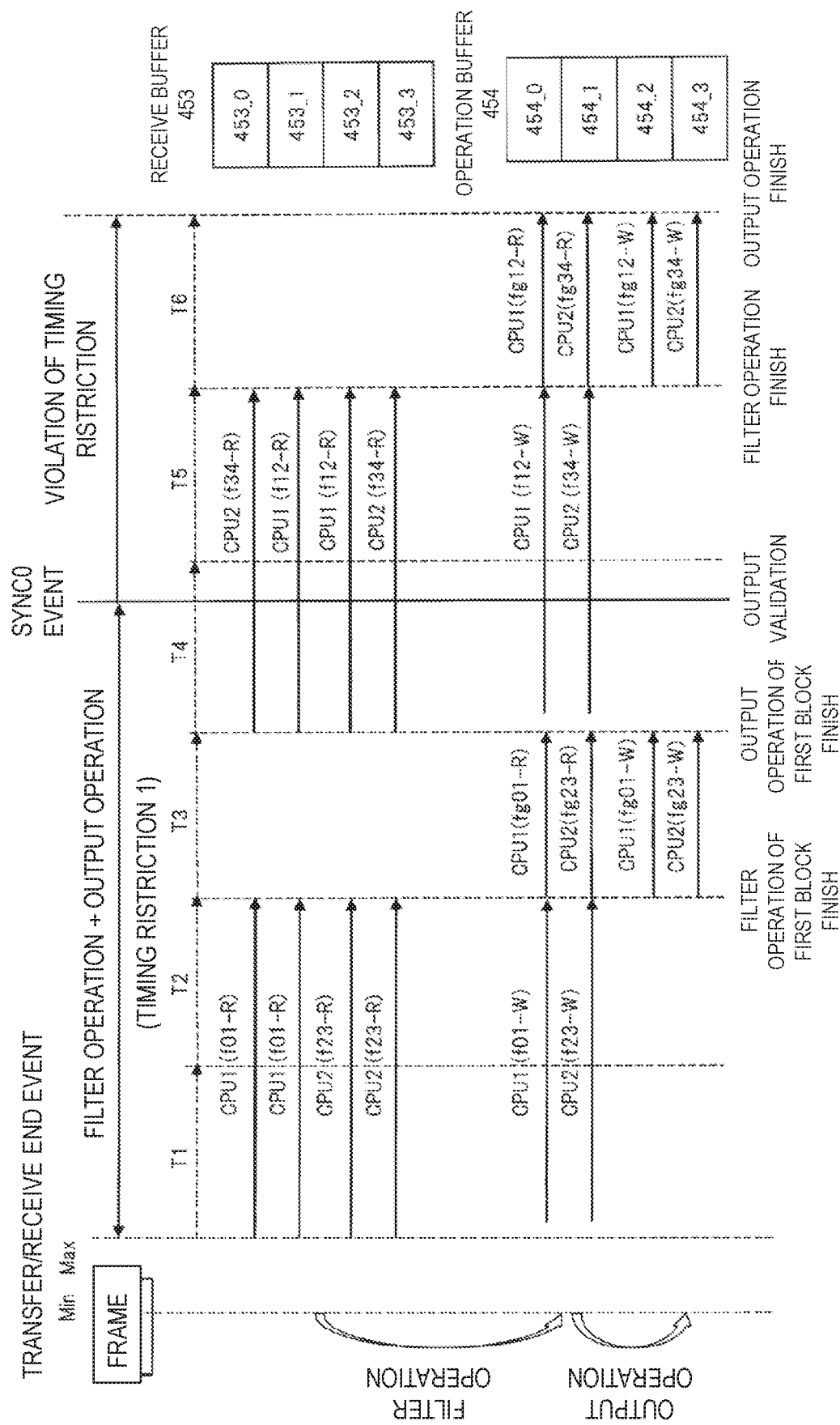
FIG. 64 is an operation timing diagram of the semiconductor device as a comparative example.

FIG. 64 is a timing chart when the first calculation is performed on the received data of the receiving blocks 0 to 4 by the semiconductor device 450. This figure is similar to the operation timing diagram shown on the upper side of the drawing in FIG. 61, but the operation of the processor CPU1 and the CPU2 are shown in detail in FIG. 64. In the figure, the reception buffer 453 is divided into four bankways 453_0 to 453_3, and the operation buffer 454 is also divided into four bankways 454_0 to 454_3.

Here, the code rule assigned to the processor used in FIG. 64 will be described. In the drawings to be described later, reference numerals are assigned in accordance with the rules described herein.

In the sign shown in the parenthesis after the sign of the processor, the sign f or fg shown on the left indicates the operation performed by the processor. That is, the symbol f indicates the filter operation, and the symbol fg indicates the outputting operation. Two numbers to the right of the symbol f or fg indicate the number of the target block. Further, a symbol R on the right side of the symbol – indicates a read operation, and a symbol W indicates a write operation of an operation and an operation result.

In FIG. 64, the operations of the processors CPU1 and CPU2 and the bank ways to be read and written caused by the operations are depicted in the same row.

For example, the symbol CPU1(f01-R) indicates that the processor CPU1 performs the operation of reading the reception block 0 and the reception block 1 from the bankways 453_0 and 453_1 of the reception buffers 453 for the filter operation. CPU1(f01-W) indicates that the processor CPU1 performs an operation of performing a filter operation between the reception block 0 and the reception block 1 and writing the result of the filter operation to the bank way 454_0 of the operation buffers 454.

The symbol CPU1(fg01-R) indicates that the processor CPU1 performs an operation of reading the result of the filter operation performed between the reception block 0 and the reception block 1 from the bankway 454_0 of the operation buffers 454 for the outputting operation. Further, CPU1 (fg01-W) indicates that the processor CPU1 performs an output operation on the result of the filter operation performed between the reception block 0 and the reception block 1, and writes the output operation to the bank way 454_2 of the operation buffer 454_0.

In the comparative embodiment, as shown in FIG. 64, in the periods T 1 and T 2, the processors CPU1 and CPU2 can read out the reception blocks 0 and 1 and the reception blocks 2 and 3, perform the filter operation, and read out the filter operation result, write it into the output operation and operation buffers 454 in the period T 3. That is, by assigning and executing the first tasks to the processors CPU1 and CPU2, respectively, the filter operation and the outputting operation for the head blocks in the frame can be executed. Thus, the results of the two power operations can be obtained before the SYNC0 events occur. However, until the filter operation and the output operation of the processors CPU1 and CPU2 for the first block are completed, the filter operation and the output operation based on the remaining blocks in the frame are not performed, and the operation for the remaining blocks will start from the time T 4. As a result, the calculation of the reception blocks constituting the frame is not performed in time before the SYNC events occur, and the timing constraint 1 is violated. In order to prevent violations of the timing constraint 1 from occurring, it is conceivable to slow down the generation of SYNC0 events, for example. Slowing the incidence of SYNC0 events will degrade the performance of the entire system.

FIG. 1 is a diagram showing a configuration of a semiconductor device related to first embodiment and a system using the same. In the figure, 1 illustrates a network system.

The network system 1 includes a data transmission device for transmitting data, a plurality of semiconductor device, and a network line connecting the data transmission device and a plurality of semiconductor device. To avoid complicating the drawing, it is illustrated that the network system comprises a data-transmitting device 3 and three semiconductor device 2_1 to 2_3. Of course, the number of the semiconductor device and the number of the data transmitting device included in the network system is not limited to this number.

Although not particularly limited, in the first embodiment, the data transmitting device 3 and the semiconductor device 2_1 to 2_3 are connected in a daisy chain manner. That is, the data transmitting device 3 and the semiconductor device 2_1 (first semiconductor device) are connected by the network transmission line 4_1, the semiconductor device 2_1 and the semiconductor device 2_2 (third semiconductor device) are connected by the network line 4_2, and the semiconductor device 2_2 and the semiconductor device 2_3 (second semiconductor device) are connected by the network line 4_3.

The transmission data transmitted from the data transmission device 3 to the network line 4_1 includes an identifier for specifying the semiconductor device to be received. Each of the semiconductor device 2_1 to 2_3 receives the transmission data when the identification information included in the transmission data matches the identification information specifying its own station. On the other hand, when the identification information included in the transmission data does not coincide with the identification information of the local station (when the identification information does not coincide), the supplied transmission data is transmitted to the semiconductor device of the next stage through the network line. For example, if the transmission data includes an identity that identifies semiconductor device 2_1, the transmission data is received by semiconductor device 2_1. On the other hand, when the identification information included in the transmission data does not coincide with the identification information of the semiconductor device 2_1, the semiconductor device 2_1 transmits the supplied transmission data to the semiconductor device 2_2 and 2_3 via the network line 4_2. In this way, the transmitted data will be received by the semiconductor device specified by the identity information contained in the transmitted data. The data transmission device 3 includes the identification information specifying all the semiconductor device 2_1 to 2_3 in the transmission data, so that all the semiconductor device 2_1 to 2_3 can receive the same transmission data.

When the semiconductor device 2_1 to 2_3 transmit data to the data transmission device 3 or another semiconductor device, the semiconductor device 2_1 to 2_3 transmit the data including the identification information specifying the semiconductor device to be received or the data transmission device 3. This allows the semiconductor device to transmit data to the data transmitting device 3 or other semiconductor device. In this instance, the semiconductor device that transmits the data transmits the data including the identification information that specifies the own station and the identification information. As a result, the data transmitting device 3 or other semiconductor device that has received the data can specify the semiconductor device that has transmitted the received data.

In the first embodiment, the semiconductor device 2_1 to 2_3 and the data-transmitting device 3 are connected in a daisy chain, but the present invention is not limited thereto. That is, a bus-shaped network connection or a ring-shaped network connection may be used in which the data transmitting device 3 and the data transmitting semiconductor device 2_1 to 2_3 are connected to one network transmission line. Alternatively, network lines may be provided radially from the data-transmitting device 3, and a semiconductor device may be connected to each network transmission line.

In the first embodiment, the semiconductor device 2_1 to 2_3 have similar configurations. Therefore, here, the entire configuration of the semiconductor device 2_1 to 2_3 will be described as representatives of the semiconductor device 2_1, and the differences will be described later.

The semiconductor device 2_1 includes a communication device 5_1, a scheduling device 10 (ID1), two processors CPU1 and CPU2, an address translation circuit 13, a bus switch 14, a monitor circuit (hereinafter, also referred to as a memory access monitor circuit) 15, and memories 17 and 18. The communication device 5_1 includes Ethernet PHY circuits (Ethernet PHY) 6_1 and 6_2, an Ethernet switch (Ethernet Switch) 7, an Ethernet MAC (Ethernet MAC) 8, and a timer 9.

The Ethernet PHY circuit 6_1 is an interface circuit connected between the network transmission line 4_1 and the Ethernet switch 7, and the Ethernet PHY circuit 6_2 is an interface circuit connected between the network line 4_2 and the Ethernet switch 7. The Ethernet switch 7 is a switch circuit for selectively connecting between the Ethernet PHY circuit 6_1 and the Ethernet MAC8, between the Ethernet PHY circuit 6_2 and the Ethernet MAC8, or between the Ethernet PHY circuits 6_1 and 6_2. The Ethernet MAC8 is supplied with identification information for specifying the semiconductor device 2_1 from the scheduling device 10 (ID1), although the identification information is not particularly limited. Here, the symbol ID1 indicates identification information (ID) for specifying the semiconductor device 2_1.

The Ethernet MAC8 is supplied with data from the Ethernet PHY circuits 6_1 and 6_2 via the Ethernet switch 7, and when the supplied data includes identification information that matches the identification information (ID1), the supplied data is supplied to the scheduling device 10 (ID). When the identification information included in the supplied data does not match the identification information ID1, the Ethernet switch 7 connects the Ethernet PHY circuits 6_1 and 6_2. Thus, when the data supplied to the semiconductor device 2_1 via the network transmission line 4_1 or 4_2 has identification information that matches the identification information (ID1), the supplied data is supplied to the scheduling device 10 (ID1). On the other hand, when the identification information included in the supplied data does not match the identification information (ID1), the data supplied from the network transmission line 4_1 is transmitted to the network line 4_2, and the data supplied from the network line 4_2 is transmitted to the network line 4_1.

The Ethernet MAC8 transmits data from the scheduling device (ID1) to the network transmission line 4_1 or 4_2. Although not particularly limited, the scheduling device 10 (ID1) supplies data to which the identification information (ID1) is added. The Ethernet MAC8 controls the Ethernet switch 7 so that data to be transmitted is supplied to the Ethernet PHY circuit 6_1 when transmitting data to the data transmitting device 3, and controls the Ethernet switch 7 so that data to be transmitted is supplied to the Ethernet PHY circuit 6_2 when transmitting data to the semiconductor device 2_2 or 2_3.

The Ethernet MAC8 further includes DMA controllers that function as masters. When data from the network transmission line 4_1 or 4_2 is transmitted to the scheduling device 10 (ID1) and when data is transmitted to the network line 4_1 or 4_2, data is transferred by the built-in DMA controller. The semiconductor device 2_1 includes two processors CPU1 and CPU2 as masters, and the DMA controller described above. In the following discussion, when distinguishing between masters, the processors CPU1 and CPU2 are referred to as first masters, and the DMA controllers are referred to as second masters.

The timer 9 is connected to the Circuit MAC8 and controls the semiconductor device 2_1 to 2_3 and the data-transmitting device 3 so that the time is the same. The time information synchronized between the semiconductor device 2_1 to 2_3 and the data transmitting device 3 is supplied from the timer 9 to the schedule device 10 (ID1), and the time information is the same between the schedule device in each of the semiconductor device 2_1 to 2_3.

The scheduling device 10 (ID1) includes a task input/output data control circuit 11 and a task input/output data control register 12. The scheduling control circuit 10 (ID1) is connected to the Ethernet MAC8, the processor CPU1, the CPU2, the address translation circuit 13, and the monitor circuit 15. The ID1 10 assigns tasks to the processors CPU1 and CPU2, and controls the processors CPU1 and CPU2 to execute the assigned tasks. The ID1 10 controls the DMA controller in the Ethernet MAC8. Since the input/output data control circuit 11 and the task input/output data control register 12 will be described later, they will not be described here.

The address conversion circuit 13 converts the address signals Ad_1, Ad_2, and Ad_D from the processors CPU1 and CPU2 and the task input/output data control circuit 11 based on the conversion information CNV from the scheduling device 10 (ID1), and outputs the converted address signals Add_1, Add_2, and Add_D to the bus switch 14.

The bus switch 14 is a 3 master/8 slave bus switch. The bus switches 14 change the connections between the three masters and the eight slaves according to the bus control data BSCs from the scheduling device 10 (ID1). The three masters here correspond to the DMA controllers in the processor CPU1, the CPU2 and the Ethernet MAC8, and the eight slaves correspond to the eight memory bankways constituting the memories 17 and 18.

The memory 17 is configured by four memory bankways 17_0 to 17_3, and the memory 18 is also configured by four memory bankways 18_0 to 18_3. That is, the address area of the memory is divided into four address areas, and the divided four address areas are the memory bankways 17_0 to 17_3. Similarly, the memory 18 is divided into four address areas, and the divided address areas are the memory bankways 18_0 to 18_3. Hereinafter, the memory bankway is also referred to as a bankway.

The bus switch 14 supplies the post-conversion address signal Add_1 from, for example, the processor CPU1 to the bank way 18_0, the post-conversion address signal Add_2 from the processor CPU2 to the bank way 18_1, and the post-conversion address signal Add_D from the DMA controller to the bank way 17_0 in accordance with the bus control information BSC. These bankways 18_0, 18_1 and 17_0 are read from or written to by the processor CPU1, the CPU2 and the DMA-controller. The scheduling device 10 (ID1) can arbitrarily switch the slaves corresponding to the masters according to the bus control data BSCs.

The monitor 15 monitors the post-conversion address signals Add_1, Add_2, and Add_D supplied from the bus switch 14 to the bank ways 17_0 to 17_3 and 18_0 to 18_3, and supplies the monitoring result to the scheduling device 10 (ID1). In this specification, the post-conversion address signal means both an address signal for specifying a specific address and a control signal (transfer control information) for instructing reading or writing to an address specified by the address signal.

The semiconductor device 2_2 includes identification information (ID2) that differs from the semiconductor device 2_1 as identification information for specifying the semiconductor device 2_2 by the scheduling device 10 (ID2). As a result, the communication device 5_2 in the semiconductor device 2_2 outputs data including the identification information (ID2) from the network transmission line to the scheduling device 10 (ID2). The data transmitted from the communication device 10 (ID2) to the network transmission line includes the identification information (ID2). Similarly, semiconductor device 2_3 has identification information (ID3) different from semiconductor device 2_1 and 2_2 as identification information specifying semiconductor device 2_3 by Schedule device 10 (ID3). As a result, the communication device 5_3 in the semiconductor device 2_3 outputs data including the identification information (ID3) from the network transmission line to the scheduling device 10 (ID3). The data transmitted from the communication device 10 (ID3) to the network transmission line includes the identification information (ID3).

Figure 2:
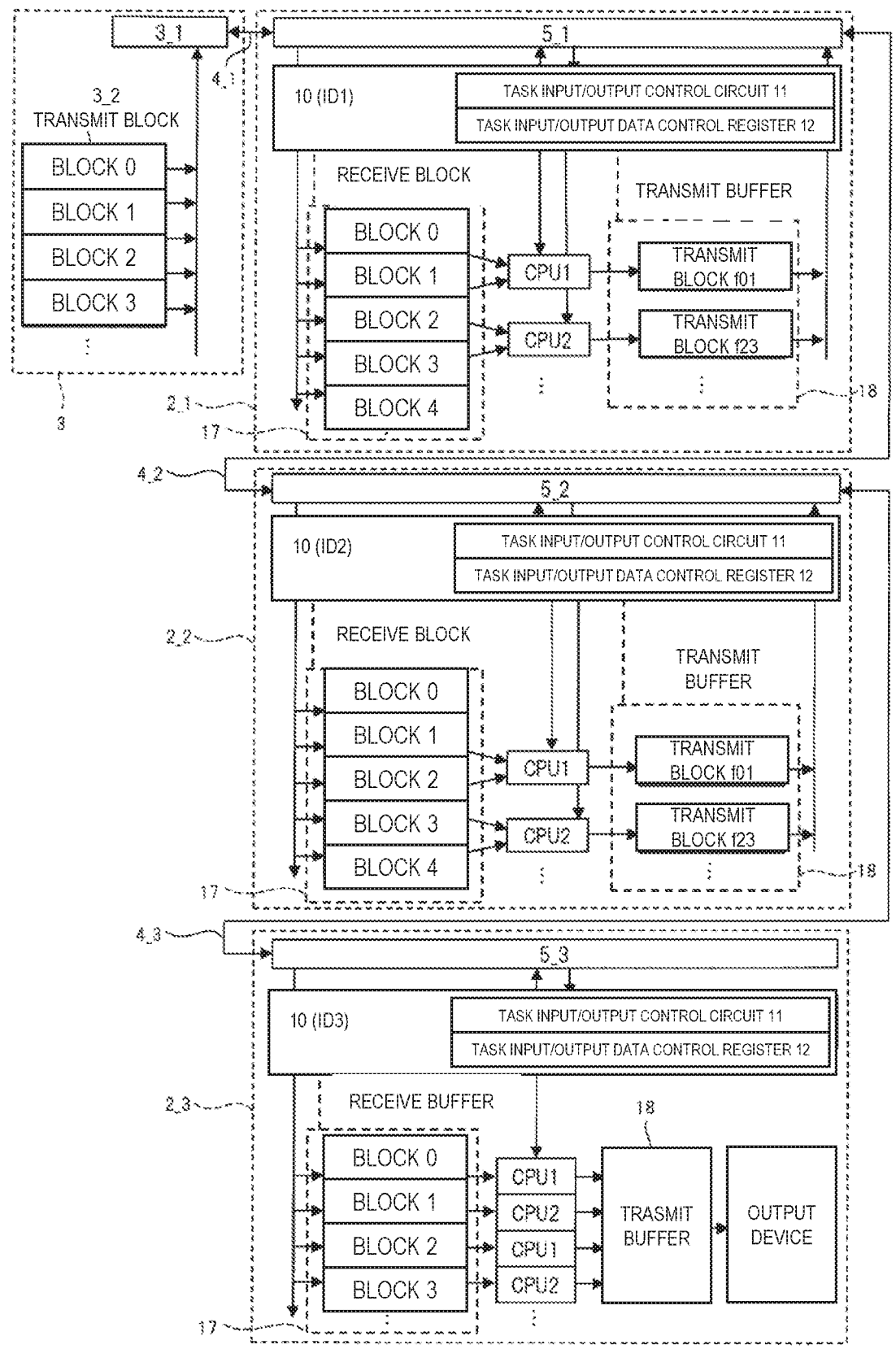
FIG. 2 is a diagram showing the flow of data in the semiconductor device and network systems related to first embodiment.

Similar to the comparative example, the operation of the semiconductor device 2_1 to 2_3 related to the first embodiment and the operation of the network system 1 will be outlined by taking an example in which operations are performed on the transmitting blocks 0 to 4 as an example. FIG. 2 is a diagram showing the flow of data in a semiconductor device and a network system related to the first embodiment. FIGS. 3 and 4 are flowcharts showing the operation of the semiconductor device related to the first embodiment. Here, FIGS. 3(A), (B) and (C) show the operation of semiconductor device 2_1 and 2_3, and FIGS. 4(A), (B) and (C) show the operation of semiconductor device 2_2 and 2_3.

As shown in FIG. 2, the data transmission device 3 includes a communication device 3_1 and transmission buffers 3_2. Similarly to the transmission buffer 458 shown in FIG. 62, the transmission blocks 0 to 4 are stored in the transmission buffer 3_2, and are transmitted to the network line 4_1 by the communication device 3_1.

Both semiconductor device 2_1 and 2_2 receive the transmission blocks 0 to 4 transmitted from the data transmission device 3. In the semiconductor device 2_1 and 2_2, the memory 17 is used as a receiving buffer, and the memory 18 is used as a transmitting buffer or an arithmetic buffer. In the semiconductor device 2_1, the DMA controller included in the communication device 5_1 transfers the received transmission blocks 0 to 4 as the reception blocks 0 to 4 to the memory 17, and stores the DMA controller in the reception buffer 17. Similarly, in the semiconductor device 2_2, DMA controllers built in the communication device 5_1 transfer the received transmission blocks 0 to 4 to the memories 17 as the reception blocks 0 to 4, and store the DMA controllers in the reception buffers 17.

In semiconductor device 2_1, the scheduling device 10 (ID1) controls the processors CPU1 and CPU2 so that a task for executing the filter operation A (task for filter operation A) is allocated to the processor CPU1 between the receiving blocks 0 and 1, and a task for executing the filter operation A between the receiving blocks 2 and 3 is allocated to the processor CPU2. On the other hand, in semiconductor device 2_2, the scheduling device 10 (ID2) controls the processors CPU1 and CPU2 such that a task for executing the filter operation B (task for filter operation B) between the receiving blocks 1 and 2 is allocated to the processor CPU1, and a task for filter operation B for executing the filter operation B between the receiving blocks 3 and 4 is allocated to the processor CPU2.

In semiconductor device 2_1 and 2_2, the monitor 15 monitors the writing of the received blocks to the memories 17. The semiconductor device 2_1 and 2_2 wait in steps S101 and S211 until the operation starts (steps S100 and S200 in FIGS. 3(A) and 4(A)), the reception blocks 0 to 4 constituting the frame are written in the memories 17, and the frame reception end events occur. When frame reception termination events occur, steps S102 (FIG. 3(A)) and S202 (FIG. 4(A)) are executed in semiconductor device 2_1 and 2_2. That is, tasks are started in semiconductor device 2_1 and 2_2.

In step S102, the processors CPU1 and CPU2 in the semiconductor device 2_1 execute the filter operation A using the reception data of two consecutive reception blocks as input data, and write the filter operation results as the transmission blocks f 01 and f 02 in the memories 18 serving as transmission buffers. Similarly, in step S202, the processors CPU1 and CPU2 in the semiconductor device 2_2 execute the filter operation B using the reception data of two consecutive reception blocks as input data, and write the result of the filter operation as the transmission blocks f 12 and f 34 in the memories 18 serving as transmission buffers.

In semiconductor device 2_1 and 2_2, the scheduling device 10 (ID1) and 10 (ID2) starts transmitting data stored in the memory 18, which is a transmission buffer, in steps S110 and S210 of FIGS. 3(B) and 4(B). That is, the scheduling device 10 (ID1) and 10 (ID2) monitor accesses to the memories 18 by the processors CPU1 and CPU2 by the monitor circuits 15. By monitoring, it is determined whether or not the size of the untransmitted data stored in the memory 18 has reached a predetermined threshold value (data amount). Here, the predetermined threshold is the size of data for one frame. When the size of the untransmitted data stored in the memory 18 reaches one frame, the process shifts from steps S111 and S211 to steps S112 (FIG. 3(B)) and S212 (FIG. 4(B)).

In the semiconductor device 2_1, in step S112, the DMA controller built in the communication device 5_1 transmits the operation result of the filter operation A stored in the memory 18 to the semiconductor device 2_3. Similarly, in step S212, the DMA controller included in the communication device 5_2 transmits the operation result of the filter operation B stored in the memory 18 to the semiconductor device 2_3 in step S212. That is, in each of the semiconductor device 2_1 and 2_2, when the untransmitted data reaches predetermined threshold values, the untransmitted data is automatically transmitted to the semiconductor device 2_3. In this instance, the semiconductor device 2_1 and 2_2 transmit the data including the identification information (ID3) specifying the semiconductor device 2_3 and the identification information (ID1 and ID2) of the semiconductor device 2_1 and 2_2 as the transmission sources.

In the semiconductor device 2_3, the scheduling device 10 (ID3) assigns tasks (task for output operation A and task for output operation B) for performing the output operation A and the output operation B using the operation results of the filter operations A and B as input data to the processors CPU1 and CPU2.

In the semiconductor device 2_3, the process starts in steps S310 (FIG. 3(C)) and 320 (FIG. 4(C)). That is, the scheduling device 10 (ID3) monitors accesses to the memories 17 constituting the reception buffers by using the monitor circuits 15. The scheduling device 10 (ID3) monitors the non-transmitted data transmitted from the semiconductor device 2_1 and 2_2 to the semiconductor device 2_3 as reception blocks f 01, f 12, f 23, and f 34 stored in the memories 17 constituting the reception buffers by the monitor circuits 15. By this monitoring, the semiconductor device 2_3 waits in steps S311 (FIG. 3(C)) and S321 (FIG. 4(C)) until the input data for one frame is stored.

When the input data for one frame is stored in the memory 17, in semiconductor device 2_3, the scheduling device 10 (ID3) starts the output operation A task and the output operation B task for the processors CPU1 and CPU2. That is, the scheduling device 10 (ID3) causes the processor CPU1 to execute the outputting operation A on the reception blocks f 01 and f 12 received from the semiconductor device 2_1. The scheduling device (ID3) causes the processor CPU2 to execute the outputting operation B on the reception blocks f 23 and f 34 received from the semiconductor device 2_2. The operation results fg01, the operation results fg23, the operation results fg12 and the operation results fg34 of the output operations A and B are written by the processors CPU1 and CPU2 into the memories 18 constituting the transmit buffers, and are supplied to the output device. Although not particularly limited, the outputting device transmits the supplied operation result to the data transmitting device 3.

In the semiconductor device 2_3, as shown in FIG. 3(C) and FIG. 4(C), in steps S313 and S323, it is determined whether or not the output operations A and B to be executed are completed before the SYNC0 events occur, and when the output operations A and B are not completed, the process returns to steps S311 and S321, and the steps are repeated. When the output operations A and B to be executed are completed, the output device is validated and the output data is validated in steps S314 and S324.

In this manner, in the first embodiment, the filter operations A and B are performed in parallel in the semiconductor device 2_1 and 2_2, and when the filter operation result exceeds a predetermined threshold, the identification information including the identification information of the semiconductor device 2_3 is automatically transmitted. In the semiconductor device 2_3, when the filter operation results from the semiconductor device 2_1 and 2_2 are stored in the reception buffers by the sizes required for executing the output operation, the task for the output operation A and the task for the output operation B are preferentially started.

That is, tasks exceeding the number of processors included in one semiconductor device are distributed and allocated to a plurality of semiconductor device. As a result, tasks exceeding the number of processors can be executed in parallel, and performance degradation can be suppressed.

Figure 5:
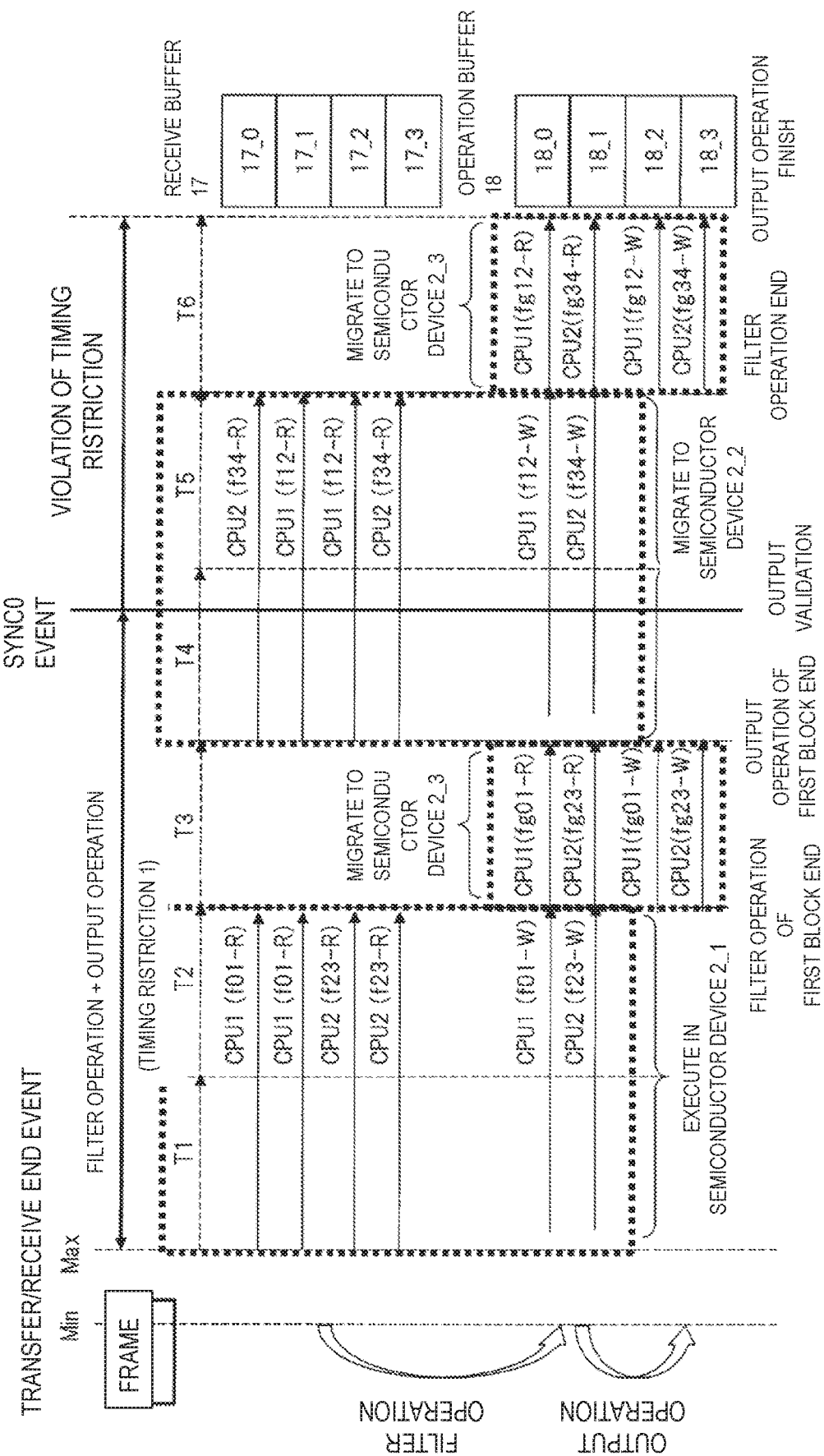
FIG. 5 is a timing diagram of a network system related to first embodiment.

FIG. 5 is a timing diagram of a network system related to first embodiment. FIG. 5 is similar to FIG. 64 described in Comparative Example 1. In FIG. 5, the memory 18 constituting the transmission buffer corresponds to the operation buffer shown in FIG. 64. In the first embodiment, as shown in FIG. 5, the operation related to the filter operation in the periods T 1 and T 2 is executed by the semiconductor device 2_1. The operation related to the filter operation in the periods T 4 and T 5 is shifted to the semiconductor device 2_2 and executed by the semiconductor device 2_2. Further, the operation related to the outputting operation in the periods T 3 and T 6 is shifted to the semiconductor device 2_3 and executed by the semiconductor device 2_3.

In the comparative examples, since the operation related to the filter operation executed in the periods T 4 and T 5 is shifted to the semiconductor device 2_2, the operation related to the filter operation can be executed in the periods T 1 and T 2 in the semiconductor device 2_2. In addition, in the comparative examples, since the operation related to the output operation executed in the periods T 3 and T 6 is shifted to the semiconductor device 2_3, the semiconductor device 2_3 can execute the operation related to the shifted output operation after the periods T 1 and T 2. This makes it possible to satisfy the timing constraint 1.

First, allocation of the memories 17 and 18 in the semiconductor device 2_1 to 2_3 will be described. FIGS. 6 and 7 are diagrams for explaining the allocation of memories of the semiconductor device related to the first embodiment. FIG. 6 shows the allocation of the memories 17 and 18 of semiconductor device 2_1 and 2_2, and FIG. 7 shows the allocation of the memories 17 and 18 of semiconductor device 2_3.

In semiconductor device 2_1 and 2_2, as shown in FIG. 6, the memories 17 are allocated to address areas of logical addresses 00000 H (H indicates hexadecimal notation; hereinafter, the same) to 0FFFFH. Each of the bankways 17_0 to 17_3 is allocated to the address area so as to have an address area of 1 KB. On the other hand, the memories 18 of the semiconductor device 2_1 and 2_2 are allocated to the address areas of the logical addresses 10000 H to 1FFFFH. Each of the bankways 18_0 to 18_3 is allocated to the address area so as to have an address area of 0.25 KB.

In the semiconductor device 2_3, as shown in FIG. 7, the memories 17 are allocated to address areas of logical addresses 00000 H to 0FFFFH, and the bankways 17_0 to 17_3 are allocated to the address areas so as to have address areas of 0.25 KB, respectively. On the other hand, the memories 18 of the semiconductor device 2_3 are allocated to the address areas of the logical addresses 10000 H to 1FFFFH, and the bankways 18_0 to 18_3 are allocated to the address areas so as to have address areas of 1 KB, respectively.

That is, in the semiconductor device 2_1 and 2_2, the bank way is switched in units of 1 KB in the memory 17 constituting the reception buffer, and the bank way is switched in units of 0.25 KB in the memory 18 constituting the transmission buffer. On the other hand, in the semiconductor device 2_3, in the memory 17 constituting the reception buffer, the bank way is switched in units of 0.25 KB, and in the memory 18 constituting the transmission buffer, the bank way is switched in units of 1 KB. (Memory address area of semiconductor device 2_1 and 2_2) FIGS. 8 to 11 are diagrams illustrating a memory address area of a semiconductor device related to a first embodiment. Here, FIG. 8 shows the address area of the memory 17 in the semiconductor device 2_1 corresponding to the task for the filter operation A, and FIG. 9 shows the address area of the memory 18 in the semiconductor device 2_1 corresponding to the task for the filter operation A. FIG. 10 shows an address area of the memory 17 in the semiconductor device 2_2 corresponding to the task for the filter operation B, and FIG. 11 shows an address area of the memory 18 in the semiconductor device 2_2 corresponding to the task for the filter operation B.

When the semiconductor device 2_1 receives the data from the data communication device 3, the communication device 5_1 writes the received data in the blocks 0 to 4 of the bankways 17_0 to 17_3 constituting the memories 17 of the semiconductor device 2_1, as shown in FIG. 8. The processor CPU1 of semiconductor device 2_1 reads the data stored in block 0 and block 1, and the processor CPU2 reads the data stored in blocks 2 and 3. The processor CPU1 executes the filter operation A between the data read from the block 0 and the data read from the block 1. Similarly, the processor CPU2 performs the filter operation A between the data read from the block 2 and the data read from the block 3. The data stored in the block 4 is data to be calculated in the following filter operation A.

The processor CPU1 of the semiconductor device 2_1 writes the operation result obtained by the filter operation A to the blocks 0 to 3 of the bankways 18_0 and 18_1 as shown in FIG. 9. On the other hand, the processor CPU2 writes the operation result obtained by the filter operation A to the blocks 4 to 7 of the bankways 18_2 and 18_3 as shown in FIG. 9. In the semiconductor device 2_1, the size of the block of the memory 17 is 1 KB, and the size of the block of the memory 18 is 0.25 KB.

FIG. 10 is similar to FIG. 8, and FIG. 11 is similar to FIG. 9. The communication device 5_2 in the semiconductor device 2_2 writes the received data into the blocks 0 to 4 in the bankways 17_0 to 17_3 of the memory 17, as shown in FIG. 10. The processor CPU1 of semiconductor device 2_2 reads the data from blocks 1 and 2 and performs the filter operation B. The processor CPU2 also reads the data from blocks 3 and 4 and performs the filter operation B. Again, the data stored in block 0 indicates data used in other operations.

The processor CPU1 of the semiconductor device 2_2 writes the operation result obtained by the filter operation B to the blocks 0 to 3 of the bankways 18_0 and 18_1 as shown in FIG. 11. On the other hand, the processor CPU2 writes the operation result obtained by the filter operation B in the blocks 4 to 7 of the bankways 18_2 and 18_3 as shown in FIG. 11. Also in the semiconductor device 2_2, the size of the block of the memory 17 is 1 KB, and the size of the block of the memory 18 is 0.25 KB.

In FIGS. 8 to 11, the address area is indicated by a physical address. Address signals from the processors CPU1 and CPU2 are converted into logical addresses by the address converter 13. The conversion at this time is performed in accordance with the conversion equation shown in FIGS. 8 to 11 (for example, in FIG. 8, the logical address of the block m=2000 H+400 H×m), and the physical address from the processor CPU1,CPU2 is converted into the logical address specifying the block.

FIGS. 12 to 15 are diagrams illustrating the configuration of the task input/output data control registers of the semiconductor device 2_1 and 2_2 related to the first embodiment. The task input/output data control register 12 includes a plurality of registers. That is, the task input/output data control register 12 includes a transfer monitor area 0 setting register: 700_0, a transfer monitor area 1 setting register: 700_1, a task input/output data transfer control register 0: 701_0, a task input/output data area 0 setting register: 702_0, a task input/output data area 1 setting register: 702_1, and a task start condition setting register 0: 703_0, where a symbol between a name and a symbol indicates a break. Here, FIGS. 12 and 13 illustrate a task input/output data control register 12 provided in semiconductor device 2_1 and show a state configured to perform the operation described in <Outline of Operation>. FIGS. 14 and 15 show the task input/output data control register 12 provided in the semiconductor device 2_2, which is set to perform the operation described in.

With the task input/output data control register 12 shown in FIGS. 12 and 13 as an example, each register constituting the task input/output data control register 12 will be described.

The transfer monitor area 0 setting register: 700_0 is a register for setting constraints on the block allocation order when the memory 17 constituting the reception buffer is used as a target memory and when an access to the target memory is detected or/and a task using the target memory as a task input/output data area is started. The transfer monitor area 1 setting register: 700_1 is a register for setting constraints on the block allocation order when the memory 18 constituting the transmission memory is set as the target memory and an access to the target memory is detected or/and a task using the target memory as a task input/output data area is started. When an access to the target memory is detected by the transfer monitor area 0 setting register: 700_0 and the transfer monitor area 1 setting register: 700_1, and/or when a task using the target memory as a task input/output data area is started, block allocation is performed as described in the respective "block allocation constraints of the target area". That is, in the memory 17, the blocks are allocated in order from the block 0 while switching the slaves in block units in order from the bankway 17_0. That is, it is set to select the slave from the bank way 17_0 in order, and to store the reception blocks from the reception block 0 in order. On the other hand, as described in "Block Allocation Constraints of the Target Area", the memory 18 is set so as to be different from the memory 17.

The transfer monitor area 0 setting register: 700_0 is set so that block allocation is automatically performed at the time of first writing (writing) to a block unallocated area in the memory 17 which is the target memory. On the other hand, automatic block allocation is not set in the transfer monitor area 1 setting register 700_1. The number of bytes per block of the target area of the transfer monitor area 0 setting register 700_0 is set to 1 KB (1024 bytes), and the number of bytes per block of the target area of the transfer monitor area 1 setting register 700_1 is set to 0.25 KB (256 bytes). In the transfer monitor area 0 setting register: 700_0 and the transfer monitor area 1 setting register: 700_1, the number of bytes per flag of the target area is set to 1. The flags will be described later with reference to FIGS. 35 to 56 and the like.

In the task input/output data transfer control register 0: 701_0, a read (read) detection area (transfer destination), a read task (transfer destination), a write detection area (transfer source), a write task (transfer source), the maximum number of transfer bytes per frame, a transfer start trigger 1 and a transfer start trigger 2 are set. Here, the transfer monitor area 0 of the semiconductor device 2_3 of the transfer destination is set in the read detecting area (transfer destination). That is, in the read detecting area (transfer destination), identification information specifying the semiconductor device 2_3 of the transfer destination and address information specifying the address area of the transfer monitor area 0 are set. A task for the output operation A, which is a task executed by the semiconductor device 2_3, is set as the read task (transfer destination).

The transfer monitor area 1 in the semiconductor device 2_1 is set as the write detecting area (transfer source). That is, in the write detecting area (transfer source), identification information specifying the semiconductor device 2_1 and address information specifying the address area of the transfer monitor area 1 are set. A task for filter operation A, which is a task executed in the semiconductor device 2_1, is set as a write task (source). The maximum number of transfer bytes per frame is set to 512. The transfer start trigger 1 is set when the task input/output data is equal to or more than the maximum number of transfer bytes per frame, and the transfer start trigger 2 is set when the write task ends or enters the pause state. The transfer start trigger 1 means that, in the semiconductor device 2_1, when the sum of the differences between the write transfer detection flag and the read transfer detection flag in the transfer monitor area 1, i.e., the memory 18, becomes equal to or larger than the maximum transfer byte count 512, the transfer is started.

In the task input/output data area 0 setting register 702_0 and the task input/output data area 1 setting register 702_1, the task to be input/output, the distinction of input/output (input or output), the input/output data area, the initial value of the automatic allocation block number at the time of task startup, and the number of automatic allocation blocks at the time of task startup are set. Since the task started in semiconductor device 2_1 is a task for filter operation A, a task for filter operation A is set as a task for performing input/output. The transfer monitor area 0 is set in the input/output data area of the task input/output data area 0 setting register 702_0, and the transfer monitor area 1 is set in the input/output data area of the task input/output data area 1 setting register 702_1. Since the target memory is the memory 17, the input of the transfer monitor area 0 is set as the distinction between the input and the output of the output data area 0 setting register 702_0. On the other hand, in the transfer monitor area 1, since the target memory is the memory 18, the output is set as the distinction between the input and the output of the output data area 1 setting register 702_1.

In addition, 0 is set as the initial value of the automatic allocation block number at the time of task startup in the task input/output data area 0 setting register 702_0 and the task input/output data area 1 setting register 702_1, and 2 and 4 are set as the number of automatic allocation blocks at the time of task startup.

The task startup condition setting register 0: 703_0 is set with the task to be started, the name of the startup function, the number of parallel startups, the argument to the startup function, the task startup trigger, and the task pause trigger. In the semiconductor device 2_1, since the task for the filter operation A is executed by using the two processors CPU1 and CPU2, the task to be started is set to the task for the filter operation A, and the number of parallel starts is set to 2. The name of the activation function is set to f, and the argument to the activation function is set as shown in the figure. In the semiconductor device 2_1, since the task is started responsive to the occurrence of the frame reception end event, the time when the frame reception end event occurs is set as the task start trigger. Since the trigger for suspending the task for filter operation A is not specifically defined, the task suspend trigger is not set.

The configuration of the task input/output data control register 12 of the semiconductor device 2_2 shown in FIGS. 14 and 15 is the same as that of FIGS. 12 and 13. In the task input/output data control register 12 shown in FIGS. 14 and 15, since the corresponding semiconductor device is semiconductor device 2_2, semiconductor device 2_2 (identification data ID2) is set instead of semiconductor device 2_1 in the task input/output data transfer control register 0: 701_0. As shown in FIG. 2, in the semiconductor device 2_2, since the task for the filter operation B is executed in order from the reception block 1, the initialization value of the auto-allocation block number at the time of task startup is set to 1 in the task input/output data area 0 setting register 702_0. Further, in the task input/output data control register 12 of the semiconductor device 2_2, not the task for the filter operation A but the task for the filter operation B is set as a task.

Figure 16:
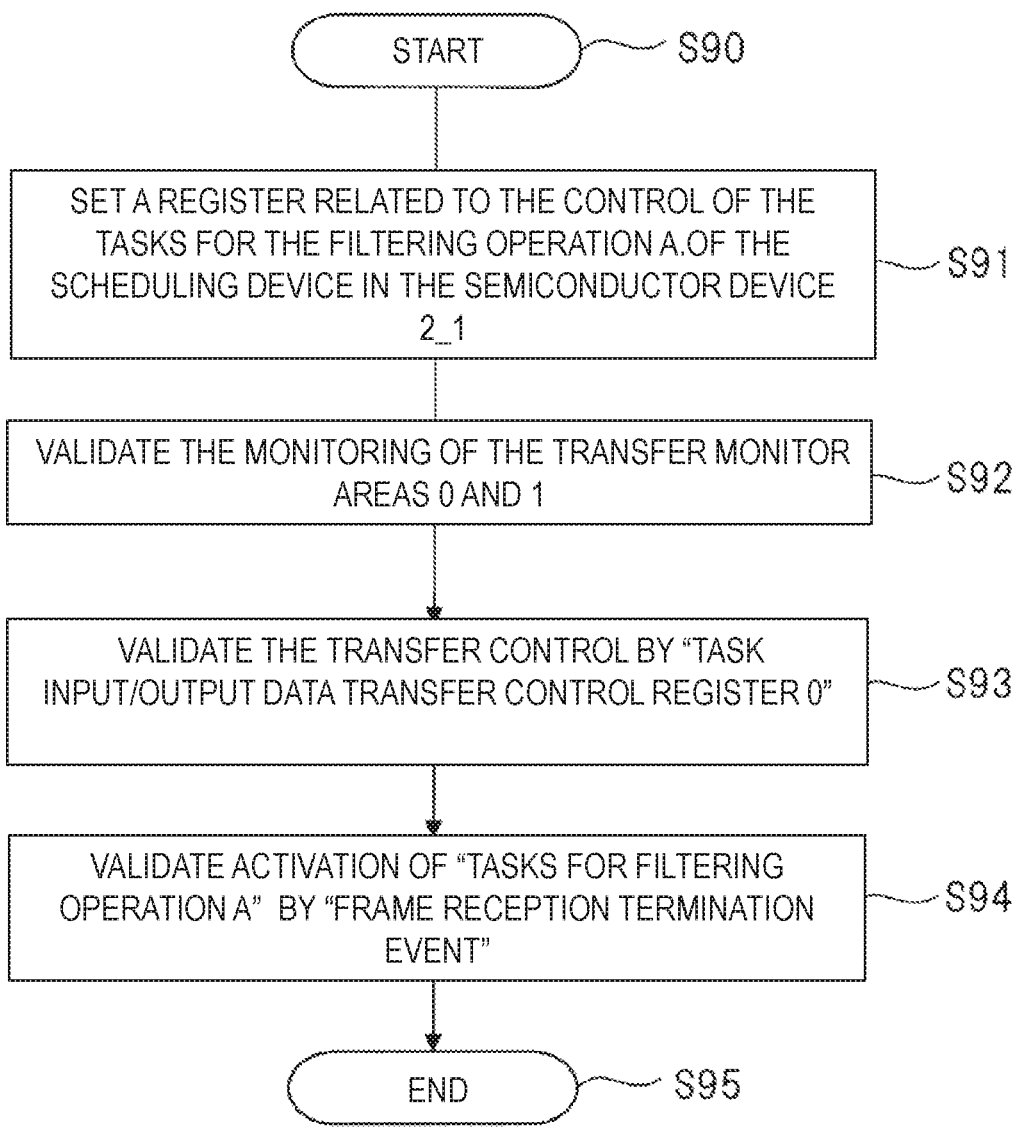
FIG. 16 is a flow chart illustrating the operation of the setting in the semiconductor device related to first embodiment.
Figure 17:
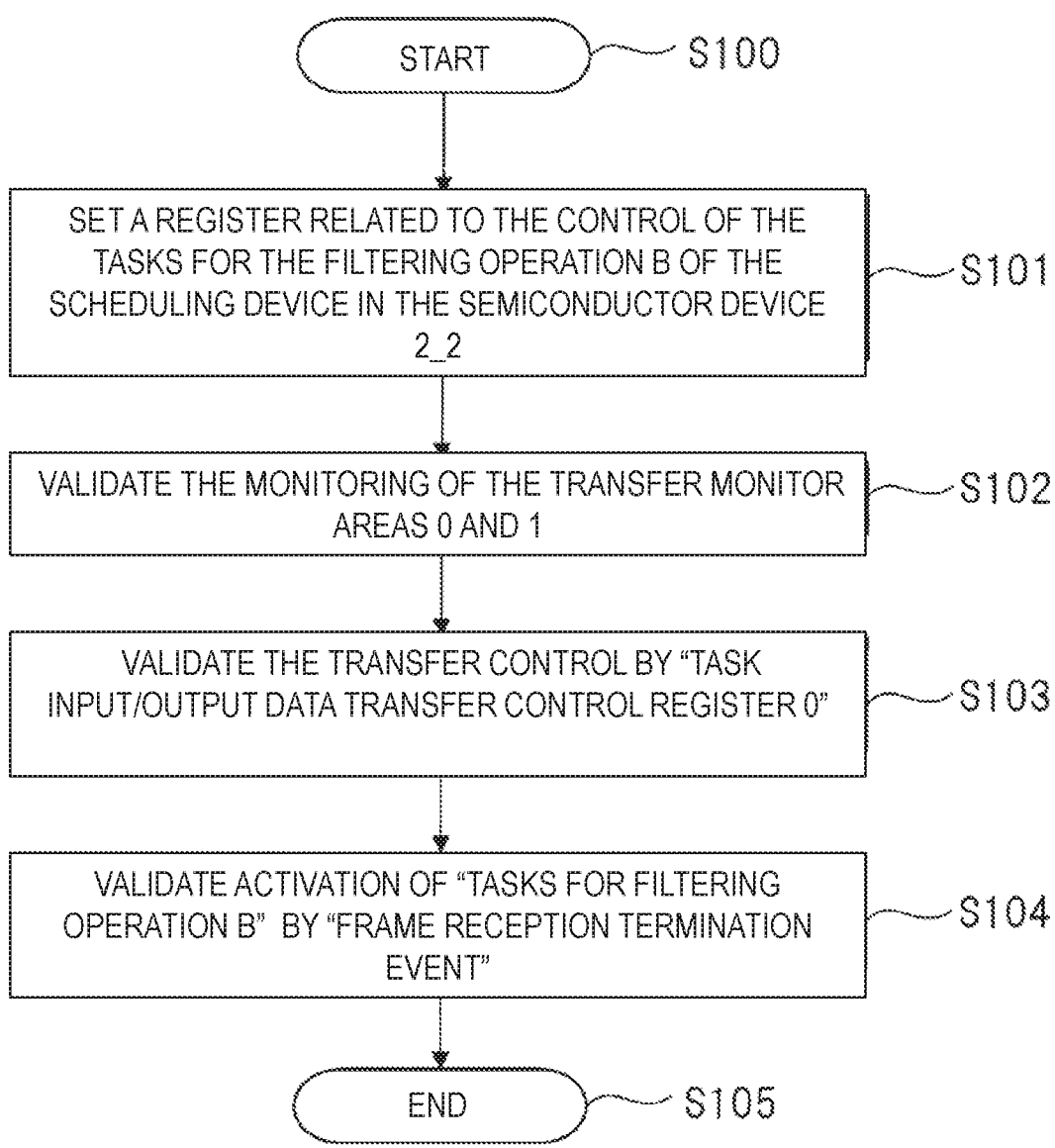
FIG. 17 is a flow chart illustrating the operation of the setting in the semiconductor device related to first embodiment.

In register setting operation of semiconductor device 2_1 and 2_2 semiconductor device 2_1 and 2_2, the registers in schedule device 10 (ID1) and 10 (ID2) are set by executing the software. FIGS. 16 and 17 are flowcharts showing the setting operation in the semiconductor device related to the first embodiment. Here, FIG. 16 shows the operation in the semiconductor device 2_1, and FIG. 17 shows the operation in the semiconductor device 2_2.

In S 90 of FIG. 16, the setting of the scheduling device 10 (ID1) is started. In semiconductor device 2_1, tasks for filter operation A are executed. Therefore, in S 91, the scheduling device 10 (ID1) in the semiconductor device 2_1 sets a register related to the control of the tasks for the filter operation A. In step S 90, the task input/output data control register 12 in the semiconductor device 2_1 is set as shown in FIGS. 12 and 13. Next, in step S 92, the monitoring of the transfer monitor areas 0 and 1 (memories 17 and 18) by the monitor circuit 15 is validated. In step S 93, the transfer control is validated so that the transfer control is executed in accordance with the contents set in the task input/output data transfer control register 0 shown in FIG. 12. Further, in S 94, activation of tasks for filter operation A by frame reception termination events is validated. Thereafter, in S 95, the setting of the scheduling device 10 (ID1) in the semiconductor device 2_1 ends.

For the semiconductor device 2_2, the same steps as those of the semiconductor device 2_1 are executed as the step S100~S105 shown in FIG. 17. The difference between FIG. 16 and FIG. 17 is that in FIG. 17, the register related to the task for the filter operation B is set in step S101, and at this time, the task input/output data control register 12 is set as shown in FIGS. 14 and 15.

Task startup in semiconductor device 2_1 and 2_2 will now be described, and task startup operations in semiconductor device 2_1 and 2_2 will be described. In semiconductor device 2_1, the task for filter operation A is started, and in semiconductor device 2_2, the task for filter operation B is started. When the task for filter operation A and the task for filter operation B are started and executed, the filter operation result is stored in the transmit buffer (operation buffer) in semiconductor device 2_1 and 2_2.

Figure 18:
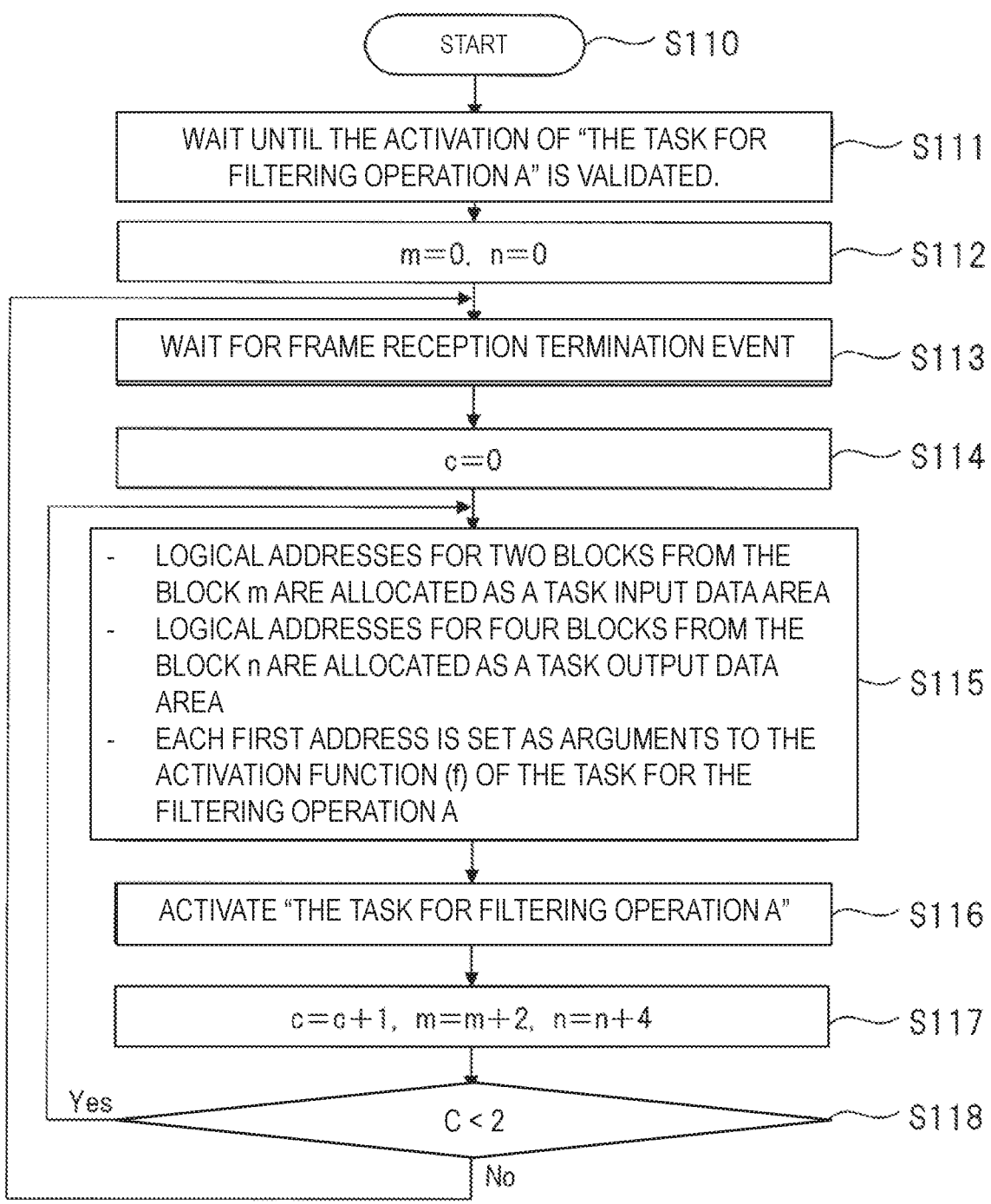
FIG. 18 is a flowchart illustrating the operation of a task in a semiconductor device related to first embodiment.
Figure 19:
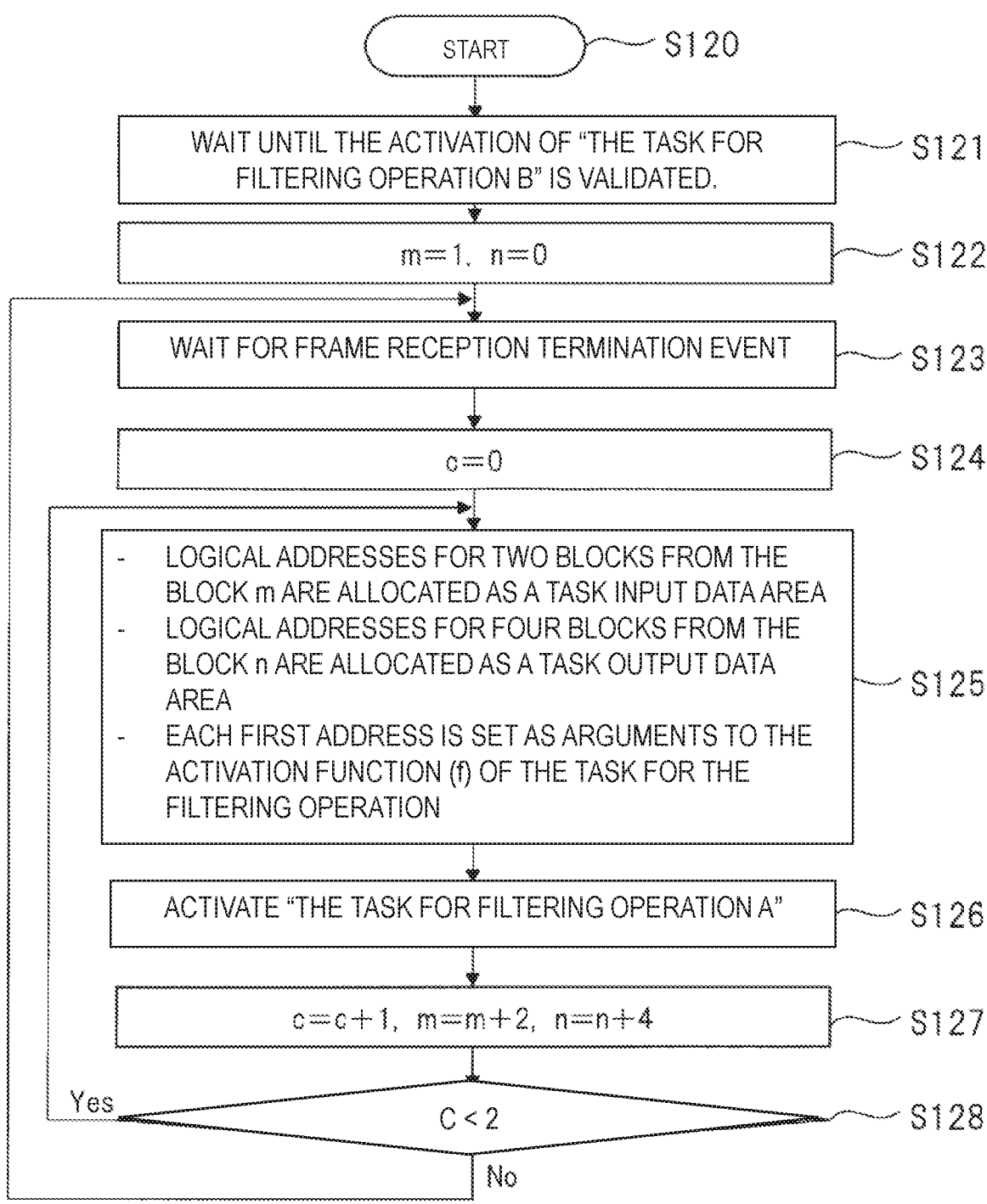
FIG. 19 is a flowchart illustrating the operation of a task in a semiconductor device related to first embodiment.

FIGS. 18 and 19 are flowcharts showing the task-starting operation in the semiconductor device related to the first embodiment. Here, FIG. 18 shows the task startup operation in the semiconductor device 2_1, and FIG. 19 shows the task startup operation in the semiconductor device 2_2. The task input/output data control circuits 11 included in the semiconductor device 2_1 and 2_2 execute the control shown in FIGS. 18 and 19. Since FIGS. 18 and 19 are similar, FIG. 18 will be described first, followed by a description of the differences between FIGS. 18 and 19.

In FIG. 18, the task-starting operation starts in step S110. Next, in step S111, the task waits until the activation of the task for filter operation A is validated. When the activation of the tasks for filter operation A is validated, a step S112 is executed. In step S112, a variable m indicating the number of the receiving block and a variable n indicating the number of the transmitting block are set to 0. Thereafter, in step S113, it waits for frame reception termination events to occur. The occurrence of the frame reception completion event serves as a start trigger for starting the task for the filter operation A.

If an activation trigger is detected, then a step S114 is performed. In step S114, a variable c indicating the number of parallel starts is set to 0. Thereafter, the S115 of steps is performed.

In the step S115, logical addresses for two blocks from the block m are allocated as a task input data area for the task for the filter operation A. In addition, logical addresses for four blocks from the block n are allocated as a task output data area for the task for filter operation A. As a result, when the task for the filter operation A is started, two blocks from the block m in the memory 17 become the input data of the task for the filter operation A, and the operation result of the filter operation A is written in the memory 18 from the block n to four blocks. In addition, the start addresses of the respective address areas, that is, the task input data area and the task output data area are set as arguments to the activation function f of the task for the filter operation A. The two blocks and the four blocks described above are the number of automatically allocated blocks at the time of task startup, and are the number of blocks set in the task input/output data area 0 setting register 702_0 and the task input/output data area 1 setting register 702_1 shown in FIG. 13.

In step S115, when the setting of the arguments to the activation function f is completed, step S116 is executed. In this step S116, the task for the filter operation A is started. Next, in step S117, the variables c, m and n are updated. That is, the calculation of c=c+1, m=m+2, and n=n+4 is performed. Here, 2 and 4 are the number of blocks described above.

Next, a step S118 is performed. In step S118, it is determined whether or not the number of parallel activations is equal to or less than 2 based on the values of the variables c. If the number of parallel activations is 2 or less, the process returns to step S115, and step S115~S118 is repeated until the number of parallel activations exceeds 2. On the other hand, when the parallel activation count exceeds 2, the process returns to step S113 and waits for a task-activation trigger to occur in step S113. In the first embodiment, since the semiconductor device 2_1 includes two processors CPU1 and CPU2, the number of parallel startups can be set to 2.

As described above, the filter operation A is executed using the reception data of two consecutive reception blocks (1 KB), and the result of the filter operation is written in the four transmission blocks (0.25 KB).

Also in the semiconductor device 2_2, the tasks for the filter operation B are started by a step S120~S128 (FIG. 19) similar to the step S110~S118 shown in FIG. 18. The step S120~S128 executed in semiconductor device 2_2 differs from the step S110~S118 in that the target task is a task for the filter operation B, and that the variable m set in the step S122 is 1 instead of 0. The variable m is set to 1 because the variable semiconductor device 2_2 performs the filter operation B from the reception block 1, rather than the reception block 0, as shown in FIG. 2.

Figure 20:
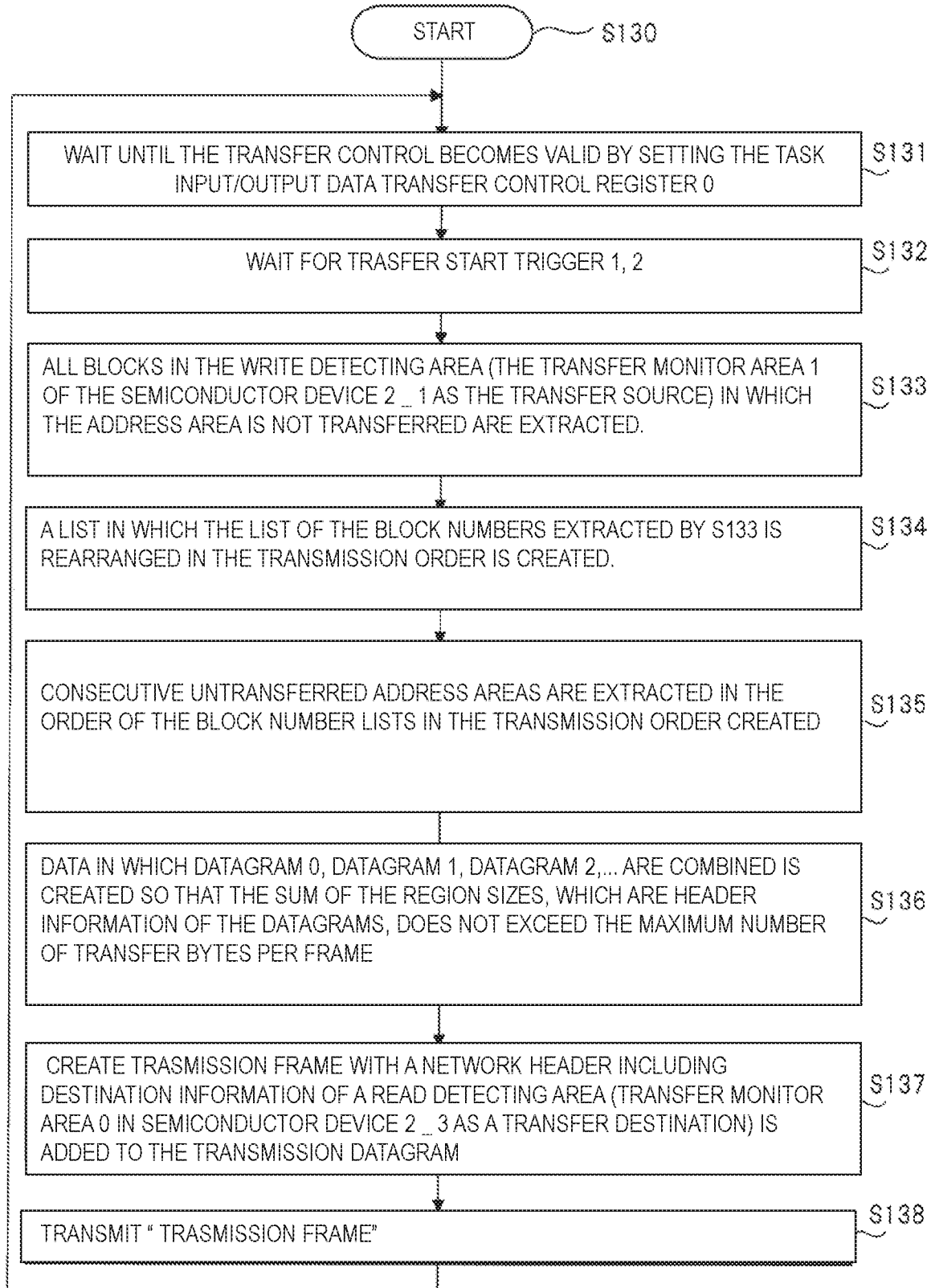
FIG. 20 is a flow chart showing the transmission operation in the semiconductor device related to first embodiment.
Figure 21:
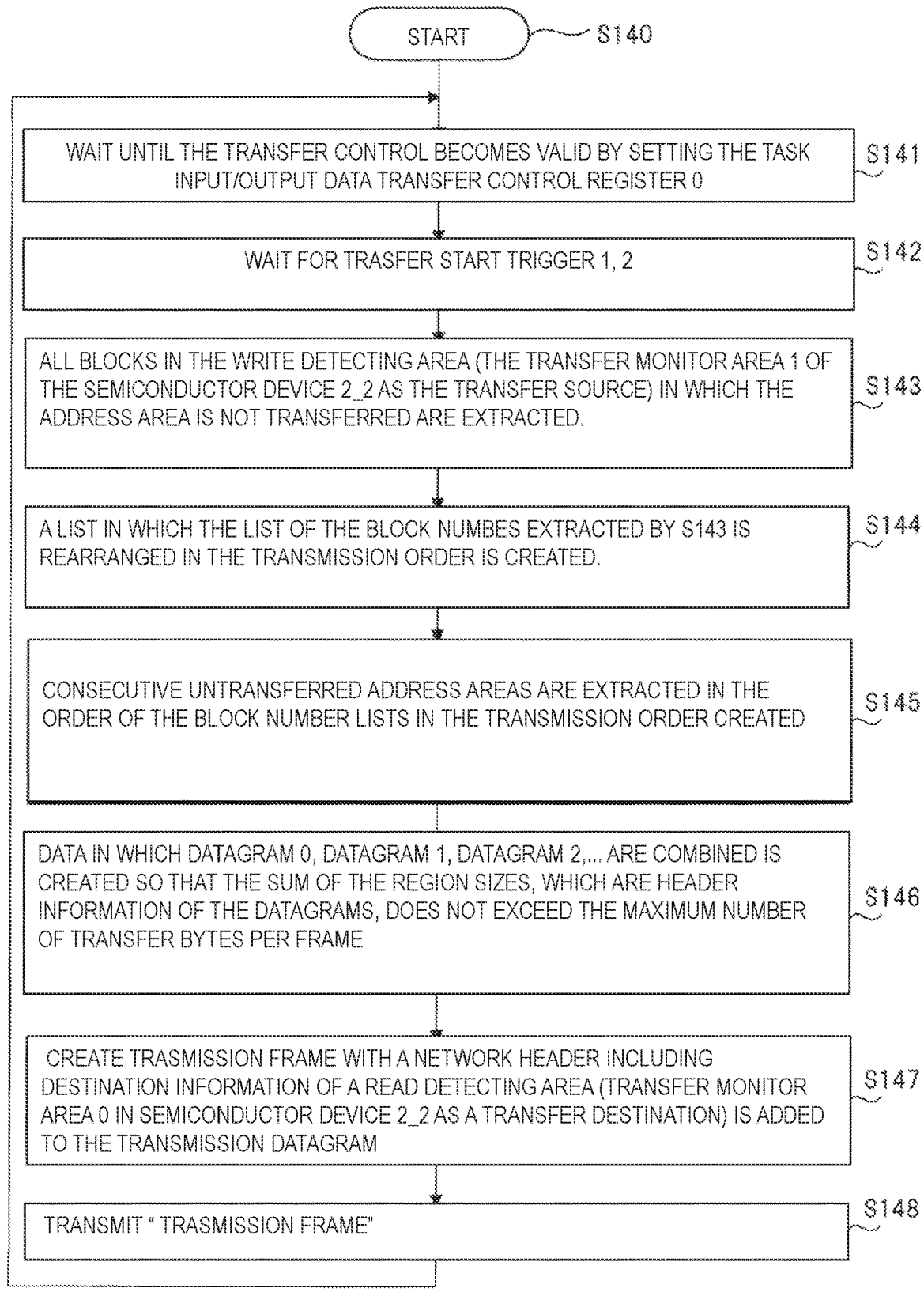
FIG. 21 is a flow chart showing the transmission operation in the semiconductor device related to first embodiment.

The filter operation results stored in the transmission buffers (operation buffers) of the semiconductor device 2_1 and 2_2 are transmitted (transferred) to the semiconductor device 2_3. Next, the operation of transmitting the filter operation results (task output data) in the semiconductor device 2_1 and 2_2 will be described. FIGS. 20 and 21 are flowcharts showing the transmission operation in the semiconductor device related to the first embodiment. Here, FIG. 20 shows a transmission operation in the semiconductor device 2_1, and FIG. 21 shows a transmission operation in the semiconductor device 2_2. The control shown in FIGS. 20 and 21 is executed by the task-input/output-data control circuits 11 provided in the semiconductor device 2_1 and 2_2.

Since FIG. 20 and FIG. 21 are similar to each other, referring to FIG. 20, the transmission operation in semiconductor device 2_1 will be described, and thereafter, the difference from the transmission operation in semiconductor device 2_2 will be described with reference to FIG. 21.

In step S130 of FIG. 20, the transmission operation is started. Next, in step S131, the task waits until the transfer control becomes valid by setting the task input/output data transfer control register 0: 701_0 shown in FIG. 12. When the transfer control becomes valid, in step S132, the transfer start trigger 1 and the transfer start trigger 2 are waited for to occur.

For example, when the transfer-start trigger 1 is generated, the step S133 is executed. In step S133, all blocks in the write detecting area (the transfer monitor area 1 of the semiconductor device 2_1 as the transfer source) in which the address area is not transferred are extracted. Here, a block having an address area which has not been transferred means a block in which an address in which "c. unreferenced flag"="a. write flag"−"b. read flag" is not 0 exists. The unreferenced flag, the write flag, and the read flag described above are shown later in FIGS. 35 to 56, etc., but the write flag is attached to the address at which writing has been performed, the read flag is attached to the address at which reading has been performed, and the unreferenced flag is attached to the address at which writing has been performed and at which reading has not been performed. For this reason, in the step S133, the monitor 15 monitors the memories 18 constituting the transmit buffer, and extracts all the blocks in which the addresses to which writing has been performed and from which reading has not been performed are present.

Next, a step S134 is performed. In the step S134, a list in which the list of the block numbers extracted by the S133 is rearranged in the transmission order (hereinafter, referred to as a block number list in the transmission order) is created. As a method of rearranging the block numbers, there are first to fourth methods described below. Here, a priority evaluation function corresponding to each of the sorting methods is considered, and in the S134 of steps, it is assumed that the sorting of the block numbers is performed in descending order of priority based on the priority evaluation function.

The first method is suitable for a case where it is desired to preferentially transmit a block in which data having a long residence time in the transmission buffer is stored. The priority evaluation function fp1 when the first method is employed is fp1=tc−twe when the present time is tc and the last write time is twe. Here, the present time tc is time information supplied from the timer 9 to the scheduling device 10 (ID1), and the present time tc is synchronized between the semiconductor device 2_1 to 2_3 and the data transmitting device 3. The last write time twe is a value set in the CTB7 of items in FIGS. 41 to 46, which will be described later. Also, suppose that tc and twe are larger in future time than in past time, respectively, and the higher the fp1 value, the higher the precedence.

The second method is suitable for a case where it is desired to preferentially transmit a block in which data referenced by a task having a severe timing constraint is stored. When the second method is employed, the priority evaluation function fp2 is set to fp2=tc−tlm by using the present time tc when tlm is the time at which the task referring to the data to be transmitted must be finished. When the second method is employed, the setting field of tlm is added to the task input/output data transfer control register 0: 701_0 of FIG. 12. When referring to data stored in a certain transfer monitor area by a plurality of tasks, the tlm uses a timing constraint of a task which must be terminated earliest among all tasks referring to data stored in the one transfer monitor area. Assuming that tlm has a larger value than the previous time, when there is no timing constraint violation, the relationship tlm≥tc holds, and the fp2 becomes a negative value or 0. The higher the value of the fp2, the higher the priority.

The third method is suitable for a case where it is desired to preferentially transmit a block in which data referred to by a task having a high execution priority is stored. The priority evaluating function fp3 when the third method is employed is a function fp3=pr when the execution priority of the task referring to the data to be transmitted is pr. When the third method is employed, the setting field of the pr is added to the task input/output data transfer control register 0: 701_0 of FIG. 12 and set. Here, the higher the values of pr and fp3 are, the higher the priorities are.

The fourth method is suitable for a case where it is desired to determine a block to be preferentially transmitted by combining the first method, the second method, and the third method. When the weight for the evaluation result according to the first method is w 1, the weight for the evaluation result according to the second method is w 2, and the weight for the evaluation result according to the third method is w 3, the priority evaluation function fp4 when the fourth method is employed is fp4=w 1×fp1+w 2×fp2+w 3×fp3. Here, arbitrary real numbers are set as weights in the above-mentioned w 1 to w 3, respectively. The values of w 1 to w 3 can be changed in synchronization with an arbitrary event.

For example, in first embodiment, in order to satisfy the timing constraint 1, the fourth method is adopted, and the following setting is performed. When a transmission/reception end event occurs, w 1=1, w 2=1, and w 3=0 are set. When SYNC0 events occur, w 1=0, w 2=0, and w 3=1 are set. The tlm provided in the task input/output data transfer control register 0 of each of the semiconductor device 2_1 and the semiconductor device 2_2 sets the time at which the next SYNC0 event occurs when the SYNC0 event occurs. Since the SYNC0 event occurs at a constant cycle in synchronization with the timer 9, it is possible to set the time at which the next SYNC0 event occurs when the SYNC0 event occurs as described above. The pr provided in the task input/output data transfer control register 0 of each of the semiconductor device 2_1 and the semiconductor device 2_2 can be set to any value, but 0 representing the lowest priority is set here. By these settings, blocks to be transmitted with priorities corresponding to the timing constraint 1 are determined by combining the first method and the second method in a period between the transmission/reception ending event and the SYNC0 event. In addition, blocks to be preferentially transmitted in the third method are determined in a period other than the period between the transmission/reception ending event and the SYNC0 event. By performing these settings, for example, even when tasks whose number of CPUs greatly exceeds the number of CPUs are operating in parallel on the semiconductor device 2_1 and the semiconductor device 2_2, blocks to be transmitted can be determined with priorities corresponding to the timing constraints of the respective tasks.

Next, a step S135 is performed. In step S135, consecutive untransferred address areas are extracted in the order of the block number lists in the transmission order created in step S134. For each extracted address area, a datagram is created to which header information of the head address (logical address) of the extracted address area and the area size (number of bytes) of the extracted address area is added. Hereinafter, the created datagrams will be referred to as datagram 0, datagram 1, datagram 2, . . . in order.

In the following step S136, data (hereinafter referred to as a transmission datagram) in which datagram 0, datagram 1, datagram 2, . . . are combined is created so that the sum of the region sizes, which are header information of the datagrams, does not exceed the maximum number of transfer bytes per frame (see task input/output data transfer control register 0: 701_0 in FIG. 12).

In step S137, a network header including destination information of a read detecting area (transfer monitor area 0 in semiconductor device 2_3 as a transfer destination) is added to the transmission datagram created in step S136 to create a transmission frame. The read detecting area is set in the task input/output data transfer control register 701_0 shown in FIG. 12, and the destination information includes identification information ID3 for specifying the semiconductor device of the transfer destination and address information for specifying the address area of the transfer monitor area 0.

In the step S138, the DMA controller included in the communication device 5_1 is used. The created transmission frame is transmitted to the semiconductor device 2_3. After the step S138, the process returns to the step S132, and when the occurrence of the transfer start trigger 1 or the transfer start trigger 2 is detected, the above-described steps are repeated.

In the semiconductor device 2_2, a step S140~S148 (FIG. 21) similar to the step S130~S138 (FIG. 20) is executed. The difference between FIG. 21 and FIG. 20 is that, in FIG. 21, the semiconductor device 2_2 transmits a transmission frame to the semiconductor device 2_3, and that the destination information added to the transmission datagram is the transfer monitor area 1 of the semiconductor device 2_3 in the step S147.

In the S133~S137 of FIG. 20 and the S143~S147 of FIG. 21, although the execution time may be shortened by executing a part of the processing in parallel or by changing the order of executing a part of the processing by subdividing the part of the processing, the flow of executing each processing in order is described in the drawing in order to make the flow of the processing easy to understand.

Next, semiconductor device 2_3 will be described. In the semiconductor device 2_3, the task for output operation A is executed on the filter operation result received from the semiconductor device 2_1, and the task for output operation B is executed on the filter operation result received from the semiconductor device 2_2.

In the memories 17 and 18 of the semiconductor device 2_3, an address area (transfer monitor area) corresponding to the task for the output operation A and an address area (transfer monitor area) corresponding to the task for the output operation B are set. FIGS. 22 to 25 are diagrams for explaining the memory address area of the semiconductor device related to the first embodiment. Here, FIG. 22 shows an address region (transfer monitor region 0) of the memory 17 corresponding to the task for output operation A, and FIG. 23 shows an address region (transfer monitor region 1) of the memory 18 corresponding to the task for output operation A. FIG. 24 shows an address region (transfer monitor region 2) of the memory 17 corresponding to the task for output operation B, and FIG. 25 shows an address region (transfer monitor region 3) of the memory 18 corresponding to the task for output operation B.

As shown in FIG. 22 and FIG. 24, the address area of the memory 17 is composed of bankways 17_0 to 17_3 in units of 0.25 KB. As shown in FIG. 23 and FIG. 25, the address area of the memory 18 is composed of bank ways 18_0 to 18_3 in units of 1 KB. In FIGS. 22 to 25, the address areas of the memories 17 and 18 are represented by physical addresses, but are converted into logical addresses by the address conversion circuit 13. The logical address of the block in each bank way is converted according to the conversion formula shown in each figure, for example, in FIG. 22, the logical address of the block m=20000H+100H×m.

Of the bankways 17_0 to 17_3 constituting the memories 17, the bankways 17_0 and 17_1 correspond to the task for the output operation A with respect to the operation result from the semiconductor device 2_1, and the bankways 17_2 and 17_3 correspond to the task for the output operation B with respect to the operation result from the semiconductor device 2_2. Among the bankways 18_0 to 18_3 constituting the memory 18, the bankways 18_0 and 18_2 correspond to the task for the output operation A, and the output operation result by the task for the output operation A is stored. On the other hand, the bankways 18_1 and 18_3 correspond to the task for the output operation B, and store the output operation result by the task for the output operation B.

The operation result of the task for filter operation A executed in the semiconductor device 2_1 is written to the bankway in the memory 18 of the semiconductor device 2_1 (write), and the written operation result is transferred from the semiconductor device 2_1 to the semiconductor device 2_3 as shown in FIG. 22, and is read by the processor in the semiconductor device 2_3 (read). For example, in the block 0 in the bank way 17_0 of FIG. 22, in the semiconductor device 2_1, the data of the operation result written by the processor CPU1 to the bank way of the semiconductor device 2_1 is transferred to the semiconductor device 2_3, and the data is written to the block 0. The data written in the block 0 is read by the processor CPU1 in the semiconductor device 2_3. The same applies to the remaining blocks 1 to 7 shown in FIG. 22.

In the semiconductor device 2_3, the processor CPU1, CPU2 executes the task for the output operation A on the data read from the blocks 0 to 7, and the processor CPU1 writes the operation result to the block 0 of the bankway 18_0 as shown in FIG. 23. Similarly, as shown in FIG. 23, the processor CPU2 writes the operation result to the block 1 of the bank way 18_2.

On the other hand, the operation result of the task for the filter operation B executed in the semiconductor device 2_2 is written in the bank way in the memory 18 of the semiconductor device 2_2 (write), and the written operation result is transferred from the semiconductor device 2_2 to the semiconductor device 2_3 as shown in FIG. 24, and is read by the processor in the semiconductor device 2_3 (read). For example, in the block 0 in the bank way 17_2 of FIG. 24, in the semiconductor device 2_2, the data of the operation result written by the processor CPU1 to the bank way of the semiconductor device 2_2 is transferred to the semiconductor device 2_3, and the data is written to the block 0. The data written in the block 0 is read by the processor CPU1 in the semiconductor device 2_3. The same applies to the remaining blocks 1 to 7 shown in FIG. 24.

In the semiconductor device 2_3, the processor CPU1, CPU2 executes the task for the output operation B on the data read from the blocks 0 to 7, and the processor CPU1 writes the operation result to the block 0 of the bankway 18_1, as shown in FIG. 25. Similarly, as shown in FIG. 25, the processor CPU2 writes the operation result to the block 1 of the bank way 18_3.

As a result, the data on which the filter operation and the output operation have been performed is acquired.

(semiconductor device 2_3 task input/output data control register) FIGS. 26 to 29 show the configuration of the task input/output data control register of the semiconductor device related to the first embodiment. Since the task input/output data control register 12 of semiconductor device 2_3 illustrated in FIGS. 26 to 29 is similar to FIGS. 12 to 15, the differences are mainly described.

Each of semiconductor device 2_1 and 2_2 has two transfer monitor area 0 setting registers 700_0 and transfer monitor area 1 setting registers 700_1 as transfer monitor area setting registers, but semiconductor device 2_3 is a transfer monitor area setting register. Four transfer monitor area setting registers are provided. That is, the semiconductor device 2_3 includes a transfer monitor area 0 setting register: 700_0, a transfer monitor area 1 setting register: 700_1, a transfer monitor area 2 setting register: 700_2, and a transfer monitor area 3 setting register: 700_3.

In the transfer monitor area 0 setting register: 700_0, the target memory is the bank ways 17_0 and 17_1 of the memory 17 shown in FIG. 22, and in the transfer monitor area 1 setting register: 700_1, the target memory is the bank ways 18_0 and 18_2 of the memory 18 shown in FIG. 23. Further, in the transfer monitor area 2 setting register: 700_2, the target memory is the bank ways 17_2 and 17_3 of the memory 17 shown in FIG. 24, and in the transfer monitor area 3 setting register: 700_3, the target memory is the bank ways 18_1 and 18_3 of the memory 18 shown in FIG. 25. As shown in FIGS. 22 to 25, when the semiconductor device 2_3 is operated, the "block allocation constraint of the target area" in the transfer monitor region 0 setting register: 700_0 to the transfer monitor region 3 setting register: 700_3 is as shown in FIGS. 26 and 28. In addition, the automatic block allocation trigger of the target area is set without setting, and the number of bytes per block of the target area and the number of bytes per flag of the target area are also set as shown in FIG. 26 and FIG. 28.

In semiconductor device 2_1 and 2_2, one task I/O data transfer control register 0: 701_0 is provided as a task I/O data transfer control register, while semiconductor device 2_3 includes two task I/O data transfer control registers 0: 701_0 and 701_1 as a task I/O data transfer control register.

In the task input/output data transfer control register 0: 701_0, the transfer monitor area 0 (FIG. 22) of the semiconductor device 2_3 is set as the read detecting area (transfer destination), and the task for the output operation A of the semiconductor device 2_3 is set as the read task (transfer destination). The transfer monitor area 1 of the semiconductor device 2_1 is set in the write detecting area (transfer source), and the task for the filter operation A of the semiconductor device 2_1 is set as the write task (transfer source). On the other hand, in the task input/output data transfer control register 1: 701_1, the transfer monitor area 2 (FIG. 24) of the semiconductor device 2_3 is set as the read detecting area (transfer destination), and the task for the output operation B of the semiconductor device 2_3 is set as the read task (transfer destination). The transfer monitor area 1 of the semiconductor device 2_2 is set in the write detecting area (transfer source), and the task for the filter operation B of the semiconductor device 2_2 is set as the write task (transfer source).

In the task input/output data transfer control register 0: 701_0 and the task input/output data transfer control register 1: 701_1, the maximum number of transfer bytes per frame is set to 512, and the transfer start triggers 1 and 2 are set as shown in FIGS. 26 and 28.

The semiconductor device 2_1 and 2_2 have two task I/O data area 0 setting registers 702_0 and a task I/O data area 1 setting register 702_1 as task I/O data area setting registers, but the semiconductor device 2_3 has four task I/O data area setting registers as task I/O data area setting registers. That is, the semiconductor device 2_3 includes a task input/output data area setting register: 702_0, a task input/ output data area 1 setting register: 702_1, a task input/output data area 2 setting register: 702_2, and a task input/output data area 3 setting register: 702_3.

As the input/output data areas of the task input/output data area 0 setting register: 702_0 to the task input/output data area 3 setting register: 702_3, transfer monitor areas 0 to 3 (FIG. 22 to FIG. 25) are set. The initial value of the task to be input/output, the input or output (input/output), the block number of automatic allocation at the time of task startup, and the number of automatic allocation blocks at the time of task startup are set as shown in FIGS. 27 and 29.

Further, the semiconductor device 2_1 and 2_2 have one task activation condition setting register 0: 703_0 as a task activation condition setting register, but the semiconductor device 2_3 has two task activation condition setting registers 0: 703_0 and a task activation condition setting register 1: 703_1. The startup target task, the name of the startup function, the number of parallel startups, the arguments to the startup function, the task startup trigger, and the task pause trigger are set as shown in FIGS. 27 and 29.

The task input/output data control registers 12 of the semiconductor device 2_1 and 2_2 may have the same configuration as the semiconductor device 2_3, and in the semiconductor device 2_1 and 2_2, some of the registers constituting the task input/output data control registers may be set as described with reference to FIGS. 12 to 15.

Figure 30:
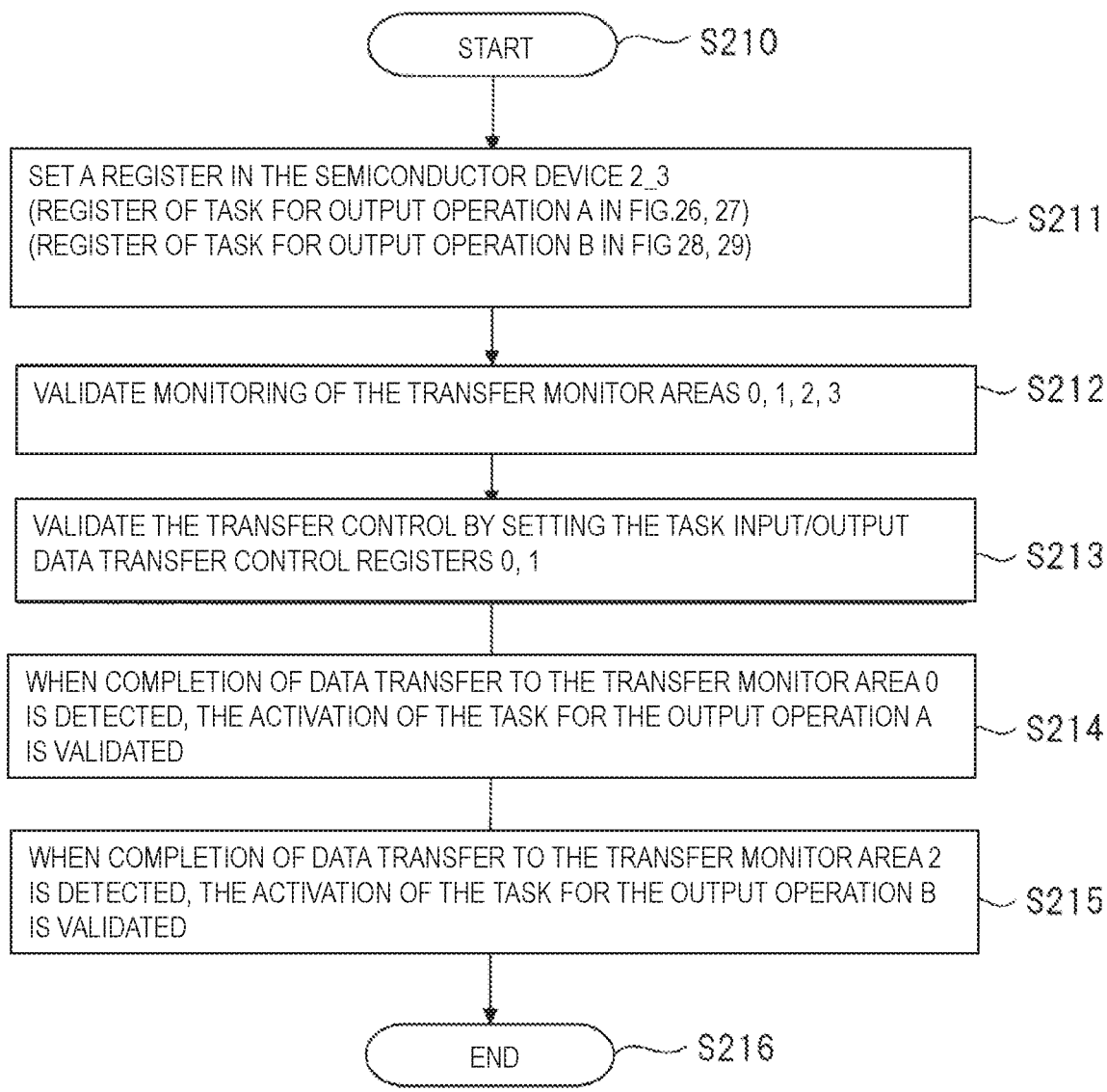
FIG. 30 is a flow chart illustrating the operation of the setting in the semiconductor device related to first embodiment.

Also in semiconductor device 2_3, a register or the like in the scheduling device 10 (ID3) is set by executing the software. FIG. 30 is a flow chart showing the setting operation in the semiconductor device related to the first embodiment.

In step S210 of FIG. 30, the setting of the scheduling device 10 (ID3) is started. The semiconductor device 2_3 executes tasks for the output operation A and the output operation B. Therefore, in step S211, a register related to the control of the task for output operation A and the task for output operation B is set in the scheduling device 10 (ID3) in the semiconductor device 2_3. In this step S211, the task input/output data control register 12 in the semiconductor device 2_3 is set as shown in FIGS. 26 to 29. Next, in step S212, monitoring of the transfer monitor areas 0 to 3 (memories 17 and 18) by the monitor circuits 15 is validated. In step S213, the transfer control is validated so that the transfer control is executed in accordance with the contents set in the task input/output data transfer control registers 0 and 1 shown in FIGS. 26 and 28. Further, in step S214, when the completion of the transfer of the data to the transfer monitor area 0 is detected by the task activation trigger using the monitor 15, the activation of the task for the output operation A is validated. When the completion of the transfer of the data to the transfer monitor area 2 is detected by the task activation trigger in step S215 by using the monitor 15, the activation of the task for the output operation B is validated. Thereafter, the register setting operation is terminated in step S216.

Figure 31:
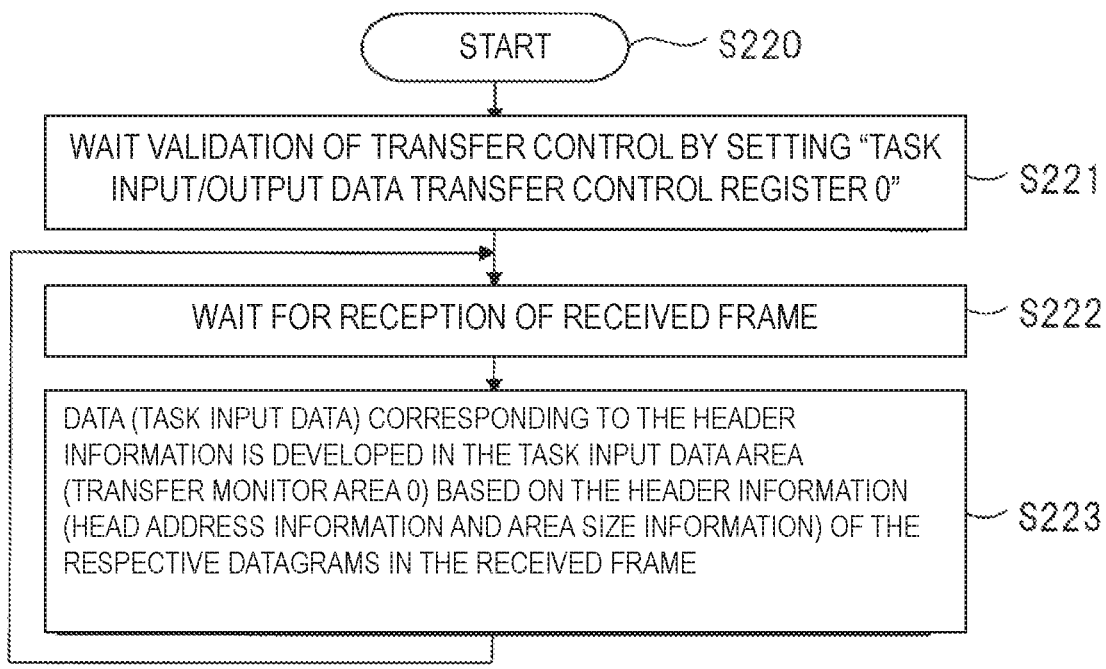
FIG. 31 is a receipt flow of the task input data related to first embodiment.
Figure 32:
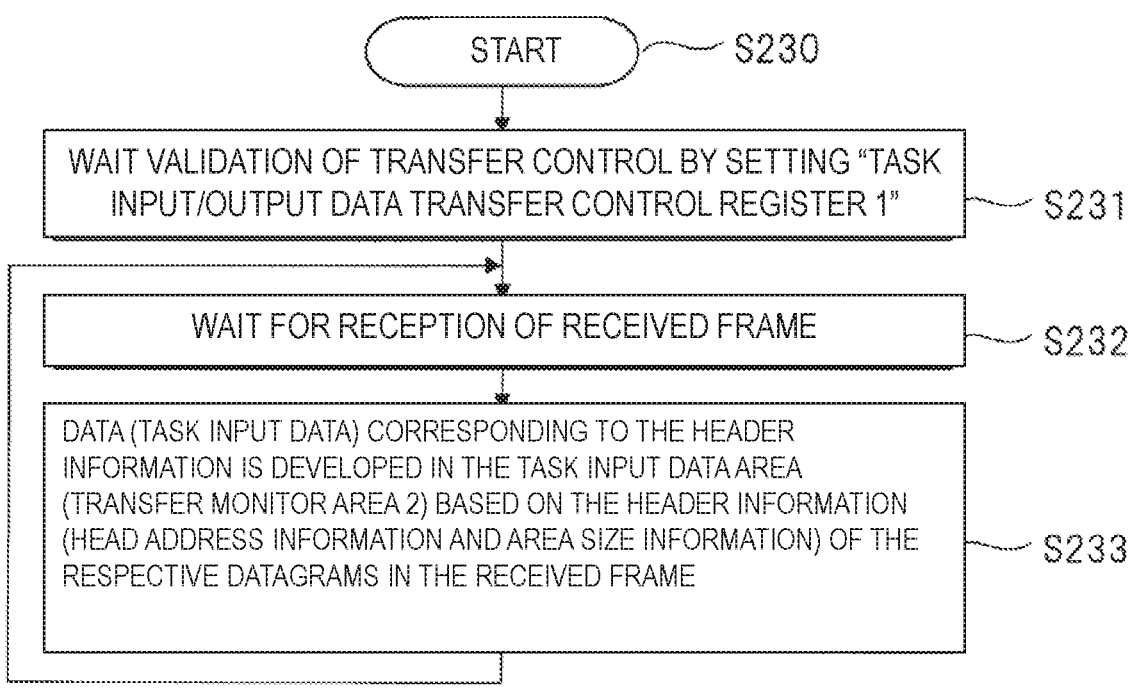
FIG. 32 is a receipt flow of the task input data related to first embodiment.

The semiconductor device 2_3 performs an operation of receiving input data of the task for output operation A from the semiconductor device 2_1 and an operation of receiving input data of the task for output operation B from the semiconductor device 2_2. This operation is executed by the task input/output data control circuit 13 in the semiconductor device 2_3. FIGS. 31 and 32 are diagrams showing the reception flows of task-input data relating to the first embodiment. Here, FIG. 31 shows the operation at the time of receiving the input data of the task for output operation A, and FIG. 32 shows the operation at the time of receiving the input data of the task for output operation B.

In FIG. 31, receive is started in step S220. In the step S221, the task input/output data transfer control register 0: 701_0 shown in FIG. 26 is set to wait for the enabling of the transfer control. When the transfer control is validated by the task input/output data transfer control register 0: 701_0, the step S222 is executed. In the step S222, the step waits for reception of a received frame from the semiconductor device 2_1.

If a received frame is received, then a step S223 is performed. In the step S223, data (task input data) corresponding to the header information is developed in the task input data area (transfer monitor area 0) based on the header information (head address information and area size information) of the respective datagrams in the received frame. When the expansion of the data of the received frame is completed, the process returns to the step S222 and waits for reception of a new received frame.

FIG. 32 is similar to FIG. 31, except that in the step S231 corresponding to the step S221, the task input/output data transfer control register 1: 701_1 shown in FIG. 28 waits for the transfer control to be activated, and in the step S233 corresponding to the step S223, the task input data is expanded to the transfer monitor area 2 (task input data area).

In the above operation, the data obtained by the execution of the task for the filter operation A is expanded in the transfer monitor area 1 by the DMA controller included in the communication device 5_3, and the data obtained by the execution of the task for the filter operation B is expanded in the transfer monitor area 2 by the DMA controller.

Figure 33:
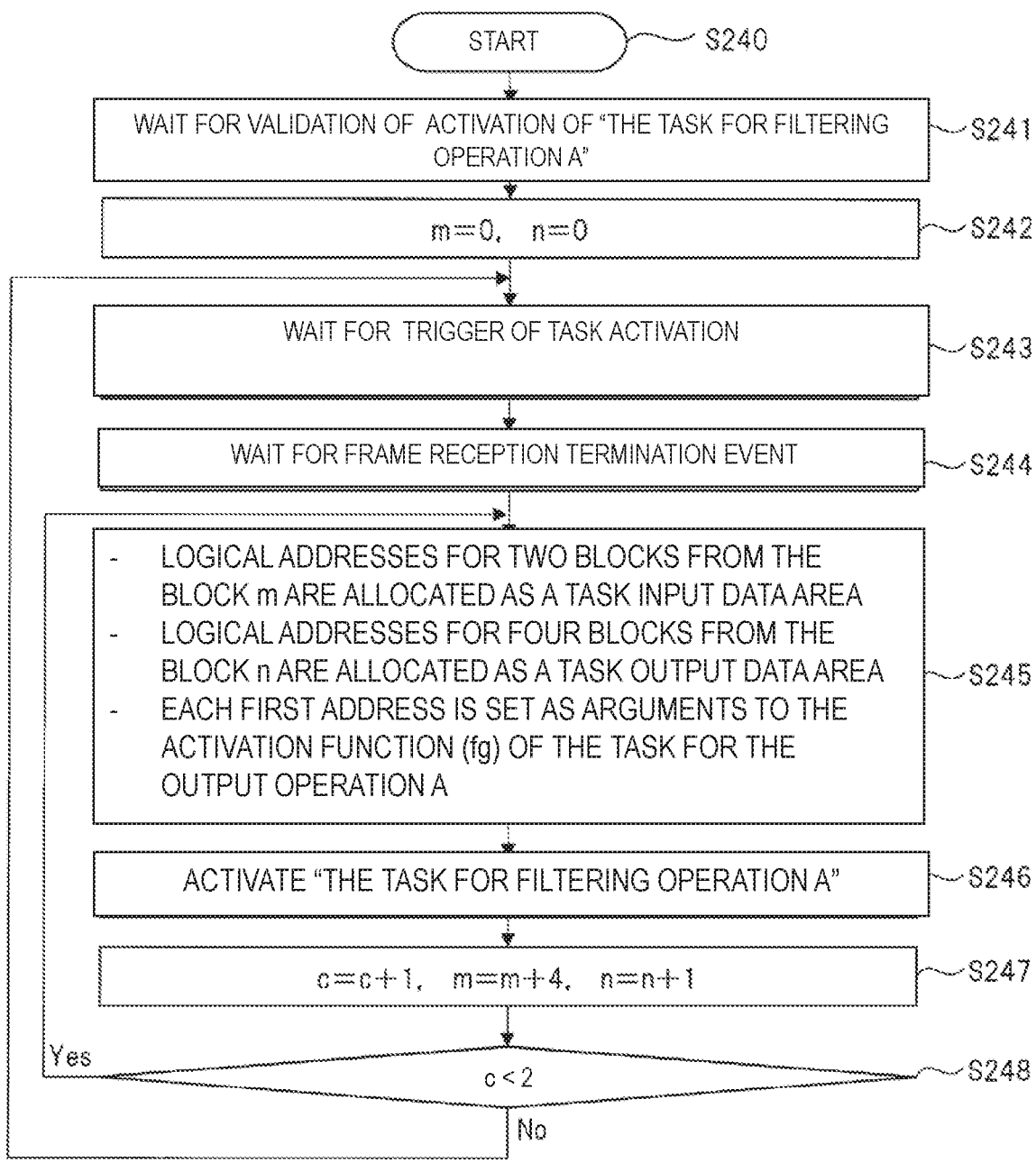
FIG. 33 is a flowchart illustrating the operation of a task in a semiconductor device related to first embodiment.
Figure 34:
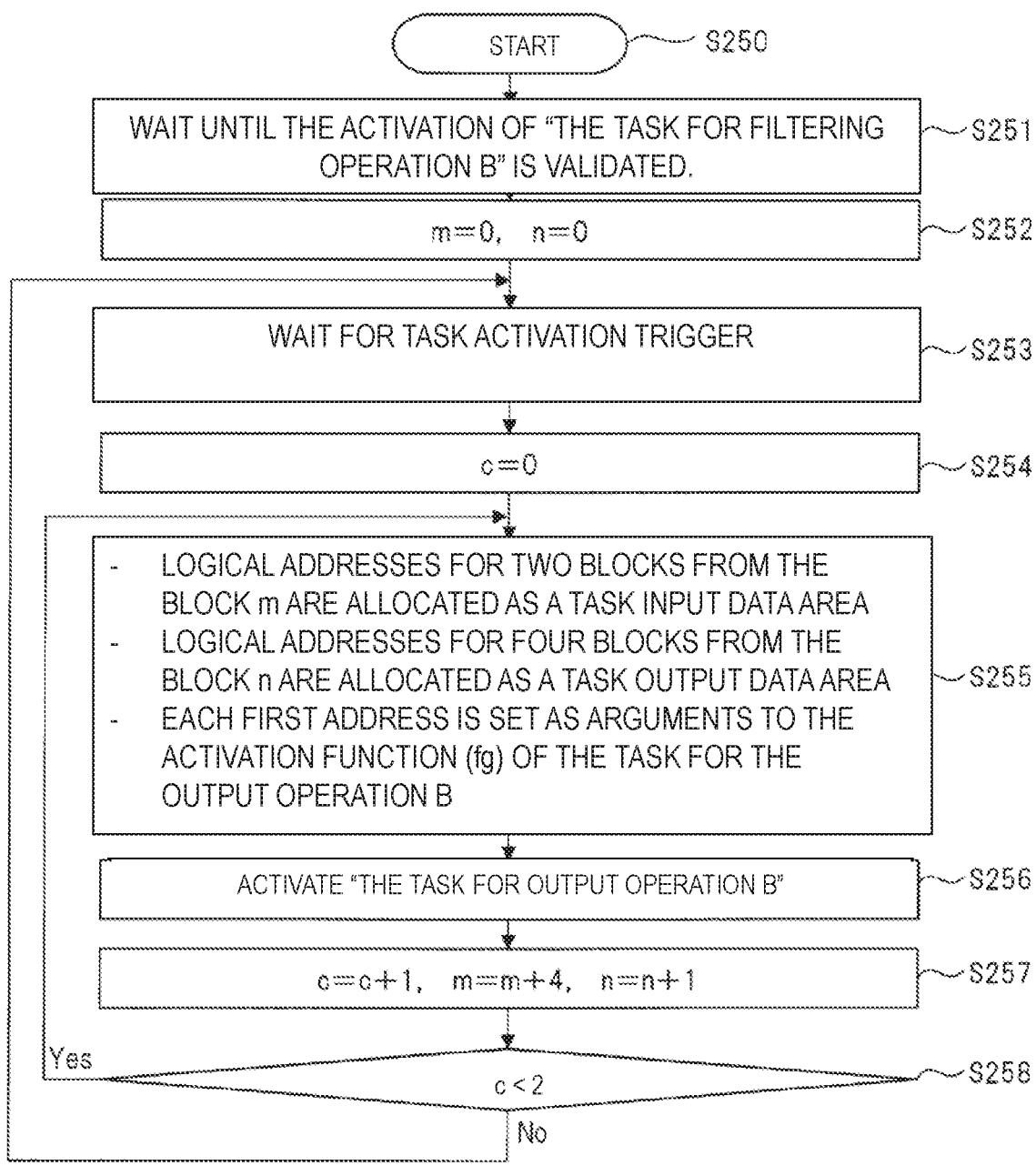
FIG. 34 is a flow chart illustrating the operation of a task in a semiconductor device related to first embodiment.

Next, the operation of task startup in semiconductor device 2_3 will be described. FIGS. 33 and 34 are flowcharts showing the task-starting operation in the semiconductor device related to the first embodiment. Here, FIG. 33 shows an operation of starting the task for output operation A, and FIG. 34 shows an operation of starting the task for output operation B. The task input/output data control circuit 11 included in the semiconductor device 2_3 performs the control shown in FIGS. 33 and 34. Since FIGS. 33 and 34 are similar, FIG. 33 will be described first, and thereafter the differences between FIGS. 33 and 34 will be described.

In FIG. 33, the task-starting operation starts in step S240. Next, in step S241, the processing waits until the activation of the task for the output operation A is validated. When the activation of the task for the output operation A is validated, the step S242 is executed. In step S242, a variable m indicating the number of the block in the task input data area and a variable n indicating the number of the block in the task output data area are set to 0. Thereafter, in step S243, the task start trigger is waited, that is, the task start trigger waits for completion of data transfer to the transfer monitor area 0 set in the read detecting area (transfer destination) shown in FIG. 26.

When the transfer of the data to the transfer monitor area 0 is completed, the transfer start trigger 1 is generated, and then the step S244 is executed. In step S244, a variable c indicating the number of parallel starts is set to 0. Thereafter, the S245 of steps is performed.

In the step S245, logical addresses for four blocks from the block m are allocated as task input data areas for the task for the output operation A. Further, as a task output data area for the task for output operation A, a logical address for one block is allocated from the block n. As a result, when the task for output operation A is executed, the task output data area in which the operation result is stored is stored in the memory 18. In addition, the top address of each address area, i.e., the task input data area and the task output data area. This property is set as an argument to the start function fg of the task for output operation A. The above-mentioned four blocks and two blocks are the number of automatically allocated blocks at the time of task startup, and are the number of blocks set in the task input/output data area 0 setting register 702_0 and the task input/output data area 1 setting register 702_1 shown in FIG. 27.

In step S245, when the setting of the arguments to the activation function fg is completed, step S246 is executed. In this step S246, the task for the output operation A is started. Next, in step S247, the variables c, m and n are updated. That is, the calculation of c=c+1, m=m+4, and n=n+1 is performed. Here, 4 and 1 are the number of blocks described above.

Next, a step S248 is performed. In step S248, it is determined whether or not the number of parallel activations is equal to or less than 2 based on the values of the variables c. If the number of parallel activations is 2 or less, the process returns to step S245, and step S245-S248 is repeated until the number of parallel activations exceeds 2. On the other hand, when the parallel activation count exceeds 2, the process returns to step S243 and waits for a task-activation trigger to occur in step S243. In the first embodiment, since the semiconductor device 2_3 includes two processors CPU1 and CPU2, the number of parallel startups can be set to 2.

As described above, the output operation A is executed using the data of four consecutive blocks (0.25 KB), and the output operation result is written in one block (1 KB).

Also in the task for output operation B, the task for output operation B is started by the step S250~S258 shown in FIG. 34 similar to the step S240~S248 shown in FIG. 33. The step S250~S258 executed in semiconductor device 2_3 differs from the step S240~S248 in that the target task is the task for output operation B, the task input data area is the transfer monitor area 2, and the task output data area is the transfer monitor area 3.

In the above operation, the output operation A is executed on the result of the verification of the filter operation A stored in four consecutive blocks in the transfer monitor area 0, and the result of the output operation is stored in one block of the transfer monitor area 1. Similarly, the output operation B is performed on the result of the filter operation B stored in four consecutive blocks in the transfer monitor area 2, and the result of the output operation B is stored in one block of the transfer monitor area 3.

The task input/output data control circuits 10 (ID1) to 10 (ID3) in the schedule device 12 are connected to the monitor circuit 15 as shown in FIG. 1. The monitor circuit 15 monitors address signals supplied from the bus switch 14 to the memories 17 and 18, and supplies information obtained by the monitoring to the task input/output data control circuits 10 (ID1) to 10 (ID3). The task input/output data control circuits 10 (ID1) to (ID3) operate on the basis of the supplied data. Here, for ease of explanation, it is assumed that the task input/output data control circuits 10 (ID1) to 10 (ID3) create a management table based on the supplied information, and operate based on the created management table. Of course, the task input/output data control circuits 10 (ID1) to 10 (ID3) do not need to create a management table for operation.

FIGS. 35 to 56 are diagrams for explaining a control table related to the first embodiment. Here, FIGS. 35 to 46, 53 and 54 show management tables formed by the task input/output data control circuit 10 (ID1) of the semiconductor device 2_1, and FIGS. 47 to 52, 55 and 56 show management tables formed by the task input/output data control circuit 10 (ID3) of the semiconductor device 2_3. Since the management table formed by the task input/output data control circuit 10 (ID2) of the semiconductor device 2_2 is similar to the management table formed by the task input/output data control circuit 10 (ID1), the explanation thereof is omitted.

Since the items of the management table shown in FIGS. 35 to 56 are the same, the items of the management table will first be described with reference to FIG. 35. The administration table has the CTB1~CTB10 items.

An object transfer monitor area is set in the item CTB1, and a monitor object semiconductor device is set in the item CTB2. The base address of the target physical address and the base address of the logical address are set in the item CTB3, the area size of the target monitor area is set in the item CTB4, and the number of bytes per flag, which will be described later, is set in the item CTB5.

In addition, the first write (write) time to the target transfer monitor area is set in the item CTB6, and the last write (write) time to the target transfer monitor area is set in the item CTB7. The first read (read) time for the target transfer monitor area is set in the item CTB8, and the last read (read) time for the target transfer monitor area is set in the item CTB9.

In the item CTB10, the state of the target transfer monitor area is set. The item CTB10 includes an offset address specifying an address in the transfer monitor area, a. a write flag, b. a read flag, and c. an unreferenced flag. A logical value "0" is set to the write flag when a monitor using the monitor circuit 15 is started, and a logical value "1" is set to the write flag when writing is performed to an address specified by a corresponding offset address. A logical value "0" is set in the b. read flag, and when reading is performed on an address specified by the corresponding offset address, a logical value "1" is set in the b. read flag.

Set (a. Write flag)–(b. Read flag) in the unreferenced flag. That is, when writing is performed to the corresponding address and reading is not performed, c. the logical value "1" is set to the unreferenced flag, and when reading is performed after writing is performed to the corresponding address, c. the logical value "0" is set to the unreferenced flag. Note that even when writing is not performed to the corresponding address, the logical value "0" is set to the c. unreferenced flag. In the entry CTB10, the sum of a. write flag, b. read flag, and c. unreferenced flag is set.

(Information in semiconductor device 2_1) FIGS. 35 to 40 illustrate a management table corresponding to the memory 17 that constitutes the receive buffer. In order to correspond to the memory 17, the transfer monitor area 0 which is the memory 17 is set in the item CTB1, and the semiconductor device 2_1 (ID1) is set in the item CTB1. In the item CTB4, 1024 bytes are set as the area size of the transfer monitor area. Since the offset address in the item CTB10 is in units of 1 byte, 1 is set as the number of bytes per flag of the item CTB5.

FIG. 35 shows the state of the management table when the monitor is started (when the monitor is started), and FIG. 36 shows the state when the initial write transfer is detected (when the initial write transfer is detected (when the initial write is 4-byte write)). FIG. 37 shows a state when a write transfer of 1020 bytes is detected (immediately after detection of a write of 1020 bytes), and FIG. 38 shows a state when a write transfer for all addresses is detected (when a write transfer is detected for all addresses). That is, FIG. 35 to FIG. 40 show changes in the management table when write transfers are sequentially performed on the reception buffer.

Since neither reading nor writing has yet been performed at the time of starting monitoring (FIG. 35), the CTB6-CTB9 of items is not yet set. The base address of the entry CTB3 is also not set. Since accesses from the bus switch 14 to the memory 17 are not detected in the monitor circuit 15, writing and reading to and from the address specified by the offset address set in the item CTB10 are not performed, and therefore, as shown in FIG. 35, the item CTB10 is set to logical values "0" for all of the a. write flag, the b. read flag, and the c. unreferenced flag.

As shown in FIG. 36, when the scheduling device 10 (ID1) sets the base address of the physical address to 00000H, sets the base address of the logical address to 20000H, and writes 4 bytes, the time id1m0tw4 at this time is set as the first write time and the last write time. On the other hand, the monitor circuit 15 detects the writing of 4 bytes to the consecutive offset addresses 0000H to 0003H, notifies the task input/output data control circuit 10 (ID1), and the a. write flag corresponding to these is changed to the logical value "1", and the c. unreferenced flag corresponding to these is also changed to the logical value "1".

When 1020 bytes are written, the time id1m0tw1020 at that time is set as the last write time, as shown in FIG. 37. Further, according to the notification from the monitor circuit 15, the task input/output data control circuit 10 (ID1) sets the a. write flag and the c. unreferenced flag corresponding to 1020 offset addresses to logical values "1". When 1024 bytes are written, the a. write flag and the c. unreferenced flag corresponding to the offset addresses 0000H to 03FFH are changed to the logical value "1" as shown in FIG. 38.

When the processor reads data from the memory 17, the b. read flag and the c. unreferenced flag are changed, and the first read time and the last read time are changed. That is, when the first read transfer is detected (when the first read is 4-byte read), the first read time and the last read time are set to the read time id1m0tr4 as shown in FIG. 30. The monitor circuit 15 detects the reading of four bytes to the consecutive offset addresses 0000H to 0003H, and notifies the task input/output data control circuit 10 (ID1). As a result, the task input/output data control circuit 10 (ID1) changes the a. read flag corresponding to these offset addresses to the logical value "1", and changes the c. unreferenced flag corresponding to these offset addresses to the logical value "0".

When read transfer at all addresses is detected from the transfer monitor area 0 which is the memory 17, as shown in FIG. 40, the b. read flag corresponding to the offset addresses 0000H to 03FFH is changed to the ethical value "1", and the c. unreferenced flag corresponding to these is changed to the logical value "0".

As a result, the scheduling device 10 (ID1) including the task input/output data control circuit 11 can grasp the number of data that has not been read by the processor by referring to the "c. unreferenced" flag.

FIGS. 41 to 46 show the state of the management table corresponding to the memory 18 constituting the operation buffer (transmission buffer). Since FIGS. 41 to 46 are similar to FIGS. 35 to 40, differences will be mainly explained.

At the time of starting the monitor, as shown in FIG. 41, the transfer monitor area 1 corresponding to the operation buffers is set as the item CTB1. Also, 256 bytes are set as the size of the transfer monitor area 1. Since the monitoring is started, all of the a. write flag, the b. read flag, and the c. unreferenced flag corresponding to the offset address shown in the entry CT10 are set to the logical values "0".

At the time of detecting the first write transfer by the processor (when the first write is 4 bytes), as shown in FIG. 42, the base address of the physical address is set to 10000 H, the base address of the logical address is set to 30000 H, and the time (id1m1tw4) at that time is set as the first write time and the last write time. In addition, based on the detection result from the monitor circuit 15, the task input/output data control circuit 11 changes the a. write flag and the c. unreferenced flag corresponding to the offset addresses 0000 H to 0003 H to the logical value "1".

When the processor writes to the operation buffer and 252 bytes are written, 252 a. light flags and c. non-reference flags are changed to logical value "1" as shown in FIG. 43, and the time (id1m1tw252) at that time is set as the last light time. When write transfers at all addresses are detected, 256 a. write flags and c. unreferenced flags are changed to logical values "1" as shown in FIG. 44, and the time (id1m1tw256) at that time is set as the last write time.

On the other hand, when the scheduling device 10 (ID1) reads data from the memory 18, the read flag (b) and the unreferenced flag (c) are changed, and the first read time and the last read time are changed. As shown in FIG. 45, when the initial read-transfer operation is detected (when the initial read is 4 bytes), the time (id1m1tr4) at that time is set as the initial read time and the final read time. Further, according to the detection result from the monitor circuit 15, the task input/output data control circuit 11 changes the b. read flag corresponding to the offset addresses 0000 H to 0003 H to a logical value "1", and changes the corresponding c. unreferenced flag to a logical value "0". When reading by the scheduling device 10 (ID1) proceeds and read transfers at all addresses are detected, the 256 b. read flags are changed to the logical value "1" and the corresponding c. unreferenced flags are changed to the logical value "0" as shown in FIG. 46. The time id1m1tr256 at this time is set as the last read time.

As a result, the scheduling device 10 (ID1) including the task input/output data control circuit 11 can grasp the number of data that has not been read out of the data written by the processor by referring to the "c. unreferenced" flag.

(Information in semiconductor device 2_3) In semiconductor device 2_3, the information of the four transmission monitor areas (transfer monitor areas 0 to 3) is acquired and a corresponding management table is created. Since the management tables are similar to each other, the management table corresponding to the transfer monitor area 0 will be described here.

FIGS. 47-52 are similar to FIGS. 41-46. The difference is that, in FIGS. 47 to 52, the semiconductor device 2_3 is set as the monitoring target in the CTB2 of items, and the memory 17 in the semiconductor device 2_3 is set as the transfer monitoring area 0. Further, FIG. 47 to FIG. 50 differ in that a write transfer to the transfer monitor area 0 by the scheduling device (ID3) is detected, and in FIGS. 51 and 52, a read transfer from the transfer monitor area 0 by the processor is detected. That is, FIG. 48 shows the first write transfer detection time by the schedule device 10 (ID3) (when the first write is 4-byte write), FIG. 49 shows immediately after the 252-byte write detection by the schedule device 10 (ID3), and FIG. 50 shows the write transfer detection time at all addresses by the schedule device 10 (ID3). FIG. 51 shows the detection of the first read by the processor (when the first read is a 4-byte read), and FIG. 52 shows the detection of the read transfer at all addresses by the processor. FIG. 47 shows the monitor start time.

FIG. 53 shows a state in which writing is performed from the state shown in FIG. 46 to the offset addresses 0004 H to 0007 H again. In this case, a write access to the offset address is detected by the monitor circuit 15, and the task input/output data control circuit 11 changes the b. read flag corresponding to the offset address to the logical value "0", and changes the corresponding c. unreferenced flag to the logical value "1".

FIG. 54 shows a state in which read transfer at all addresses is detected again from the state shown in FIG. 53. In this case, based on the detection by the monitor circuit 15, the task input/output data control circuit 11 changes the b. read flag corresponding to the offset addresses 0004 H to 0007 H to the logical value "1", and changes the corresponding c. unreferenced flag to the logical value "0".

Further, FIG. 55 shows a case where, after FIG. 54, writing is performed again to offset addresses 0004 H to 0007 H in the transfer monitor area 0 in the semiconductor device 2_3. The task input/output data control circuit 11 changes the b. read flag corresponding to the offset address to the logical value "0", and changes the corresponding c. unreferenced flag to the logical value "1". FIG. 56 shows a state in which read transfer at all addresses is detected again after FIG. 55. In this case, based on the detection by the monitor circuit 15, the task input/output data control circuit 11 changes the b. read flag corresponding to the offset addresses 0004 H to 0007 H to the logical value "1", and changes the corresponding c. unreferenced flag to the logical value "0".

In the network system 1 related to >>first embodiment, operations (filter operations and outputting operations) performed on a frame transmitted from the data transmitting device 3 are distributed to the semiconductor device 2_1 to 2_3 and are performed. That is, the filter operation is divided into the filter operation A and the filter operation B, and is performed in semiconductor device 2_1 and 2_2, and the output operation is performed in semiconductor device 2_3 on the operation results of the filter operations A and B. The operations of the semiconductor device 2_1 to 2_3 when these operations are performed will be described below. FIGS. 57 to 60 are timing diagrams showing the operation of the semiconductor device in the network system related to the first embodiment.

Figure 57:
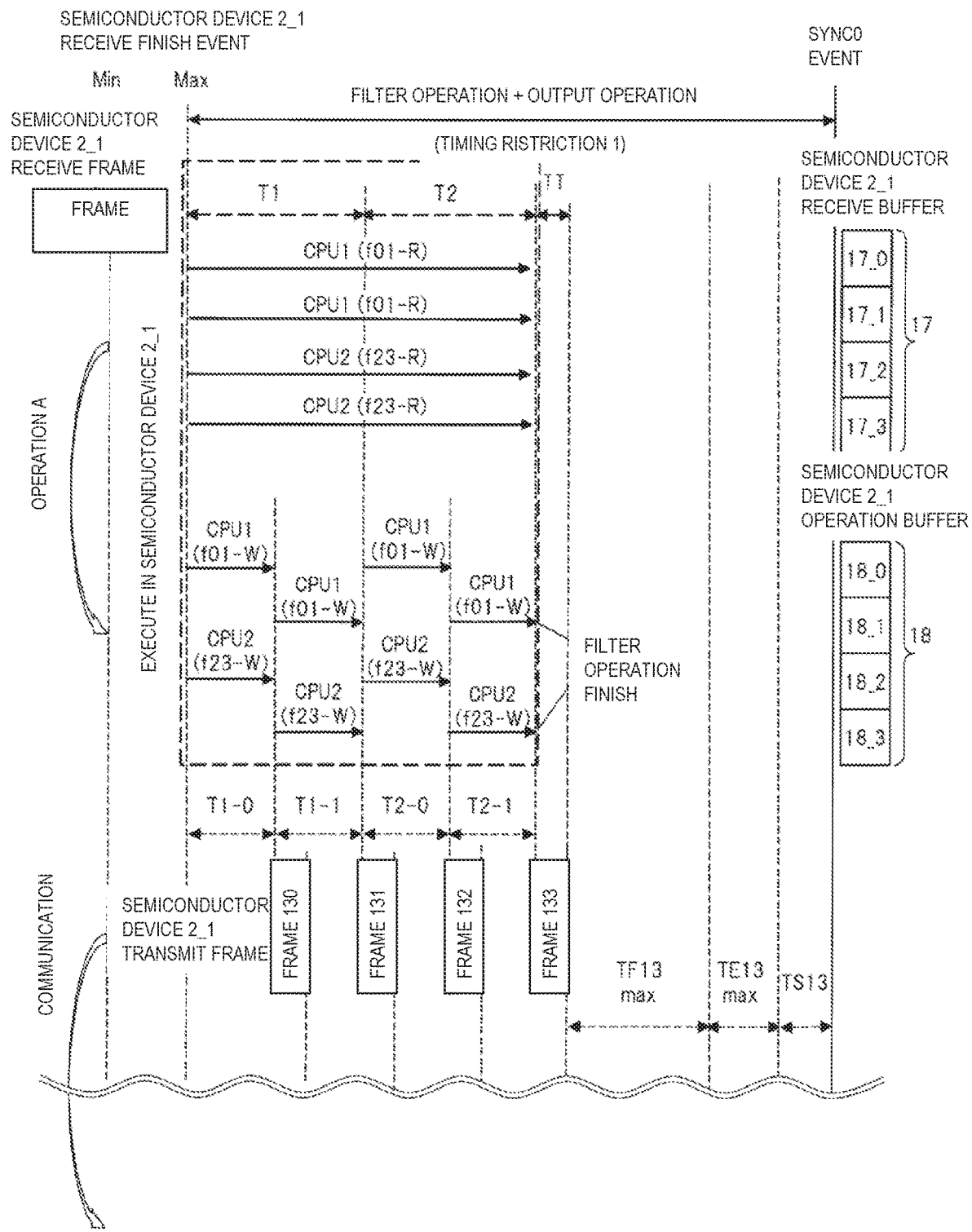
FIG. 57 is a timing diagram illustrating the operation of a semiconductor device in a network system related to first embodiment.
Figure 58:
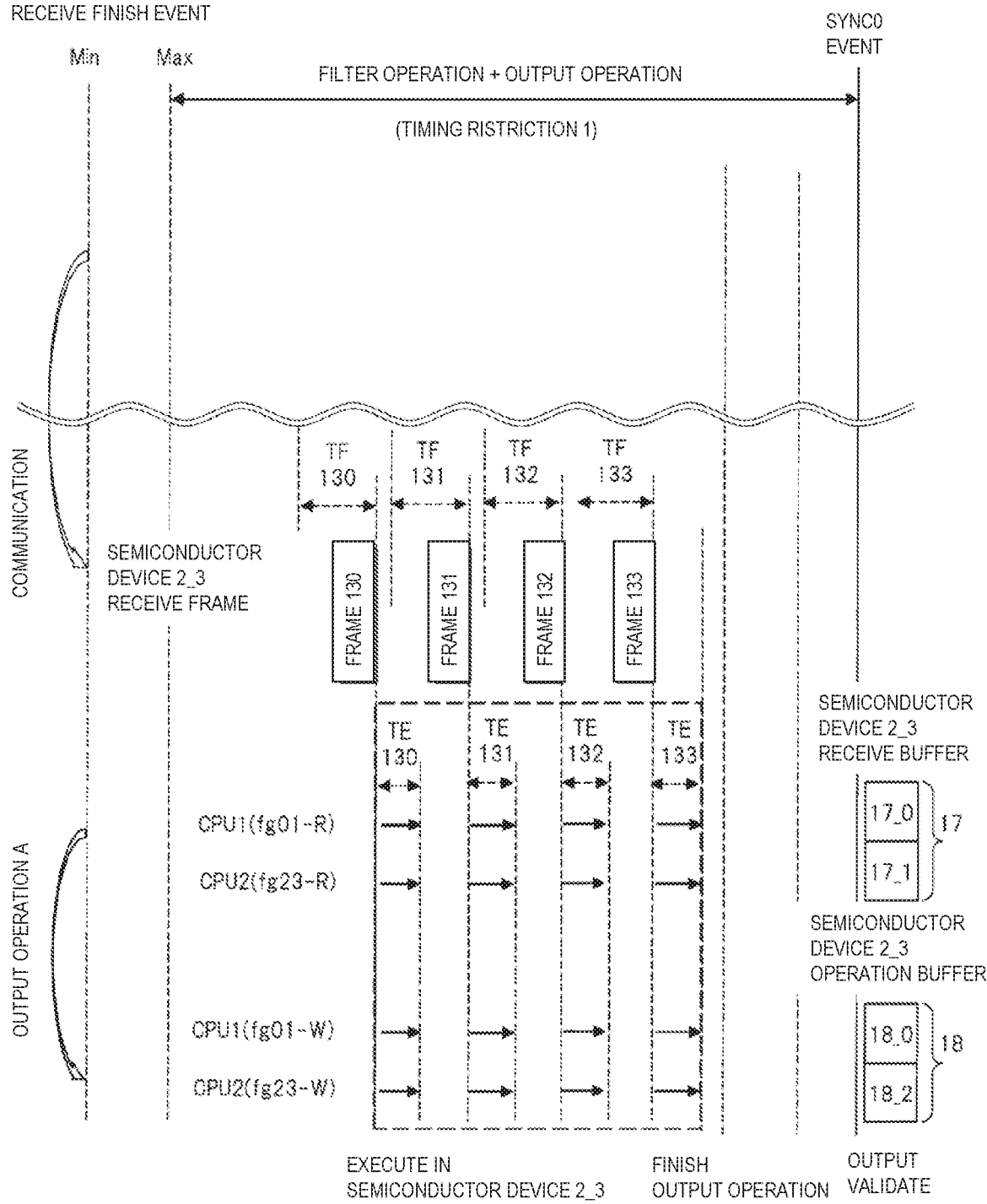
FIG. 58 is a timing diagram illustrating the operation of a semiconductor device in a network system related to first embodiment.
Figure 59:
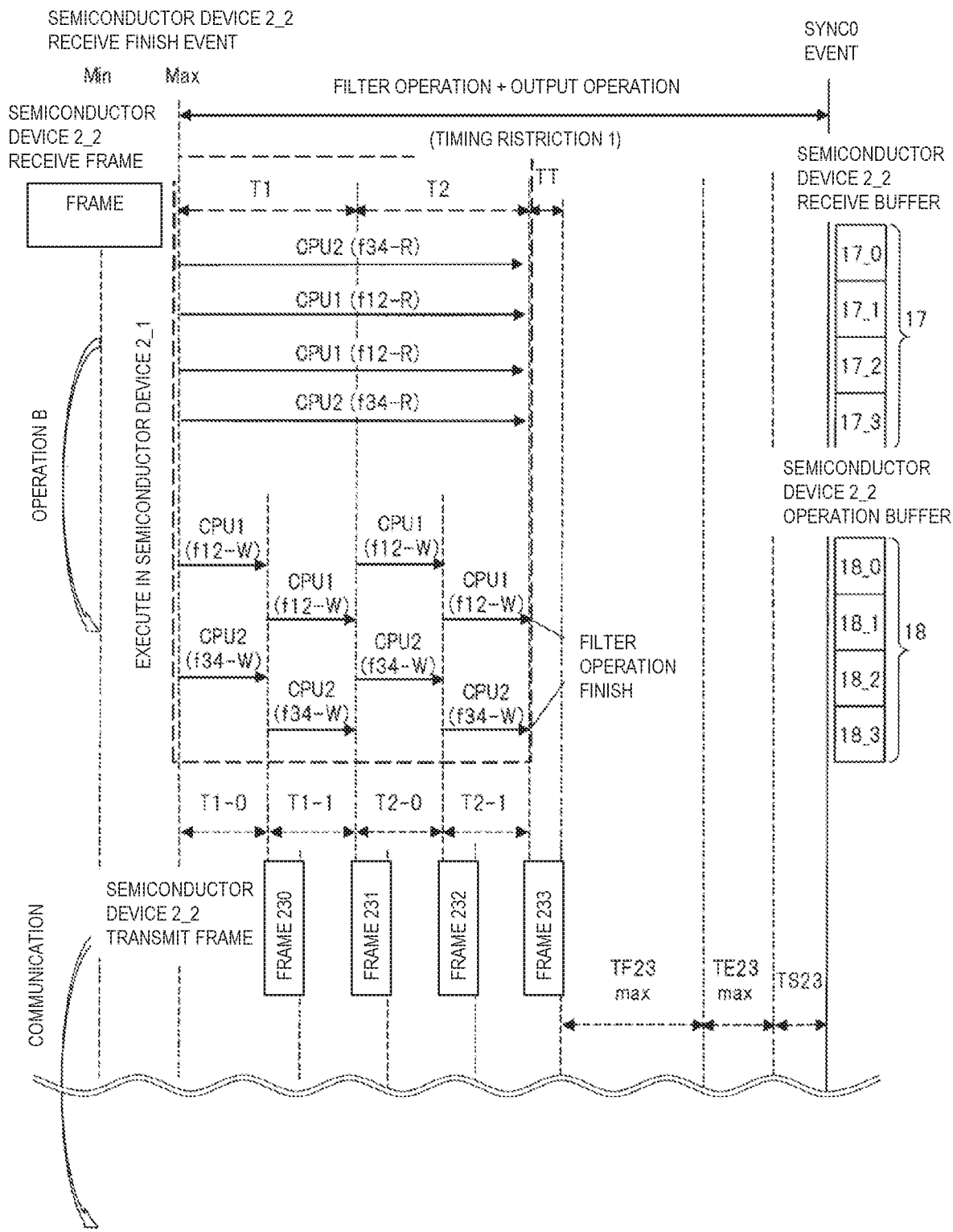
FIG. 59 is a timing diagram illustrating the operation of a semiconductor device in a network system related to first embodiment.
Figure 60:
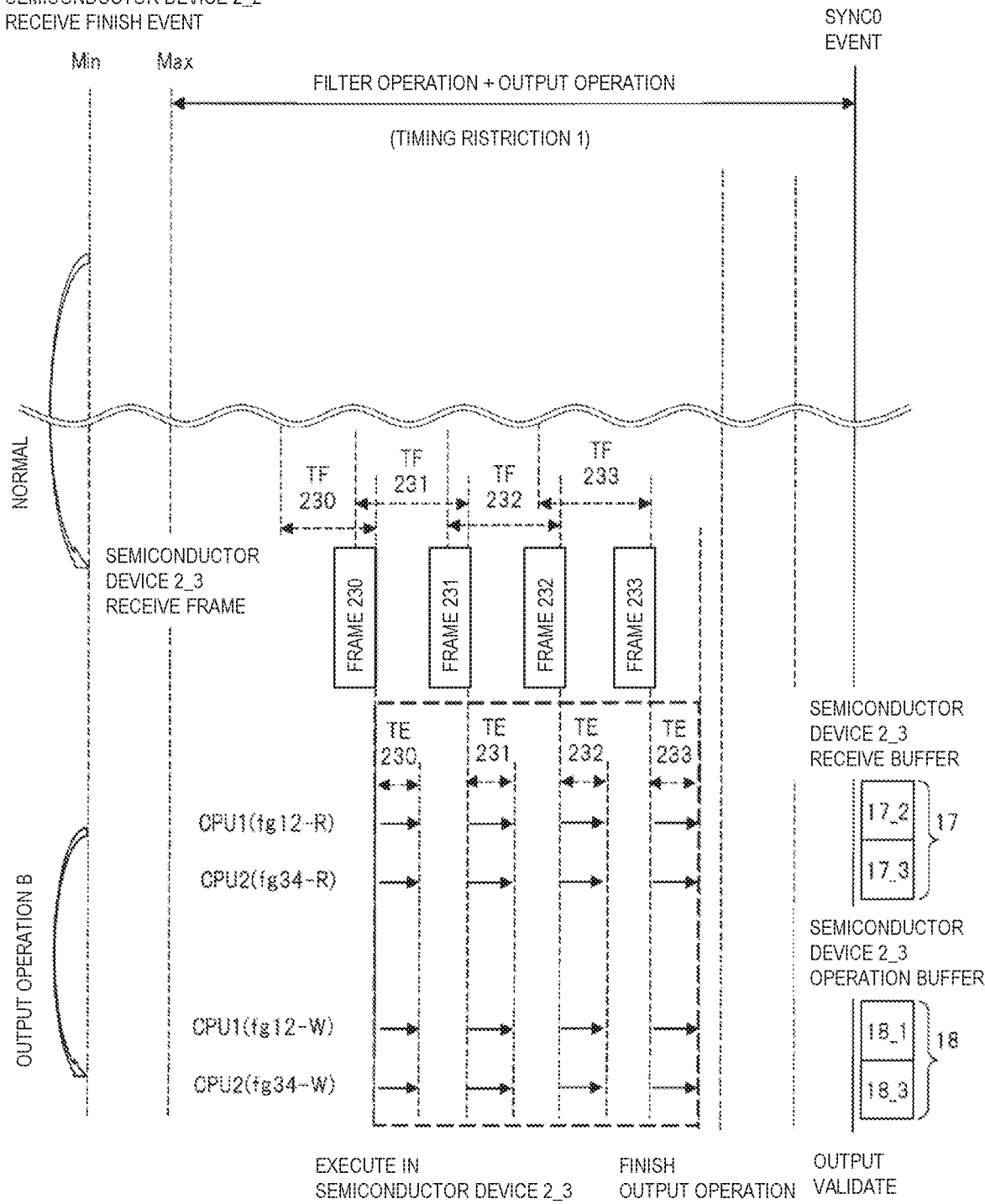
FIG. 60 is a timing diagram illustrating the operation of a semiconductor device in a network system related to first embodiment.

FIGS. 57 and 58 show operations related to semiconductor device 2_1 and 2_3, and by arranging FIG. 58 on the lower side of FIG. 57, timing diagrams showing operations of semiconductor device 2_1 and 2_3 are obtained. Similarly, FIG. 59 and FIG. 60 show operations related to semiconductor device 2_2 and 2_3, and by arranging FIG. 60 on the lower side of FIG. 59, timing diagrams showing operations of semiconductor device 2_2 and 2_3 are obtained.

In FIG. 57, when the semiconductor device 2_1 receives the received frame, the task input/output data control circuit 11 writes the data of the received frame in the bank ways 17_0 to 17_3 of the memories 17 constituting the reception buffers. At this time, the task input/output data control circuit 11 uses the monitor circuit 15 to monitor whether or not the data written in each of the bankways 17_0 to 17_3 has reached a predetermined data amount of 1024 bytes.

When the data written in the bank ways 17_0 to 17_3 reaches a predetermined data volume, the scheduling device 10 (ID1) including the task input/output data control circuit 11 allocates the bank ways 17_0 to 17_3 to the blocks 0 to 3 in accordance with the "block allocation constraint of the target area" of the transfer monitor area 0 setting register 700_0 shown in FIG. 12, allocates the processors CPU1 and CPU2 to the two block units, and starts the task for the filter operation A. As a result, the processors CPU1 and CPU2 read data from the bankways 17_0 to 17_3 (FIG. 57: CPU1(f01-R, and CPU2(f23-R)), execute the filter operation A, and write the operation result of the filter operation A to the bankways 18_0 to 18_3 of the memories constituting the transmit buffer (operation buffer) as the blocks 0 to 7 shown in the "block allocation constraint of the target region" of the transfer monitor region 1 setting register 700_1 shown in FIG. 12 (FIG. 57: CPU1(f01-W, CPU2(f23-W)).

At this time, the task input/output data control circuit 11 uses the monitor circuit 15 to monitor whether or not the amount of data not yet transmitted in the bankways 18_0 to 18_3 has reached a predetermined amount of data (256 bytes). When the amount of data written in the bankways 18_0 to 18_3 and not yet transmitted reaches a predetermined amount of data (256 bytes), the task input/output data control circuit 11 transmits (communicates) the data written in the bankways 18_0 to 18_3 to the semiconductor device 2_3 as the frames 130 to 133.

In the semiconductor device 2_3, the task input/output data control circuit 11 writes the frames 130 to 133 received from the semiconductor device 2_1 into the bankways 17_0 and 17_1 of the memories 17 constituting the received frame. At this time, the task input/output data control circuit 11 in the semiconductor device 2_3 uses the monitor circuit 15 to monitor whether or not the amount of data written in the bankways 17_0 and 17_1 has reached a predetermined amount of data (256 bytes). When data of a predetermined data quantity is written in the bankways 17_0 and 17_1, the scheduling device 10 (ID3) including the task input/output data control circuit 11 starts the task for the output operation A. As a result, the processor CPU1,CPU2 in the semiconductor device 2_3 reads the data written to the bankways 17_0 and 17_1 (FIG. 58: CPU1(fg01-R, and CPU2(fg23-R)), executes the output operation A, and writes the operation result of the output operation A to the bankways 18_0 and 18_2 of the memory 18 constituting the operation buffer (transmitting buffer) (FIG. 58: CPU1(fg01-W, and CPU2 (fg23-W).

That is, in the semiconductor device 2_1, when the operation result of the filter operation A (unsent data) is written in the transmission buffer by a predetermined data amount, the transmission buffer is automatically transmitted to the semiconductor device 2_3. Also in the semiconductor device 2_3, when a predetermined amount of data is written in the reception buffers, the task for the output operation A is automatically started. That is, in the semiconductor device 2_3, the task for the output operation A is started preferentially.

The task for filter operation A is executed in semiconductor device 2_1, and the task for outputting operation A is executed in semiconductor device 2_3. Since the task for output operation A is started when a predetermined data quantity is written in the semiconductor device 2_3, the task for filter operation A and the task for output operation A are executed in parallel as shown in FIGS. 57 and 58. As a result, according to first embodiment, as shown in FIGS. 57 and 58, the filter operation A and the output operation A can be performed so as to satisfy the timing constraint 1.

The semiconductor device 2_2 and 2_3 operate in the same manner as the semiconductor device 2_1 and 2_3. That is, in the semiconductor device 2_2, when it is determined that a predetermined amount of data has been written in the bankways 17_0 to 17_3 by monitoring by the monitor circuits 15, reading is executed by the processors CPU1 and CPU2 (CPU1(f12-R and CPU2(f34-R) as shown in FIG. 59. In addition, the filter operation B using the read data is performed, and writing is performed on the bankways 18_0 to 18_3 (FIG. 59: CPU1(f12-W; CPU2(f34-W)). Writing to the bankways 18_0 to 18_3 is also monitored by the monitor 15, and when a predetermined data amount is reached, the data amount is transmitted (communicated) to the semiconductor device 2_3 as frames 230 to 233.

In the semiconductor device 2_3, the received frames 230 to 233 are written to the bankways 17_2 and 17_3. Whether or not the amount of data of the frame written in the bank ways 17_2 and 17_3 has reached a predetermined amount of data is monitored using the monitor circuit 15, and when the predetermined amount of data has been reached, the task for output calculation B is started. That is, the data is read from the bank ways 17_2 and 17_3 (FIG. 60: CPU1(fg12-R and CPU2(fg34-R), and the output operation B is performed to write the data to the bank memories 18_1 and 18_3 (FIG. 60: CPU1(fg12-W and CPU2(fg34-W).

As a result, the filter operation B and the output operation B can also be performed so as to satisfy the timing constraint 1, as shown in FIGS. 59 and 60.

The task for filter operation A and the task for filter operation B are executed in parallel in semiconductor device 2_1 and 2_2, and the task for output operation A and the task for output operation B are executed in parallel in semiconductor device 2_3. As a result, filtering and power operations can be performed to satisfy the timing constraint 1.

The above-mentioned management table may be provided in the access monitor circuit 15. In this case, the management table holds information indicating whether or not data to be transferred is stored, and/or information regarding access time, for each address area obtained by subdividing the address area. The scheduling device operates to select and preferentially transfer data having a long residence time in the transmission buffer, data referred to by a task having a severe timing constraint, and/or data referred to by a task having a high execution priority from among data stored in each of the segmented address areas based on information provided from the access monitoring circuit 15 and preferentially transfer the selected data to the transmission buffer, the data referred to by a task having a severe timing constraint, and/or the data referred to by a task having a high execution priority. When data is transferred to the semiconductor device 2_3, the access monitor in the semiconductor device 2_3 updates, in real time, the status of the control table holding information indicating whether or not data transferred from the memories of the transfer source semiconductor device is stored, and/or information on the access time, for each address area obtained by subdividing the first address area of the semiconductor device 2_3. In addition, the access monitor circuits in the semiconductor device 2_3 provide, in real time, the scheduled device in the semiconductor device 2_3 with information on the amount of data that has been transferred to the first address area of the semiconductor device 2_3 from the memory of the semiconductor device of the transfer source, based on the state of the managing table. In this instance, the scheduling device in the semiconductor device 2_3 starts the task of referring to the data transferred to the first address area and/or changes the order of executing the task of referring to the data transferred to the first address area based on the data provided from the access monitor circuits.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
a plurality of first masters;
a scheduling device connected to the plurality of first masters for controlling the plurality of first masters to perform a plurality of tasks in real time;
a memory accessed by the plurality of first masters to store data by performing the tasks; and
an access monitor circuit monitoring access to the memory by the plurality of first masters,
wherein when the access to the memory is detected by the access monitor circuit, the data stored in the memory is transferred based on destination information,
wherein when the access monitor circuit detects access to a predetermined address area of the memory, a state of a control table holding 1) information indicating whether data to be transferred is stored or not and/or 2) information on an access time is updated for each address area obtained by subdividing the predetermined address area.

2. The semiconductor device according to claim 1, wherein when the access monitor detects that the data has been stored in the predetermined address area of the memory, the data stored in the memory is transferred.

3. The semiconductor device according to claim 2, further comprising:
a communication device for transferring the data stored in the memory,
wherein the destination information includes 1) identification information specifying a transfer destination memory of the data stored in the memory and 2) address information specifying an address area in the transfer destination memory specified by the identification information; and
wherein the communication device comprises a second master for transferring the data stored in the memory to the address area of the transfer destination memory specified by the identification information and the address information when the data is detected to be stored in the predetermined address area of the memory.

4. The semiconductor device according to claim 3, wherein the plurality of first masters are processors, and wherein the second master is a DMA controller controlled by the scheduling device.

5. The semiconductor device according to claim 3, further comprising:
a control register including a register in which the destination information is set.

6. The semiconductor device according to claim 1, wherein the scheduling device selects and preferentially transfers, from among the data stored in each subdivided address area, data having a long residence time in a transmission buffer, data referred to by a task having a severe timing constraint, and/or data referred to by a task having a high execution priority, based on information provided from the access monitor circuit.

7. A system comprising a plurality of semiconductor devices connected to each other by a network,
wherein each of the plurality of semiconductor devices comprises:
a plurality of masters;
a scheduling device connected to the plurality of masters for controlling the plurality of masters to perform a plurality of tasks in real time;
a memory accessed by the plurality of masters to store data by performing tasks; and
an access monitor circuit monitoring access to the memory by the plurality of masters, wherein when the access to the memory is detected by the access monitor circuit in a first semiconductor device of the plurality of semiconductor devices, the data stored in the memory is transferred to a memory of a second semiconductor device specified by destination information in the plurality of semiconductor devices, wherein the first semiconductor device has, as the destination information, 1) identification information specifying the second semiconductor device from the plurality of semiconductor devices and 2) address information specifying a first address area of the second semiconductor device, wherein when the access monitor circuit detects that the data is stored in the memory in the first semiconductor device, the data stored in the memory in the first semiconductor device is transferred to the first address area of the second semiconductor device, wherein the plurality of semiconductor devices includes a third semiconductor device, wherein the third semiconductor device has, as said destination information, 1) the identification information specifying the second semiconductor device and 2) address information specifying a second address area of the memory of said second semiconductor device, and wherein when the access monitor circuit detects that the data is stored in the memory in the third semiconductor device, the data stored in the memory in the third semiconductor device is transferred to the second address area of the second semiconductor device specified by the destination information.

8. The system according to claim 7, wherein the plurality of masters in the second semiconductor device performs tasks using the data transferred from the first semiconductor device and the third semiconductor device.

9. The system according to claim 8,
wherein the first semiconductor device further comprises a first communication device comprising a master for transferring data between the network and the memory of the first semiconductor device,
wherein the second semiconductor device further comprises a second communication device comprising a master for transferring data between the network and the memory of the second semiconductor device, and
wherein the third semiconductor device further comprising a third communication device comprising a master for transferring data between the network and the memory of the third semiconductor device.

10. The system according to claim 8, further comprising a transmitting device connected to the network for transmitting data to the first semiconductor device and the third semiconductor device.

11. The system according to claim 7, wherein each of the first semiconductor device and the third semiconductor device further comprises a control register including a register in which the destination information is set.

12. The system according to claim 7, wherein the access monitor circuit in the second semiconductor device provides, to the scheduled device in the second semiconductor device, real-time information about an amount of the data that has been transferred from the memory of the first semiconductor device to the first address area of the second semiconductor device.

13. A system comprising a plurality of semiconductor devices connected to each other by a network,
wherein each of the plurality of semiconductor devices comprises:
a plurality of masters;
a scheduling device connected to the plurality of masters for controlling the plurality of masters to perform a plurality of tasks in real time;
a memory accessed by the plurality of masters to store data by performing tasks; and
an access monitor circuit monitoring access to the memory by the plurality of masters,
wherein when the access to the memory in a first semiconductor device of the plurality of semiconductor devices is detected by the access monitor circuit, the data stored in the memory in the first semiconductor device is transferred to a memory of a second semiconductor device specified by destination information in the plurality of semiconductor devices,
wherein the first semiconductor device has, as the destination information, 1) identification information specifying the second semiconductor device from the plurality of semiconductor devices and 2) address information specifying a first address area of the second semiconductor device,
wherein when the access monitor circuit detects that the data is stored in the memory in the first semiconductor device, the data stored in the memory in the first semiconductor device is transferred to the first address area of the second semiconductor device, and
wherein when the access monitor circuit in the second semiconductor device detects access to the first address area, a state of a control table holding 1) information indicating whether data to be transferred is stored and/or 2) information on an access time is updated for each address area obtained by subdividing the first address area.

14. A system comprising a plurality of semiconductor devices connected to each other by a network,
wherein each of the plurality of semiconductor devices comprises:
a plurality of masters;
a scheduling device connected to the plurality of masters for controlling the plurality of masters to perform a plurality of tasks in real time;
a memory accessed by the plurality of masters to store data by performing tasks; and
an access monitor circuit monitoring access to the memory by the plurality of masters,
wherein when the access to the memory in a first semiconductor device of the plurality of semiconductor devices is detected by the access monitor circuit, the data stored in the memory in the first semiconductor device is transferred to a memory of a second semiconductor device specified by destination information in the plurality of semiconductor devices,
wherein the first semiconductor device has, as the destination information, 1) identification information specifying the second semiconductor device from the plurality of semiconductor devices and 2) address information specifying a first address area of the second semiconductor device,
wherein when the access monitor circuit detects that the data is stored in the memory in the first semiconductor device, the data stored in the memory in the first semiconductor device is transferred to the first address area of the second semiconductor device, and
wherein the scheduling device in the second semiconductor device activates a task for referencing the data transferred to the first address area based on information provided from the access monitor circuit, and/or changes a prioritization order for executing a task for referencing the data transferred to the first address area based on information provided from the access monitor circuit.

\* \* \* \* \*